(12) United States Patent
Lin et al.

(10) Patent No.: US 10,566,681 B2
(45) Date of Patent: Feb. 18, 2020

(54) ANTENNA STRUCTURE AND WIRELESS COMMUNICATION DEVICE USING SAME

(71) Applicant: Chiun Mai Communication Systems, Inc., New Taipei (TW)

(72) Inventors: Yen-Hui Lin, New Taipei (TW); Yun-Jian Chang, New Taipei (TW); Jung-Chin Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 214 days.

(21) Appl. No.: 15/655,906

(22) Filed: Jul. 21, 2017

(65) Prior Publication Data

US 2018/0026338 A1 Jan. 25, 2018

Related U.S. Application Data

(60) Provisional application No. 62/364,880, filed on Jul. 21, 2016.

(30) Foreign Application Priority Data

Jul. 7, 2017 (CN) .......................... 2017 1 0553028

(51) Int. Cl.
*H01Q 1/24* (2006.01)
*H01Q 1/48* (2006.01)
(Continued)

(52) U.S. Cl.
CPC ............... *H01Q 1/242* (2013.01); *H01Q 1/48* (2013.01); *H01Q 5/10* (2015.01); *H01Q 5/50* (2015.01);
(Continued)

(58) Field of Classification Search
CPC .......... H01Q 1/242; H01Q 1/48; H01Q 1/243; H01Q 1/521; H01Q 5/50; H01Q 5/10;
(Continued)

(56) References Cited

U.S. PATENT DOCUMENTS 9,478,862 B2 * 10/2016 Su .......................... H01Q 1/243
9,673,512 B2 * 6/2017 Lin ........................ H01Q 1/243
(Continued)

FOREIGN PATENT DOCUMENTS

| CN | 102255134 A | 11/2011 |
|---|---|---|
| CN | 104064866 A | 9/2014 |

(Continued)

*Primary Examiner* — Hoang V Nguyen
*Assistant Examiner* — Awat M Salih
(74) *Attorney, Agent, or Firm* — ScienBiziP, P.C.

(57) ABSTRACT

An antenna structure includes a metal housing, a first resonance portion, a second resonance portion, an extending portion, and a signal feed source. The metal housing includes a front frame, a backboard, and a side frame. The side frame defines a slot and the front frame defines a groove and a gap. The metal housing is divided into at least an antenna section by the slot, the groove, and the gap. The first and second resonance portions and the extending portion are spaced apart from each other. The first resonance portion and the extending portion are both directly and electrically connected to the antenna section or are spaced apart and electrically coupled to the antenna section. The second resonance portion is electrically connected to the antenna section. One resonance portion is electrically connected to the signal feed source and the other resonance portion is grounded.

24 Claims, 58 Drawing Sheets

(51) Int. Cl.
*H01Q 5/50* (2015.01)
*H01Q 5/10* (2015.01)
H04M 1/02 (2006.01)
H01Q 7/00 (2006.01)

(52) U.S. Cl.
CPC ............. *H01Q 7/00* (2013.01); *H04M 1/0264* (2013.01); *H04M 1/0266* (2013.01)

(58) Field of Classification Search
CPC .......... H01Q 5/378; H01Q 5/371; H01Q 5/35; H01Q 13/18; H01Q 21/28; H01Q 9/42
See application file for complete search history.

(56) References Cited

U.S. PATENT DOCUMENTS

| | | | |
|---|---|---|---|
| 2014/0347226 A1 | 11/2014 | Iellici et al. | |
| 2014/0347227 A1* | 11/2014 | Iellici | H01Q 1/243 343/702 |
| 2015/0372372 A1* | 12/2015 | Lee | H01Q 1/243 343/702 |
| 2016/0164192 A1 | 6/2016 | Lin | |

FOREIGN PATENT DOCUMENTS

| | | | | |
|---|---|---|---|---|
| CN | 203883129 | * | 10/2014 | ............... H01Q 1/38 |
| CN | 204441470 U | | 7/2015 | |
| CN | 105006647 A | | 10/2015 | |
| CN | 105340126 A | | 2/2016 | |
| CN | 105514586 A | | 4/2016 | |
| CN | 105720382 A | | 6/2016 | |

\* cited by examiner

ANTENNA STRUCTURE AND WIRELESS COMMUNICATION DEVICE USING SAME

CROSS-REFERENCE TO RELATED APPLICATIONS

This application claims priority to Chinese Patent Application No. 201710553028.1 filed on Jul. 7, 2017, and claims priority to U.S. Patent Application No. 62/364,880 filed on Jul. 21, 2016, the contents of which are incorporated by reference herein.

FIELD

The subject matter herein generally relates to an antenna structure and a wireless communication device using the antenna structure.

BACKGROUND

Metal housings, for example, metallic backboards, are widely used for wireless communication devices, such as mobile phones or personal digital assistants (PDAs). Antennas are also important components in wireless communication devices for receiving and transmitting wireless signals at different frequencies, such as signals in Long Term Evolution Advanced (LTE-A) frequency bands. However, when the antenna is located in the metal housing, the antenna signals are often shielded by the metal housing. This can degrade the operation of the wireless communication device. Additionally, the metallic backboard generally defines slots or/and gaps thereon, which will affect integrity and aesthetic quality of the metallic backboard.

BRIEF DESCRIPTION OF THE DRAWINGS

Implementations of the present technology will now be described, by way of example only, with reference to the attached figures.

DETAILED DESCRIPTION

Figure 1:
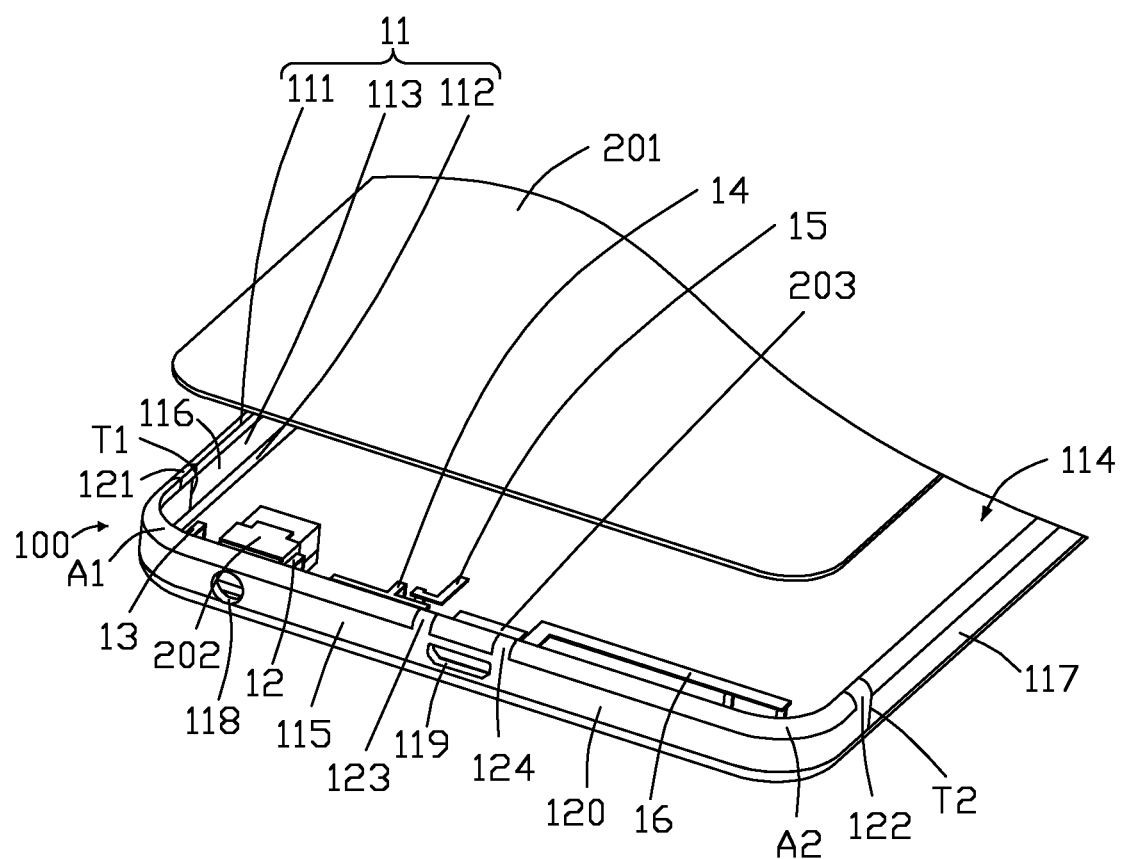
FIG. 1 is an isometric view of a first exemplary embodiment of a wireless communication device using a first exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

Exemplary Embodiments 1-2

FIG. 1 illustrates an exemplary embodiment of a wireless communication device 200 using a first exemplary antenna structure 100. The wireless communication device 200 can be a mobile phone or a personal digital assistant, for example. The antenna structure 100 can receive and/or transmit wireless signals.

Figure 2:
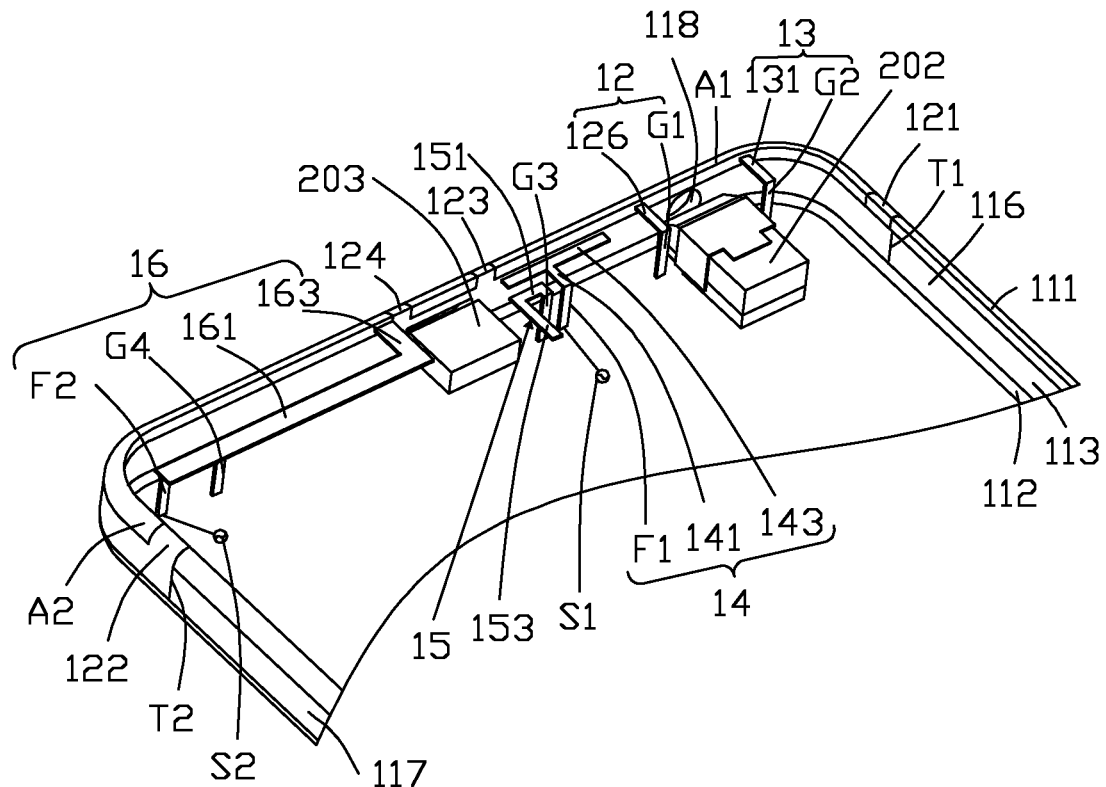
FIG. 2 is similar to FIG. 1, but shown from another angle.

In FIGS. 1 and 2, the antenna structure 100 includes a housing 11, a first ground portion 12, a second ground portion 13, a coupling portion 14, a parasitic portion 15, a radiating portion 16, a first feed source S1, and a second feed source S2. The housing 11 can be a metal housing of the wireless communication device 200. In this exemplary embodiment, the housing 11 is made of metallic material. The housing 11 includes a front frame 111, a backboard 112, and a side frame 113. The front frame 111, the backboard 112, and the side frame 113 can be integrally formed. The front frame 111, the backboard 112, and the side frame 113 cooperatively form the housing 11 of the wireless communication device 200.

The front frame 111 defines an opening (not shown). The wireless communication device 200 includes a display 201. The display 201 is received in the opening. The display 201 has a display surface. The display surface is exposed at the opening and is parallel to the backboard 112.

The backboard 112 and the front frame 111 are on opposite sides of the side frame 113. The backboard 112 is directly connected to the side frame 113 and there is no gap between the backboard 112 and the side frame 113. The backboard 112 serves as the ground of the antenna structure 100 and the wireless communication device 200.

The side frame 113 is between the backboard 112 and the front frame 111. The side frame 113 is positioned around a periphery of the backboard 112 and a periphery of the front frame 111. The side frame 113 forms a receiving space 114 together with the display 201, the front frame 111, and the backboard 112. The receiving space 114 can receive a printed circuit board, a processing unit, or other electronic components or modules (not shown).

The side frame 113 includes an end portion 115, a first side portion 116, and a second side portion 117. In this exemplary embodiment, the end portion 115 can be a bottom portion of the wireless communication device 200. The end portion 115 connects the front frame 111 and the backboard 112. The first side portion 116 is spaced apart from and parallel to the second side portion 117. The end portion 115 has first and second ends. The first side portion 116 is connected to the first end of the first frame 111 and the second side portion 117 is connected to the second end of the end portion 115. The first side portion 116 and the second side portion 117 both connect to the front frame 111.

The side frame 113 defines a first through hole 118, a second through hole 119, and a slot 120. The front frame 111 defines a first groove 121, a second groove 122, a first gap 123, and a second gap 124 as shown in FIG. 2. In this exemplary embodiment, the first through hole 118 and the second through hole 119 are both defined at the end portion 115. The first through hole 118 and the second through hole 119 are spaced apart from each other and both extend across the end portion 115.

Figure 3:
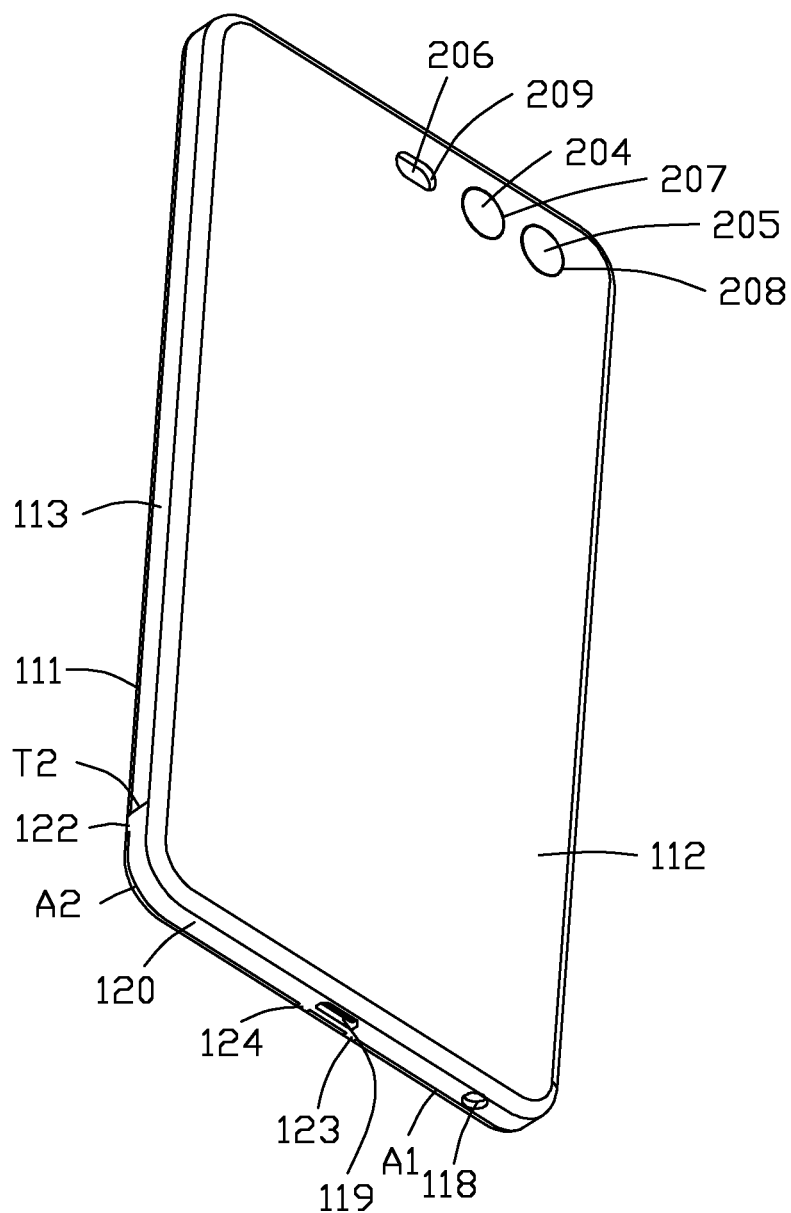
FIG. 3 is an assembled, isometric view of the wireless communication device of FIG. 1.
Figure 4:
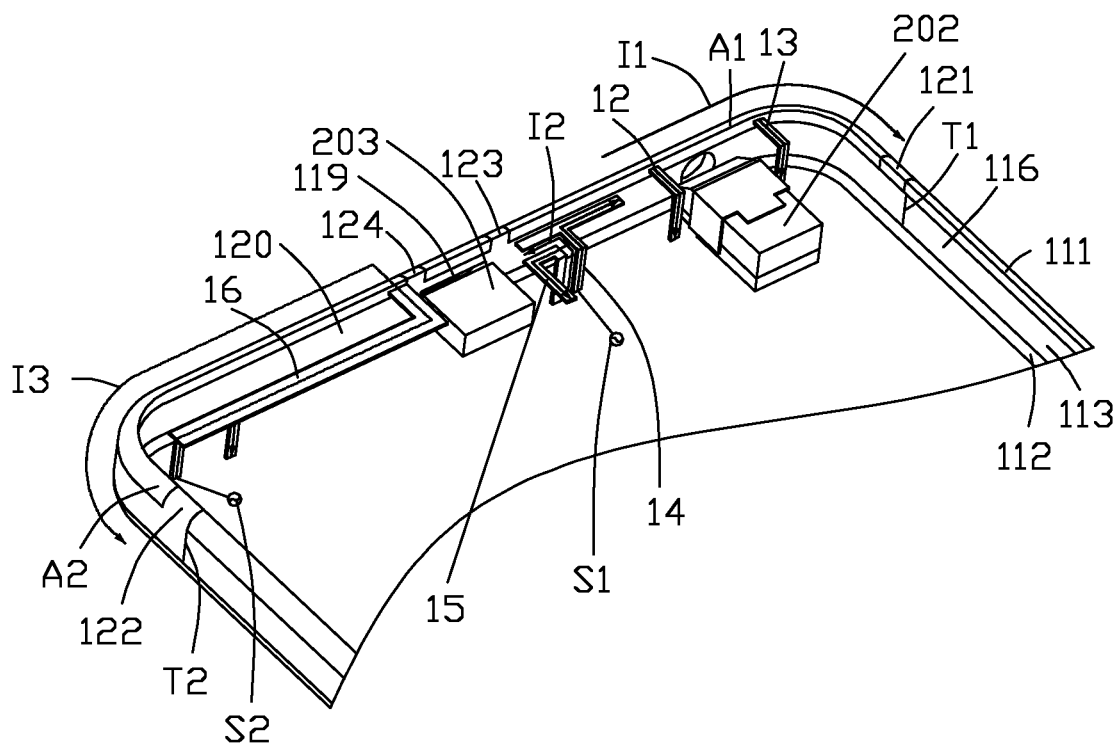
FIG. 4 is a current path distribution graph of the antenna structure of FIG. 1.

In FIGS. 3 and 4, the wireless communication device 200 further includes at least one electronic element. In this exemplary embodiment, the wireless communication device 200 includes a first electronic element 202, a second electronic element 203, a third electronic element 204, a fourth electronic element 205, and a fifth electronic element 206. In this exemplary embodiment, the first electronic element 202 is an earphone interface module. The first electronic element 202 is positioned in the receiving space 114 adjacent to the first side portion 116. The first electronic element 202 corresponds to the first through hole 118 and is partially exposed from the first through hole 118. An earphone can thus be inserted in the first through hole 118 and be electrically connected to the first electronic element 202.

The second electronic element 203 is a Universal Serial Bus (USB) module. The second electronic element 203 is positioned in the receiving space 114 and is positioned between the first electronic element 202 and the second side portion 117. The second electronic element 203 corresponds to the second through hole 119 and is partially exposed from the second through hole 119. A USB device can be inserted in the second through hole 119 and be electrically connected to the second electronic element 203. The third electronic element 204 and the fourth electronic element 205 are both rear camera modules. The fifth electronic element 206 is a flash light.

The backboard 112 is an integrally form metallic sheet. Referring to FIG. 3, the backboard 112 defines holes 207, 208, and 209 for exposing double camera lenses (i.e., the third electronic element 204 and the fourth electronic element 205) and a flash light (i.e., the fifth electronic element 206). The backboard 112 does not define any slot, break line, and/or gap to divide the backboard 112.

In this exemplary embodiment, the slot 120 is defined at the end portion 115. The slot 120 is in communication with the first through hole 118 and the second through hole 119. The slot 120 further extends to the first side portion 116 and the second side portion 117. In other exemplary embodiments, the slot 120 is defined only at the end portion 115 and does not extend to any one of the first side portion 116 and the second side portion 117. In other exemplary embodiments, the slot 120 can be defined at the end portion 115 and extend to one of the first side portion 116 and the second side portion 117.

In FIG. 4, the first groove 121, the second groove 122, the first gap 123, and the second gap 124 are all in communication with the slot 120 and extend across the front frame 111. In this exemplary embodiment, the first groove 121 is defined on the front frame 111 and communicates with a first end T1 of the slot 120 positioned on the first side portion 116. The second groove 122 is defined on the front frame 111 and communicates with a second end T2 of the slot 120 positioned on the second side portion 117.

The first gap 123 and the second gap 124 are both defined on the front frame 111 between the first end T1 and the second end T2. The first gap 123 and the second gap 124 are spaced apart from each other and in communication with the slot 120. The slot 120, the first groove 121, the second groove 122, the first gap 123, and the second gap 124 separate a first antenna section A1 from the housing 11. Then, the portion of the front frame 111 between the first groove 121 and the first gap 123 forms the first antenna section A1. The portion of the front frame 111 between the second groove 122 and the second gap 124 forms the second antenna section A2. In this exemplary embodiment, the first gap 123 and the second gap 124 are positioned at the two sides of the second through hole 119.

In this exemplary embodiment, except for the first through hole 118 and the second through hole 119, the slot 120, the first groove 121, the second groove 122, the first gap 123, and the second gap 124 are all filled with insulating material, for example, plastic, rubber, glass, wood, ceramic, or the like.

In this exemplary embodiment, the slot 120 is defined at the end of the side frame 113 adjacent to the backboard 112 and extends to an edge of the front frame 111. Then the first antenna section A1 and the second antenna section A2 are fully formed by a portion of the front frame 111. In other exemplary embodiments, a position of the slot 120 can be adjusted. For example, the slot 120 can be defined on the end of the side frame 113 adjacent to the backboard 112 and extend towards the front frame 111. Then the first antenna section A1 and the second antenna section A2 are formed by a portion of the front frame 111 and a portion of the side frame 113.

In this exemplary embodiment, except for the slot 120, the first groove 121, the second groove 122, the first gap 123, and the second gap 124, a lower half portion of the front frame 111 and the side frame 113 does not define any other slot, break line, and/or gap. That is, only the first groove 121, the second groove 122, the first gap 123, and the second gap 124 are defined on the lower half portion of the front frame 111.

In this exemplary embodiment, a width of the slot 120 is about 3.43 mm. A width of the first gap 123 and a width of the second gap 124 are each about 2 mm. A width of the first groove 121 and a width of the second groove 122 are each about 3.43 mm. A distance between the first gap 123 and the second gap 124 is about 11.1 mm.

In FIG. 2, the first ground portion 12 is positioned at the side of the first electronic element 202 adjacent to the first gap 123. The first ground portion 12 is substantially L-shaped. The first ground portion 12 includes a first ground section G1 and a first connecting section 126. The first ground section G1 is substantially rectangular and is positioned on a plane perpendicular to the plane of the backboard 112. One end of the first ground section G1 is perpendicularly connected to the first connecting section 126. Another end of the first ground section G1 is electrically connected to the backboard 112 to be grounded. The first connecting section 126 is substantially rectangular and is positioned on a plane parallel to the plane of the backboard 112. One end of the first connecting section 126 is perpendicularly connected to the end of the first ground section G1 away from the backboard 112. Another end of the first connecting section 126 extends along a direction parallel to the first side portion 116 towards the end portion 115. The extension of the first connecting section 126 continues until the first connecting section 126 connects to the first antenna section A1. Then the first antenna section A1 is grounded through the first ground portion 12.

The second ground portion 13 is positioned at the side of the first electronic element 202 adjacent to the first side portion 116. The second ground portion 13 is substantially L-shaped. The second ground portion 13 includes a second ground section G2 and a second connecting section 131. The second ground section G2 is substantially rectangular and is positioned on a plane perpendicular to the plane of the backboard 112. One end of the second ground section G2 is perpendicularly connected to the second connecting section 131. Another end of the second ground section G2 is electrically connected to the backboard 112 to be grounded. The second connecting section 131 is substantially rectangular and is positioned on a plane parallel to the plane of the backboard 112. One end of the second connecting section 131 is perpendicularly connected to the end of the second ground section G2 away from the backboard 112. Another end of the second connecting section 131 extends along a direction parallel to the first side portion 116 towards the end portion 115. The extension continues until the second connecting section 131 connects to the first antenna section A1. Then the first antenna section A1 is grounded through the second ground portion 13.

The first ground portion 12 and the second ground portion 13 are both positioned adjacent to the first through hole 118. The first ground portion 12 and the second ground portion 13 are positioned at the two sides of the first through hole 118.

The coupling portion 14 is electrically connected to the first feed source S1 and forms a monopole antenna with the first feed source S1. The coupling portion 14 includes a first feed section F1, a first coupling section 141, and a second coupling section 143. The first feed section F1 is positioned between the first electronic element 202 and the second electronic element 203. The first feed section F1 is substantially rectangular and is positioned on a plane perpendicular to the plane of the backboard 112. One end of the first feed section F1 is electrically connected to the first coupling section 141. Another end of the first feed section F1 is electrically connected to the first feed source S1 for supplying current to the coupling portion 14.

The first coupling section 141 is substantially rectangular and is positioned on a plane parallel to the plane of the backboard 112. One end of the first coupling section 141 is electrically connected to the end of the first feed section F1 away from the first feed source S1. Another end of the first coupling section 141 extends along a direction parallel to the first side portion 116 towards the end portion 115. The second coupling section 143 is coplanar with the first coupling section 141. The second coupling section 143 is perpendicularly connected to the end of the first coupling section 141 away from the first feed section F1 and extends along two directions. The two directions are parallel to the end portion 115, towards the first side portion 116 and towards the second side portion 117, to form a T-shaped structure with the first coupling section 141.

The parasitic portion 15 is a parasitic antenna and is positioned between the first coupling section 141 and the second electronic element 203. The parasitic portion 15 includes a third ground section G3, a first parasitic section 151, and a second parasitic section 153. The third ground section G3 is substantially rectangular and is positioned on a plane perpendicular to the plane of the backboard 112. One end of the third ground section G3 is perpendicularly connected to the first parasitic section 151. Another end of the third ground section G3 is electrically connected to the backboard 112 to be grounded. The first parasitic section 151 is substantially rectangular. One end of the first parasitic section 151 is perpendicularly connected to the end of the third ground section G3 away from the backboard 112. Another end of the first parasitic section 151 extends along a direction parallel to the second coupling section 143 towards the second electronic element 203 (i.e., towards the second side portion 117). The second parasitic section 153 is substantially rectangular. The second parasitic section 153 is perpendicularly connected to the end of the first parasitic section 151 away from the third ground section G3 and extends along a direction parallel to the first side portion 116 away from the end portion 115.

Figure 5:
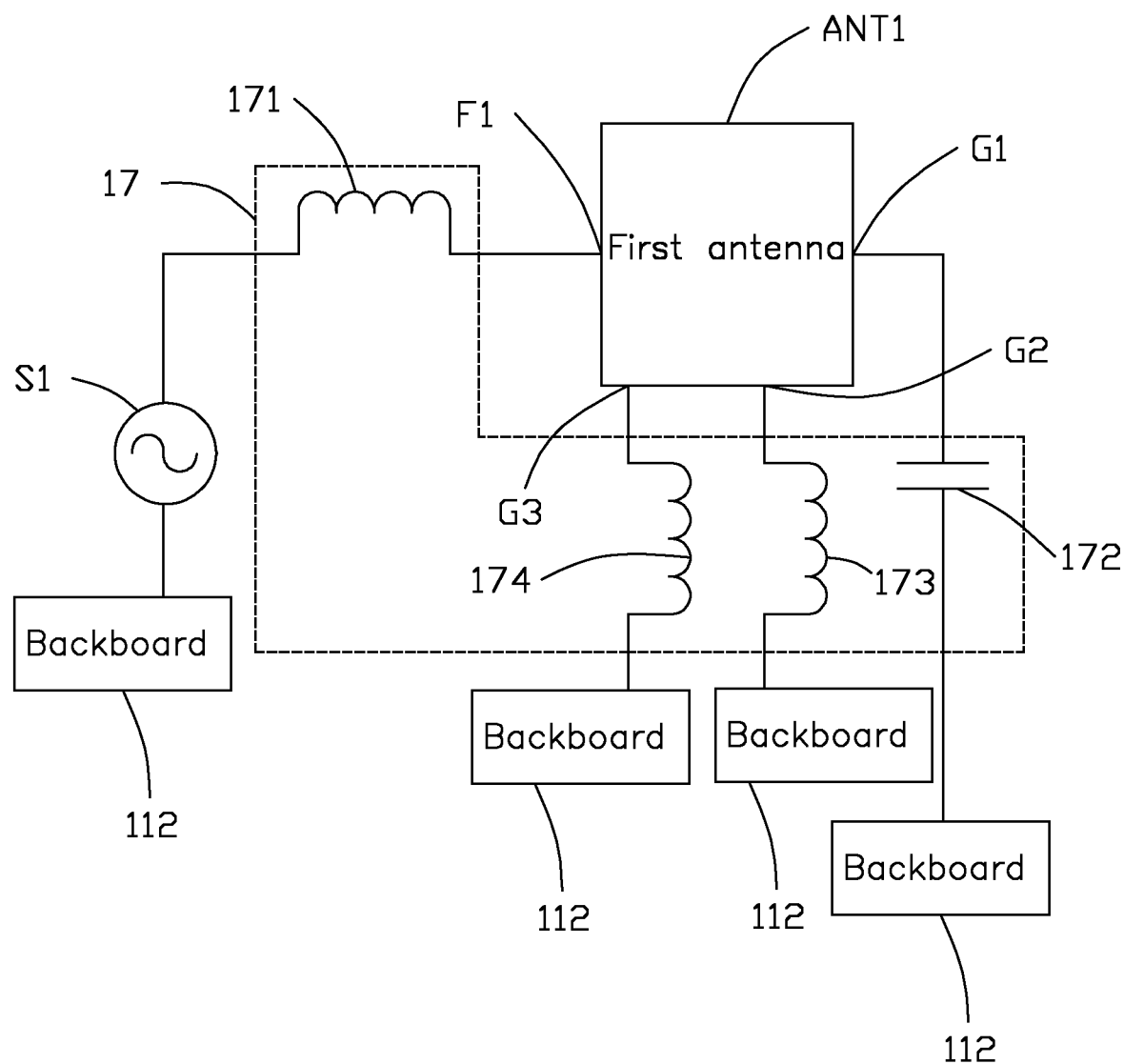
FIG. 5 is a circuit diagram of a matching circuit of the antenna structure of FIG. 1.

In FIG. 4 and FIG. 5, in this exemplary embodiment, the first antenna section A1, the first ground portion 12, the second ground portion 13, the coupling portion 14, and the parasitic portion 15 cooperatively form a first antenna ANT1 to activate a first operation mode for generating radiation signals in a first frequency band. In this exemplary embodiment, the first operation mode is LTE-A middle and high frequency operation modes. The first frequency band is a frequency band of about 1710-2690 MHz.

In FIG. 4, when the first feed source S1 supplies current, the current flows through the coupling portion 14, is coupled to the first antenna section A1 through the coupling portion 14 and flows through the first antenna section A1, and is grounded through the first ground portion 12 and the second ground portion 13. The coupling portion 14 and the first antenna section A1 cooperatively activate a middle frequency band of the first operation mode through a method of a quarter of a wavelength, that is, 1710-2300 MHz. The coupling portion 14 and a portion of the first antenna section A1 further activate a first high frequency band of the first operation mode through a method of a quarter of a wavelength, that is, 2300-2400 MHz (e.g., path I1).

When the first feed source S1 supplies current, the current flows through the coupling portion 14, is coupled to the parasitic portion 15 through the coupling portion 14, and is grounded through the third ground section G3 of the parasitic portion 15 (e.g., path I2). Then the parasitic portion 15 activates a second high frequency band of the first operation mode through a method of a quarter of a wavelength, that is, 2500-2690 MHz. In this exemplary embodiment, the parasitic portion 15 mainly improves a bandwidth of the first antenna ANT1 in a high frequency band.

In FIG. 2, the radiating portion 16 is positioned between the second electronic element 203 and the second side portion 117. The radiating portion 16 includes a second feed section F2, a fourth ground section G4, a first radiating section 161, and a second radiating section 163. The second feed section F2 is substantially rectangular and is positioned on a plane perpendicular to the plane of the backboard 112. The second feed section F2 is positioned adjacent to the second side portion 117. One end of the second feed section F2 is electrically connected to the second feed source S2. Another end of the second feed section F2 is electrically connected to the first radiating section 161 to feed current to the radiating portion 16.

The fourth ground section G4 is substantially rectangular and is positioned on a plane perpendicular to the plane of the backboard 112. The fourth ground section G4 is positioned between the second feed section F2 and the second electronic element 203. One end of the fourth ground section G4 is electrically connected to the backboard 112 to be grounded. Another end of the fourth ground section G4 is electrically connected to the first radiating section 161 to ground the radiating portion 16.

The first radiating section 161 is substantially rectangular and is positioned on a plane parallel to the plane of the backboard 112. One end of the first radiating section 161 is perpendicularly connected to the end of the second feed section F2 away from the second feed source S2. Another end of the first radiating section 161 extends along a direction parallel to the end portion 115 towards the first side portion 116 and then perpendicularly connects to the end of the fourth ground section G4 away from the backboard 112. The extension of the first radiating section 161 continues until the first radiating section 161 crosses the fourth ground section G4 and extends along a direction parallel to the end portion 115 towards the first side portion 116.

The second radiating section 163 is substantially rectangular and is coplanar with the first radiating section 161. One end of the second radiating section 163 is perpendicularly connected to the end of the first radiating section 161 away from the second feed section F2. Another end of the second radiating section 163 extends along a direction parallel to the first side portion 116 towards the end portion 115. The extension continues until the second radiating section 163 is electrically connected to the side of the second antenna section A2 adjacent to the second gap 124.

Figure 6:
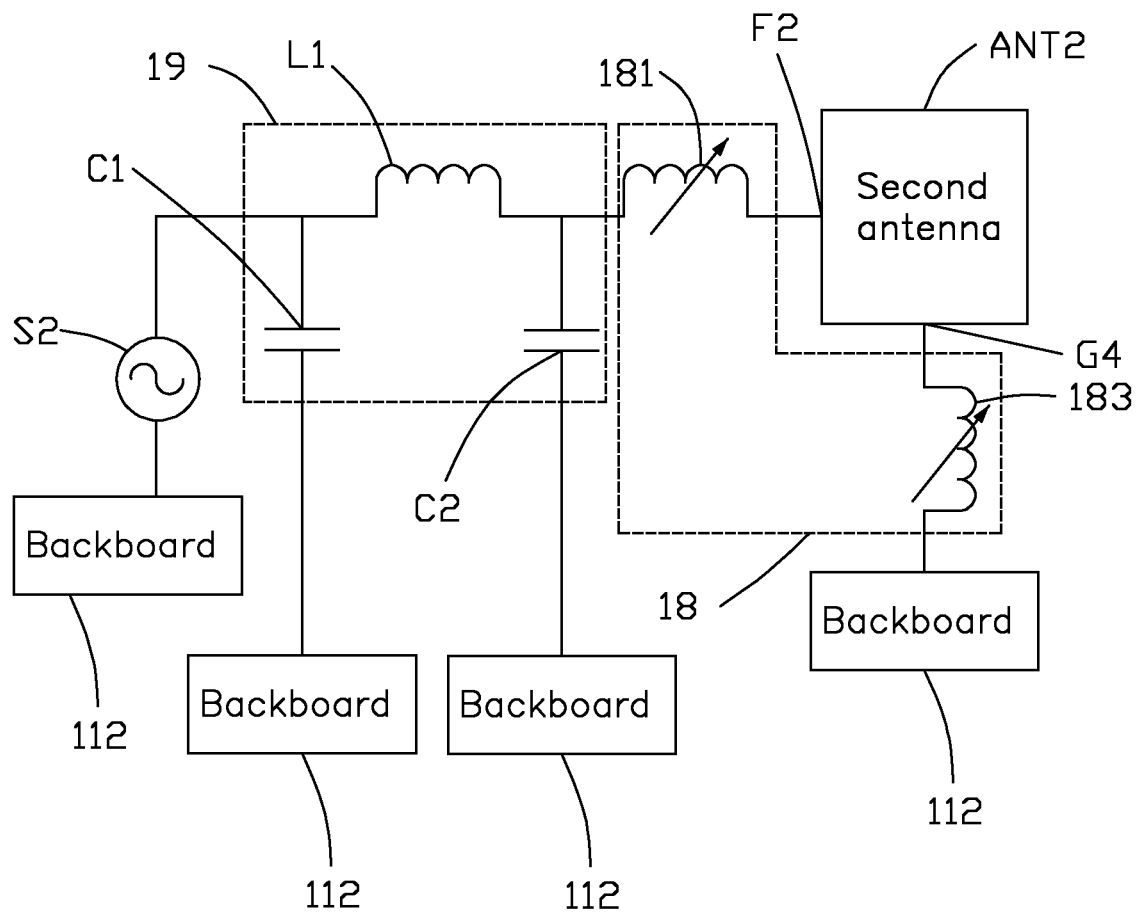
FIG. 6 is a circuit diagram of a switching circuit and a filtering circuit of the antenna structure of FIG. 1.

In FIGS. 4 and 6, in this exemplary embodiment, the radiating portion 16 and the second antenna section A2 cooperatively form a second antenna ANT2 to activate a second operation mode for generating radiation signals in a second frequency band. In this exemplary embodiment, a frequency of the first frequency band is higher than a frequency of the second frequency band. The second antenna ANT2 is an inverted-F antenna. The second operation mode is a LTE-A low frequency operation mode. The second frequency band is a frequency band of about 700-960 MHz.

In FIG. 4, when the second feed source S2 supplies current, the current flows through the radiating portion 16, and then flows to the second antenna section A2, and is grounded through the fourth ground section G4 of the radiating portion 16 (e.g., path 13) to activate the low frequency operation mode and for generating radiation signal in a frequency band of about 700-960 MHz.

In FIG. 5, the first antenna ANT1 forms a four-port network. The four ports include the first ground section G1, the second ground section G2, the third ground section G3, and the first feed section F1. Each port includes one corresponding matching element. These matching elements cooperatively form a matching circuit 17 to effectively adjust and optimize a bandwidth and an impedance matching of the first antenna ANT1. In this exemplary embodiment, the matching circuit 17 includes a first matching element 171, a second matching element 172, a third matching element 173, and a fourth matching element 174. One end of the first matching element 171 is electrically connected to the first feed section F1. Another end of the first matching element 171 is electrically connected to the first feed source S1. Another end of the first feed source S1 is electrically connected to the backboard 112 to be grounded. One end of the second matching element 172 is electrically connected to the first ground section G1. Another end of the second matching element 172 is electrically connected to the backboard 112 to be grounded. One end of the third matching element 173 is electrically connected to the second ground section G2. Another end of the third matching element 173 is electrically connected to the backboard 112 to be grounded. One end of the fourth matching element 174 is electrically connected to the third ground section G3. Another end of the fourth matching element 174 is electrically connected to the backboard 112 to be grounded.

In this exemplary embodiment, the first matching element 171, the third matching element 173, and the fourth matching element 174 are all inductors. The second matching element 172 is a capacitor. In other exemplary embodiments, the first matching element 171, the second matching element 172, the third matching element 173, and the fourth matching element 174 are not limited to being inductors and capacitors, and can be other matching components.

In FIG. 6, the second antenna ANT2 forms a two-port network. The two ports include the second feed section F2 and the fourth ground section G4. Each port includes one corresponding switching element. These switching elements cooperatively form a switching circuit 18 to effectively adjust a low frequency operation mode of the second antenna ANT2. In this exemplary embodiment, the switching circuit 18 includes a first switching element 181 and a second switching element 183. One end of the first switching element 181 is electrically connected to the second feed section F2. Another end of the first switching element 181 is electrically connected to the second feed source S2. Another end of the second feed source S2 is electrically connected to the backboard 112 to be grounded. One end of the second switching element 183 is electrically connected to the fourth ground section G4. Another end of the second switching element 183 is electrically connected to the backboard 112 to be grounded.

In this exemplary embodiment, the first switching element 181 and the second switching element 183 are both adjustable inductors, being switchable among a plurality of inductors of predetermined values. Then the switching circuit 18 forms a double-switching circuit through the adjustable first switching element 181 and the second switching element 183, and the low frequency operation mode of the second antenna ANT2 can be adjusted. In other exemplary embodiments, the first switching element 181 and the second switching element 183 are not limited to being adjustable inductors and can be other switching components. For example, the first switching element 181 and the second switching element 183 can be switched among a plurality of resistors of predetermined values.

In other exemplary embodiments, the second antenna ANT2 further includes a filtering circuit 19. The filtering circuit 19 connects between the first switching element 181 and the second feed source S2 to suppress a high frequency resonance mode and to improve isolation between the first antenna ANT1 and the second antenna ANT2.

In this exemplary embodiment, the filtering circuit 19 includes an inductor L1, a first capacitor C1, and a second capacitor C2. The inductor L1 is electrically connected in series between the first switching element 181 and the second feed source S2. One end of the first capacitor C1 is electrically connected to a junction of the inductor L1 and the second feed source S2. Another end of the first capacitor C1 is electrically connected to the backboard 112 to be grounded. One end of the second capacitor C2 is electrically connected to a junction of the inductor L1 and the first switching element 181. Another end of the second capacitor C2 is electrically connected to the backboard 112 to be grounded. The inductor L1, the first capacitor C1, and the second capacitor C2 cooperatively form a pie shaped filtering circuit. In this exemplary embodiment, an inductance value of the inductor L1 is about 9.1 nH. A capacitance value of the first capacitor C1 is about 4 pF. A capacitance value of the second capacitor C2 is about 4 pF.

In this exemplary embodiment, the backboard 112 serves as the ground of the antenna structure 100 and the wireless communication device 200. In other exemplary embodiments, the wireless communication device 200 further includes a shielding mask or a middle frame (not shown). The shielding mask is positioned at the surface of the display 201 towards the backboard 112 and shields against electromagnetic interference. The middle frame is positioned at the surface of the display 201 towards the backboard 112 and supports the display 201. The shielding mask or the middle frame is made of metallic material. The shielding mask or the middle frame can be electrically connected to the backboard 112 to serve as the ground of the antenna structure 100 and the wireless communication device 200. At each ground point, the backboard 112 can be replaced by the shielding mask or the middle frame to ground the antenna structure 100 or the wireless communication device 200. In other exemplary embodiments, a main printed circuit board (not shown) of the wireless communication device 200 may include a ground plane. At each ground point, the backboard 112 can be replaced by the ground plane to ground the antenna structure 100 or the wireless communication device 200. The ground plane can be electrically connected to the shielding mask, the middle frame, or the backboard 112.

Figure 7:
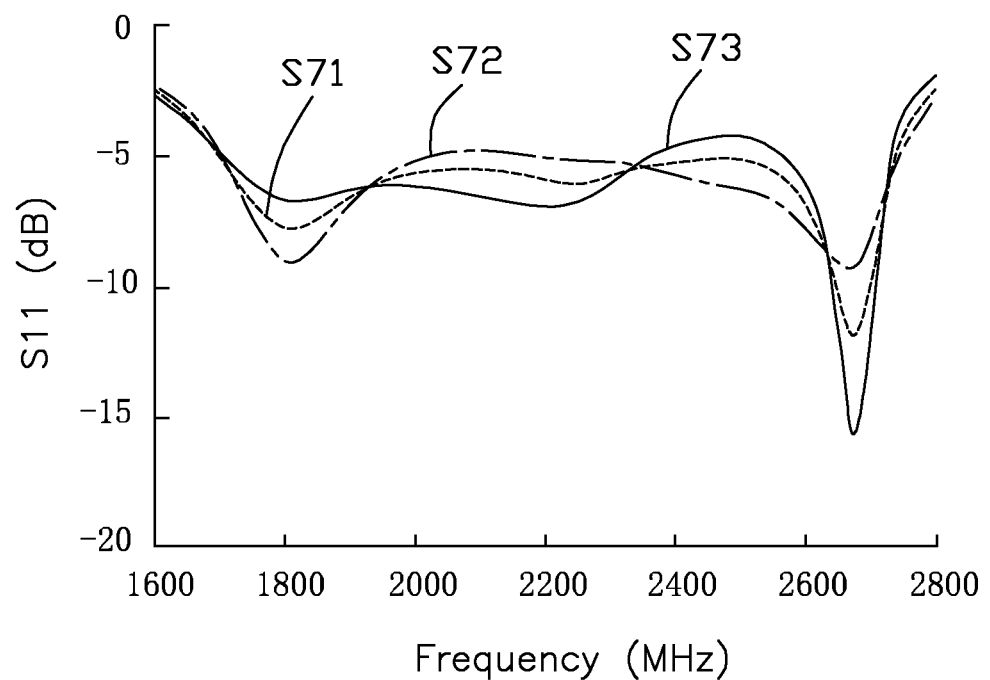
FIG. 7 is a scattering parameter graph when a first matching element of the antenna structure of FIG. 5 being different inductors.

FIG. 7 illustrates a scattering parameter graph of the first antenna ANT1 when an inductor, as the first matching element 171, has different inductance values. Curve S71 illustrates a scattering parameter of the first antenna ANT1 when the first matching element 171 is an inductor of about 2.1 nH. Curve S72 illustrates a scattering parameter of the first antenna ANT1 when the first matching element 171 is an inductor of about 1.5 nH. Curve S73 illustrates a scattering parameter of the first antenna ANT1 when the first matching element 171 is an inductor of about 2.7 nH.

Figure 8:
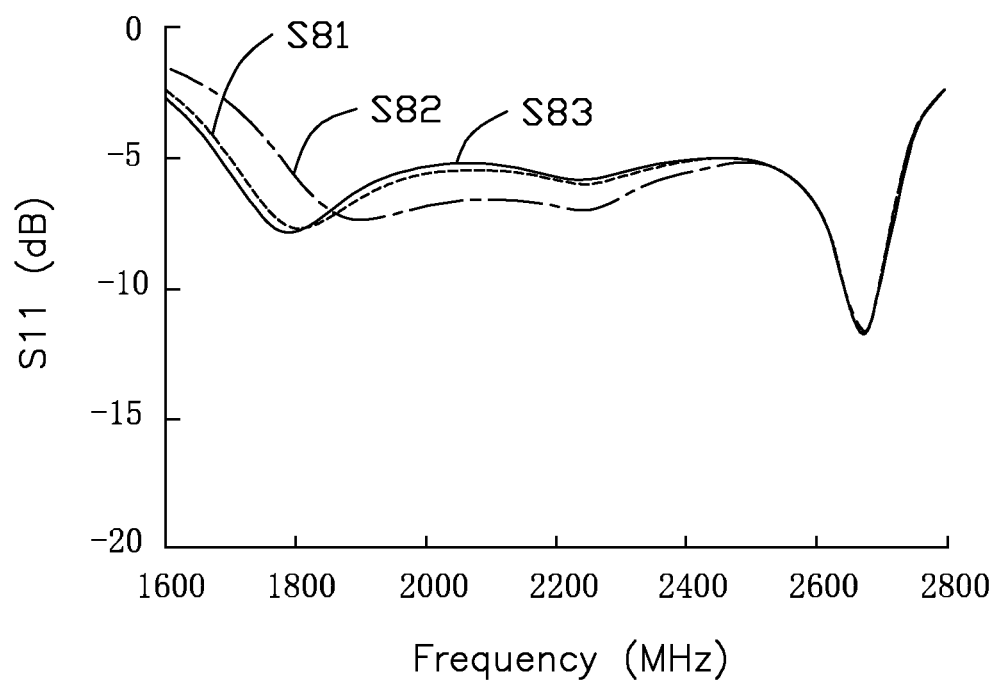
FIG. 8 is a scattering parameter graph when a second matching element of the antenna structure of FIG. 5 being different capacitors.

FIG. 8 illustrates a scattering parameter graph of the first antenna ANT1 when a capacitor, as the second matching element 172, has different capacitance values. Curve S81 illustrates a scattering parameter of the first antenna ANT1 when the second matching element 172 is a capacitor of about 30 pF. Curve S82 illustrates a scattering parameter of the first antenna ANT1 when the second matching element 172 is a capacitor of about 10 pF. Curve S83 illustrates a scattering parameter of the first antenna ANT1 when the second matching element 172 is a capacitor of about 50 pF.

Figure 9:
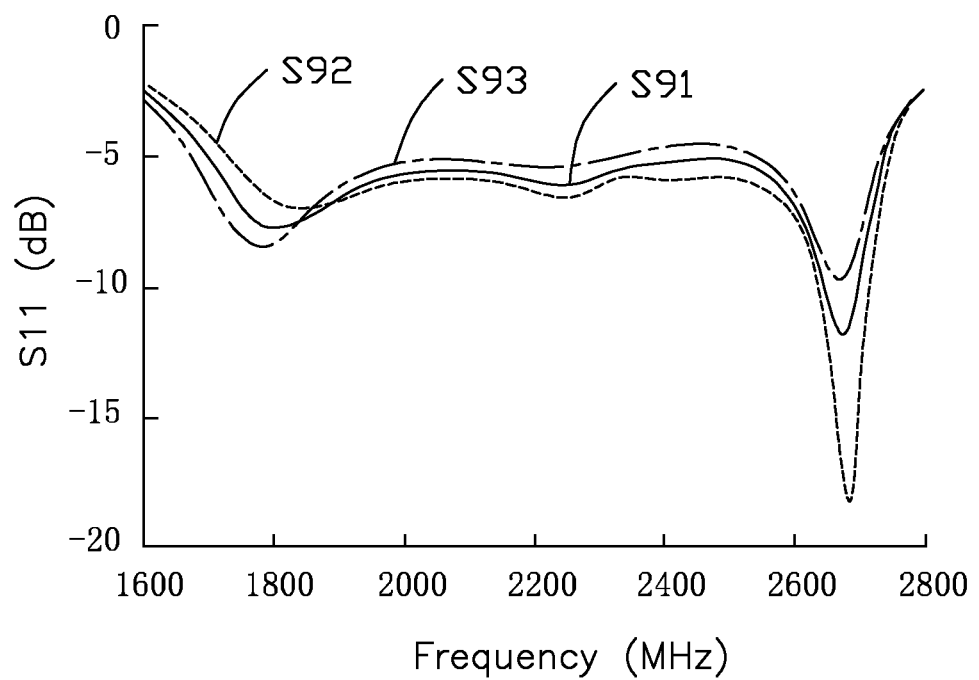
FIG. 9 is a scattering parameter graph when a third matching element of the antenna structure of FIG. 5 being different inductors.

FIG. 9 illustrates a scattering parameter graph of the first antenna ANT1 when an inductor, as the third matching element 173, has different inductance values. Curve S91 illustrates a scattering parameter of the first antenna ANT1 when the third matching element 173 is an inductor of about 8.2 nH. Curve S92 illustrates a scattering parameter of the first antenna ANT1 when the third matching element 173 is an inductor of about 6.2 nH. Curve S93 illustrates a scattering parameter of the first antenna ANT1 when the third matching element 173 is an inductor of about 10.2 nH.

Figure 10:
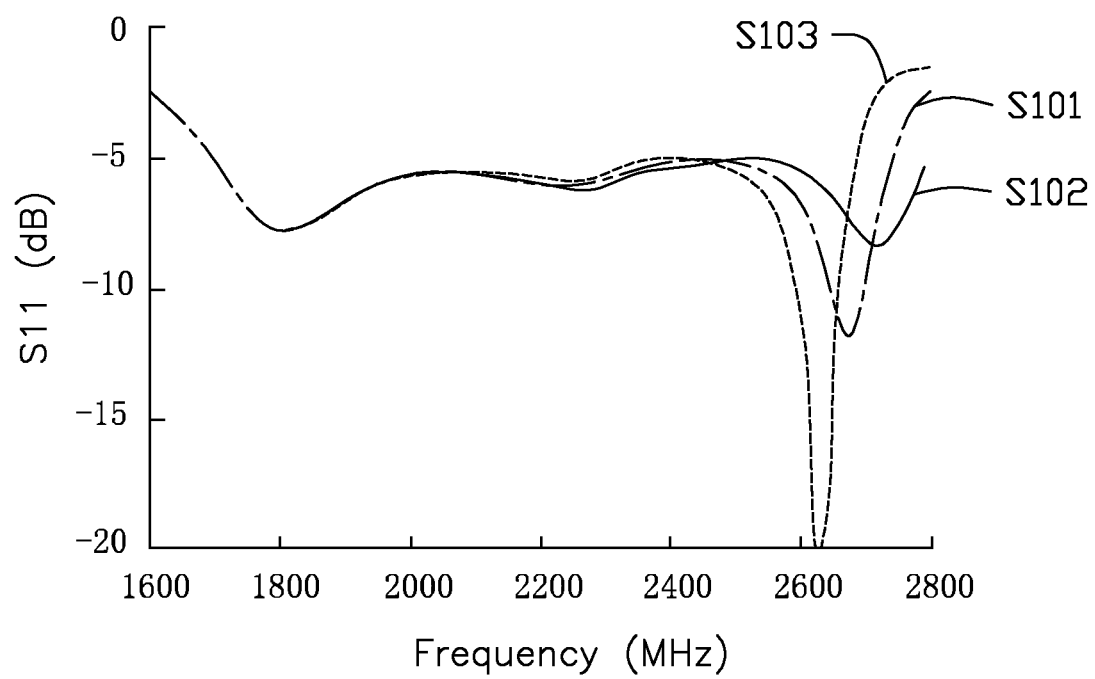
FIG. 10 is a scattering parameter graph when a fourth matching element of the antenna structure of FIG. 5 being different inductors.

FIG. 10 illustrates a scattering parameter graph of the first antenna ANT1 when an inductor, as the fourth matching element 174, has different inductance values. Curve S101 illustrates a scattering parameter of the first antenna ANT1 when the fourth matching element 174 is an inductor of about 3.6 nH. Curve S102 illustrates a scattering parameter of the first antenna ANT1 when the fourth matching element 174 is an inductor of about 3.3 nH. Curve S103 illustrates a scattering parameter of the first antenna ANT1 when the fourth matching element 174 is an inductor of about 3.9 nH.

Referring to FIG. 7 to FIG. 19, the second matching element 172 and the third matching element 173 mainly adjust a middle frequency band of the first operation mode, e.g., 1710-2300 MHz. The first matching element 171 adjusts a first high frequency band of the first operation mode, e.g., 2300-2400 MHz. The fourth matching element 174 adjusts a second high frequency band of the first operation mode, e.g., 2500-2690 MHz.

Figure 11:
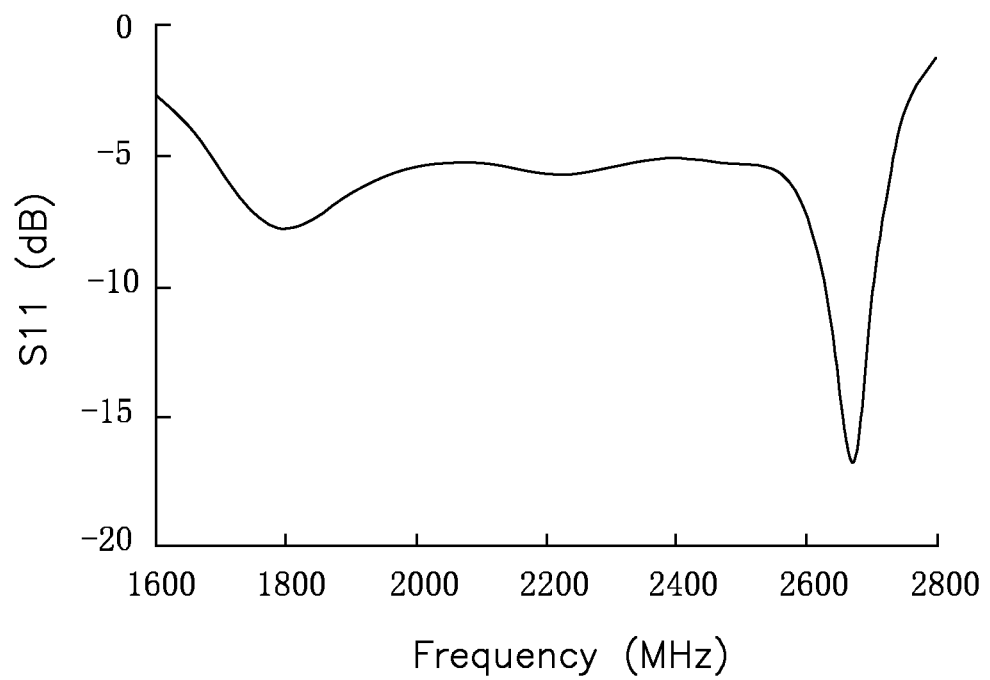
FIG. 11 is a scattering parameter graph when the matching circuit of the antenna structure of FIG. 5 including specific inductors and specific capacitors.

FIG. 11 illustrates a scattering parameter graph of the first antenna ANT1 when the first matching element 171 is an inductor of about 2.1 nH, the second matching element 172 is a capacitor of about 30 pF, the third matching element 173 is an inductor of about 8.2 nH, and the fourth matching element 174 is an inductor of about 3.6 nH.

Figure 12:
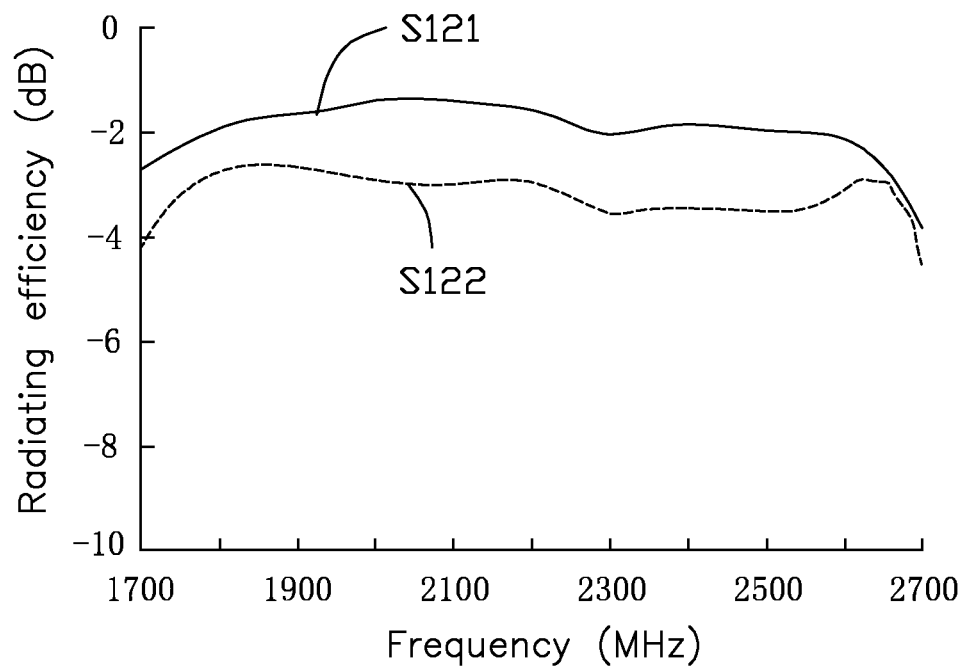
FIG. 12 is a radiating efficiency graph when the matching circuit of the antenna structure of FIG. 5 including specific inductors and specific capacitors.

FIG. 12 illustrates a radiating efficiency graph of the first antenna ANT1 when the first matching element 171 is an inductor of about 2.1 nH, the second matching element 172 is a capacitor of about 30 pF, the third matching element 173 is an inductor of about 8.2 nH, and the fourth matching element 174 is an inductor of about 3.6 nH. Curve S121 illustrates a radiating efficiency of the first antenna ANT1. Curve S122 illustrates a total radiating efficiency of the first antenna ANT1. The first antenna ANT1 can operate at middle and high frequency bands, for example, 1710-2690 MHz. When the first antenna ANT1 operates at these frequency bands, a radiating efficiency of the first antenna ANT1 is bigger than −3 dB, and satisfies a design of the antenna.

Figure 13:
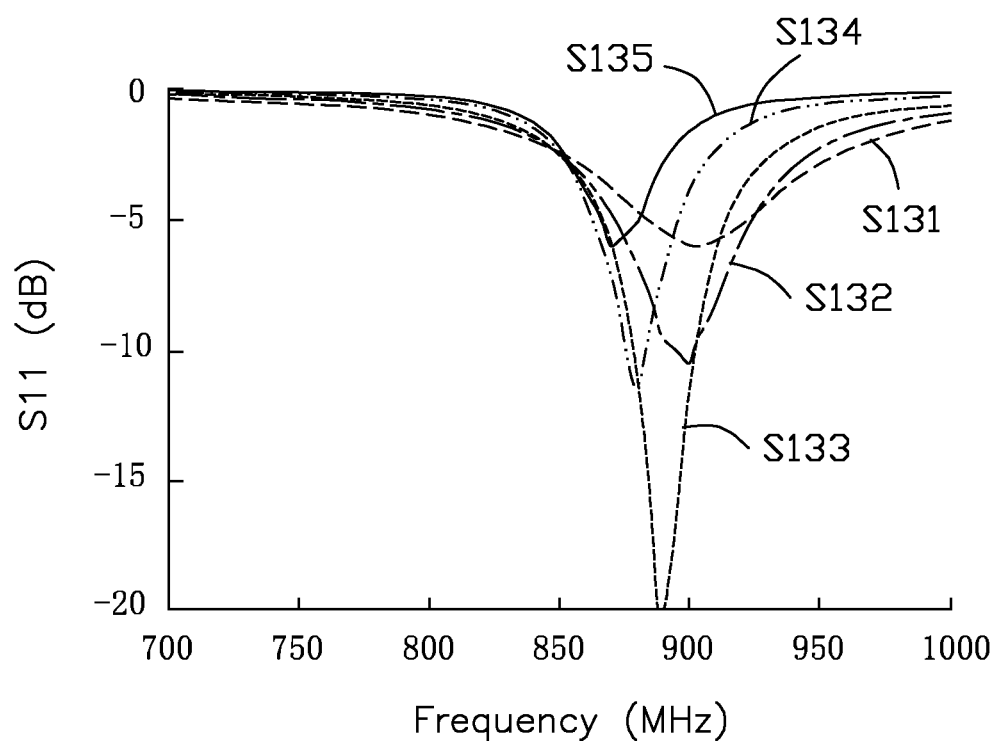
FIG. 13 is a scattering parameter graph when the first switching element of the antenna structure of FIG. 6 being different inductors and the second switching element being an inductor of about 5 nH.

FIG. 13 illustrates a scattering parameter graph of the second antenna ANT2 when an inductor, as the first switching element 181, has different inductance values and the second switching element 181 is an inductor of about 5 nH. Curve S131 illustrates a scattering parameter of the second antenna ANT2 when the first switching element 181 is at a short-circuit state and the second switching element 181 is an inductor of about 5 nH. Curve S132 illustrates a scattering parameter of the second antenna ANT2 when the first switching element 181 is an inductor of about 5 nH and the second switching element 181 is an inductor of about 5 nH. Curve S133 illustrates a scattering parameter of the second antenna ANT2 when the first switching element 181 is an inductor of about 10 nH and the second switching element 181 is an inductor of about 5 nH. Curve S134 illustrates a scattering parameter of the second antenna ANT2 when the first switching element 181 is an inductor of about 20 nH and the second switching element 181 is an inductor of about 5 nH. Curve S135 illustrates a scattering parameter of the second antenna ANT2, when the first switching element 181 is an inductor of about 30 nH and the second switching element 181 is an inductor of about 5 nH.

Figure 14:
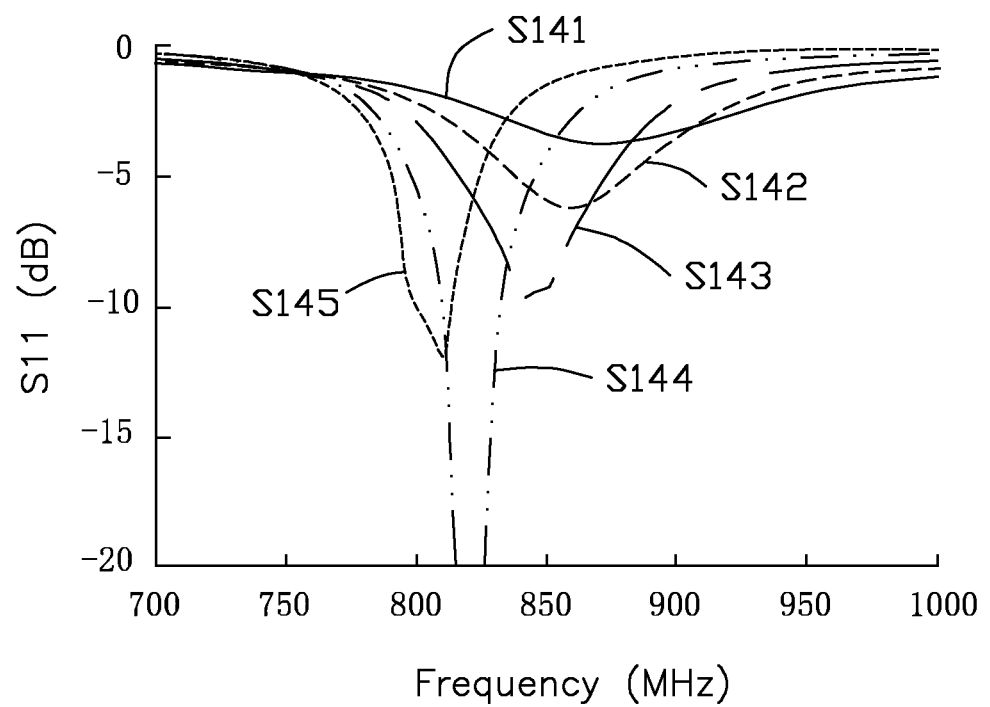
FIG. 14 is a scattering parameter graph when the first switching element of the antenna structure of FIG. 6 being different inductors and the second switching element being an inductor of about 10 nH.

FIG. 14 illustrates a scattering parameter graph of the second antenna ANT2 when an inductor, as the first switching element 181, has different inductance values and the second switching element 181 is an inductor of about 10 nH. Curve S141 illustrates a scattering parameter of the second antenna ANT2 when the first switching element 181 is at a short-circuit state and the second switching element 181 is an inductor of about 10 nH. Curve S142 illustrates a scattering parameter of the second antenna ANT2 when the first switching element 181 is an inductor of about 5 nH and the second switching element 181 is an inductor of about 10 nH. Curve S143 illustrates a scattering parameter of the second antenna ANT2 when the first switching element 181 is an inductor of about 10 nH and the second switching element 181 is an inductor of about 10 nH. Curve S144 illustrates a scattering parameter of the second antenna ANT2 when the first switching element 181 is an inductor of about 20 nH and the second switching element 181 is an inductor of about 10 nH. Curve S145 illustrates a scattering parameter of the second antenna ANT2 when the first switching element 181 is an inductor of about 30 nH and the second switching element 181 is an inductor of about 10 nH.

Figure 15:
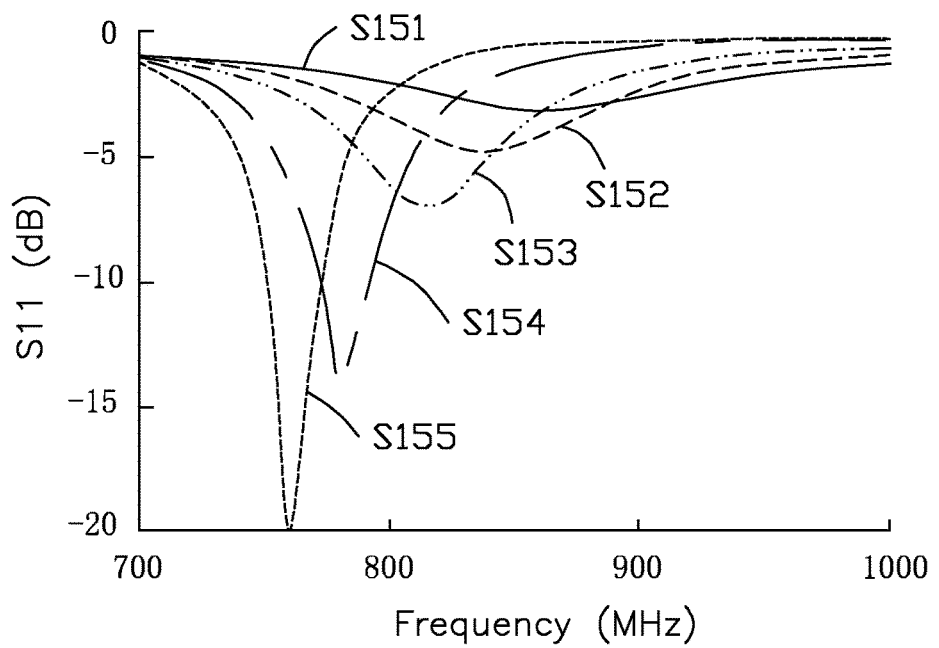
FIG. 15 is a scattering parameter graph when the first switching element of the antenna structure of FIG. 6 being different inductors and the second switching element being an inductor of about 15 nH.

FIG. 15 illustrates a scattering parameter graph of the second antenna ANT2 when an inductor, as the first switching element 181, has different inductance values and the second switching element 181 is an inductor of about 15 nH. Curve S151 illustrates a scattering parameter of the second antenna ANT2 when the first switching element 181 is at a short-circuit state and the second switching element 181 is an inductor of about 15 nH. Curve S152 illustrates a scattering parameter of the second antenna ANT2 when the first switching element 181 is an inductor of about 5 nH and the second switching element 181 is an inductor of about 15 nH. Curve S153 illustrates a scattering parameter of the second antenna ANT2 when the first switching element 181 is an inductor of about 10 nH and the second switching element 181 is an inductor of about 15 nH. Curve S154 illustrates a scattering parameter of the second antenna ANT2 when the first switching element 181 is an inductor of about 20 nH and the second switching element 181 is an inductor of about 15 nH. Curve S155 illustrates a scattering parameter of the second antenna ANT2 when the first switching element 181 is an inductor of about 30 nH and the second switching element 181 is an inductor of about 15 nH.

In FIGS. 13-15, a frequency band of the second antenna ANT2 is adjusted by the second switching element 183. A frequency and an impedance matching of the second antenna ANT2 can be adjusted by the first switching element 181.

The following table 1 illustrates an operating frequency band of the second antenna ANT2 when the switching circuit 18 is of different configurations.

TABLE 1

| | Switching Circuit 18 | |
|---|---|---|
| Operating Frequency Band | First Switching Element 181 | Second Switching Element 183 |
| LTE-A Band 17 (704-746 MHz) | 24 nH | 24 nH |
| LTE-A Band 13 (746-787 MHz) | 24 nH | 16 nH |
| LTE-A Band 5 (824-894 MHz) | 10 nH | 7.5 nH |
| LTE-A Band 8 (880-960 MHz) | 4 nH | 4 nH |

Figure 16:
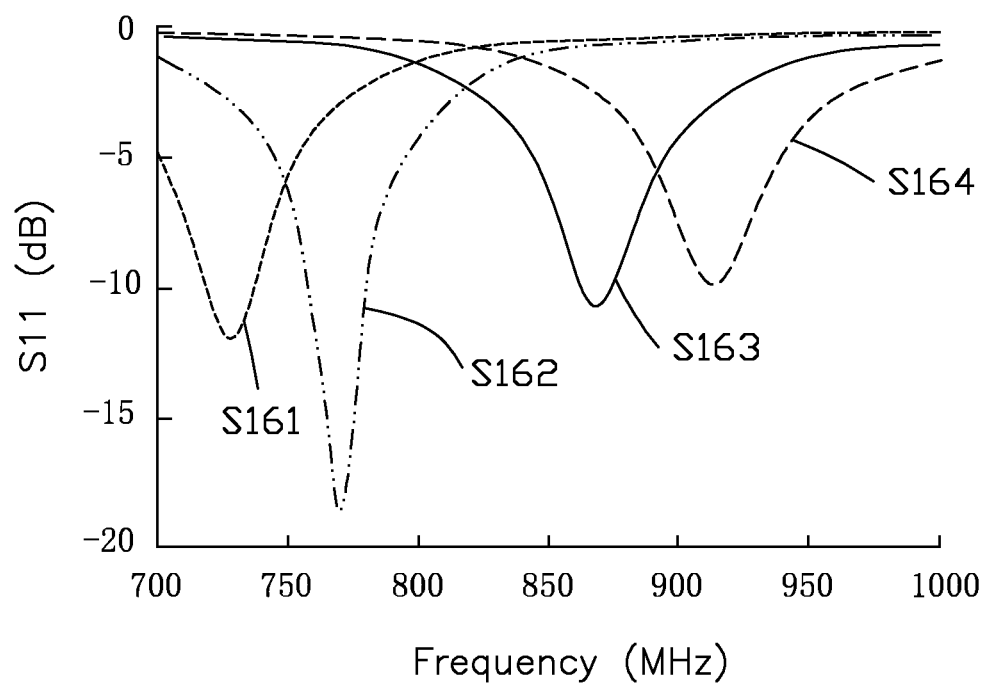
FIG. 16 is a scattering parameter graph of a second antenna of the antenna structure of FIG. 6.

FIG. 16 illustrates a scattering parameter graph of the second antenna ANT2. Curve S161 illustrates a scattering parameter when the second antenna ANT2 operates at a frequency band of about 704-746 MHz (LTE-A Band 17). Curve S162 illustrates a scattering parameter when the second antenna ANT2 operates at a frequency band of about 746-787 MHz (LTE-A Band 13). Curve S163 illustrates a scattering parameter when the second antenna ANT2 operates at a frequency band of about 824-894 MHz (LTE-A Band 5). Curve S164 illustrates a scattering parameter when the second antenna ANT2 operates at a frequency band of about 880-960 MHz (LTE-A Band 8).

Figure 17:
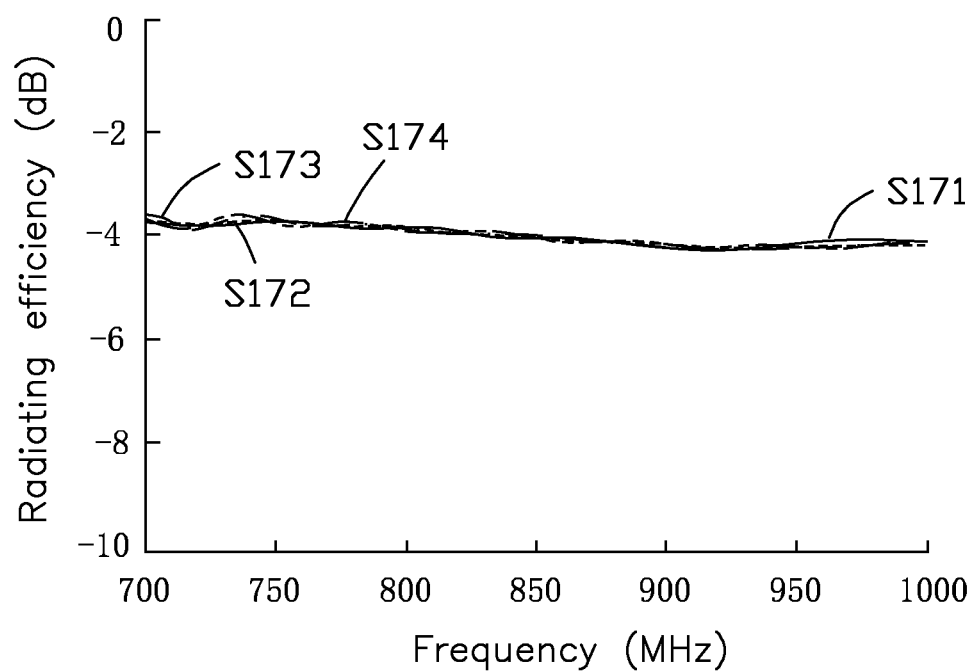
FIG. 17 is a radiating efficiency graph of a second antenna of the antenna structure of FIG. 6.

FIG. 17 illustrates a radiating efficiency graph of the second antenna ANT2. Curve S171 illustrates a radiating efficiency when the second antenna ANT2 operates at a frequency band of about 704-746 MHz (LTE-A Band 17). Curve S172 illustrates a radiating efficiency when the second antenna ANT2 operates at a frequency band of about 746-787 MHz (LTE-A Band 13). Curve S173 illustrates a radiating efficiency when the second antenna ANT2 operates at a frequency band of about 824-894 MHz (LTE-A Band 5). Curve S174 illustrates a radiating efficiency when the second antenna ANT2 operates at a frequency band of about 880-960 MHz (LTE-A Band 8).

Figure 18:
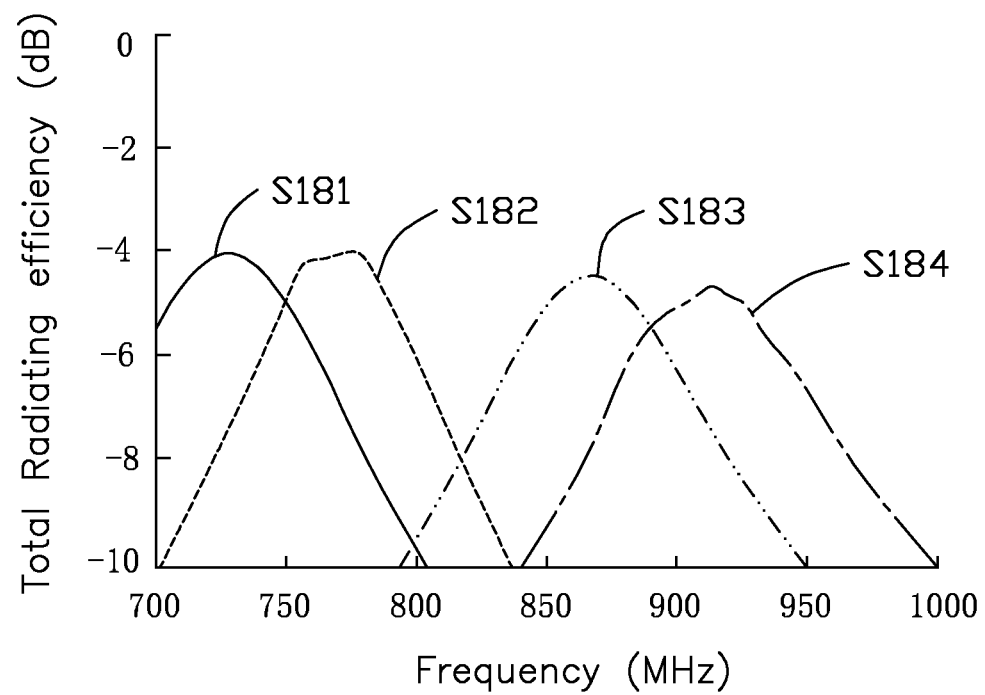
FIG. 18 is a total radiating efficiency graph of a second antenna of the antenna structure of FIG. 6.

FIG. 18 illustrates a total radiating efficiency graph of the second antenna ANT2. Curve S181 illustrates a total radiating efficiency when the second antenna ANT2 operates at a frequency band of about 704-746 MHz (LTE-A Band 17). Curve S182 illustrates a total radiating efficiency when the second antenna ANT2 operates at a frequency band of about 746-787 MHz (LTE-A Band 13). Curve S183 illustrates a total radiating efficiency when the second antenna ANT2 operates at a frequency band of about 824-894 MHz (LTE-A Band 5). Curve S184 illustrates a total radiating efficiency when the second antenna ANT2 operates at a frequency band of about 880-960 MHz (LTE-A Band 8).

In FIGS. 16-18, the second antenna ANT2 can operate at a low frequency band, for example, 700-960 MHz. When the second antenna ANT2 operates at the low frequency band, a radiating efficiency of the second antenna ANT2 is bigger than −5 dB, and satisfies a design of the antenna.

In other exemplary embodiments, the antenna structure 100 is not limited to defining only the first gap 123 and the second gap 124. That is, the antenna structure 100 is not limited to defining two gaps. The antenna structure 100 can also define one gap or a plurality of gaps, as long as the antenna structure 100 always includes the first antenna section A1 and the second antenna section A2.

As described above, the antenna structure 100 defines the slot 120, the first groove 121, the second groove 122, the first gap 123, and the second gap 124. The front frame 111 can be divided into at least the first antenna section A1 and the second antenna section A2. The antenna structure 100 further includes the coupling portion 14, the parasitic portion 15, and the radiating portion 16. The coupling portion 14, the parasitic portion 15, and the first antenna section A1 cooperatively form the first antenna ANT1 to generate radiation signals in middle and high frequency bands. The radiating portion 16 and the second antenna section A2 cooperatively form the second antenna ANT2 to generate radiation signals in a low frequency band. The wireless communication device 200 can use carrier aggregation (CA) technology of LTE-A, the first antenna ANT1, and the second antenna ANT2 to receive or send wireless signals at multiple frequency bands simultaneously.

In addition, the antenna structure 100 includes the housing 11. The first through hole 118, the second through hole 119, the slot 120, the first groove 121, the second groove 122, the first gap 123, and the second gap 124 of the housing 11 are all defined on the front frame 111 and the side frame 113 instead of the backboard 112. The backboard 112 forms an all-metal structure. That is, the backboard 112 does not define any other slot and/or gap and has good structural integrity and aesthetic quality.

Figure 19:
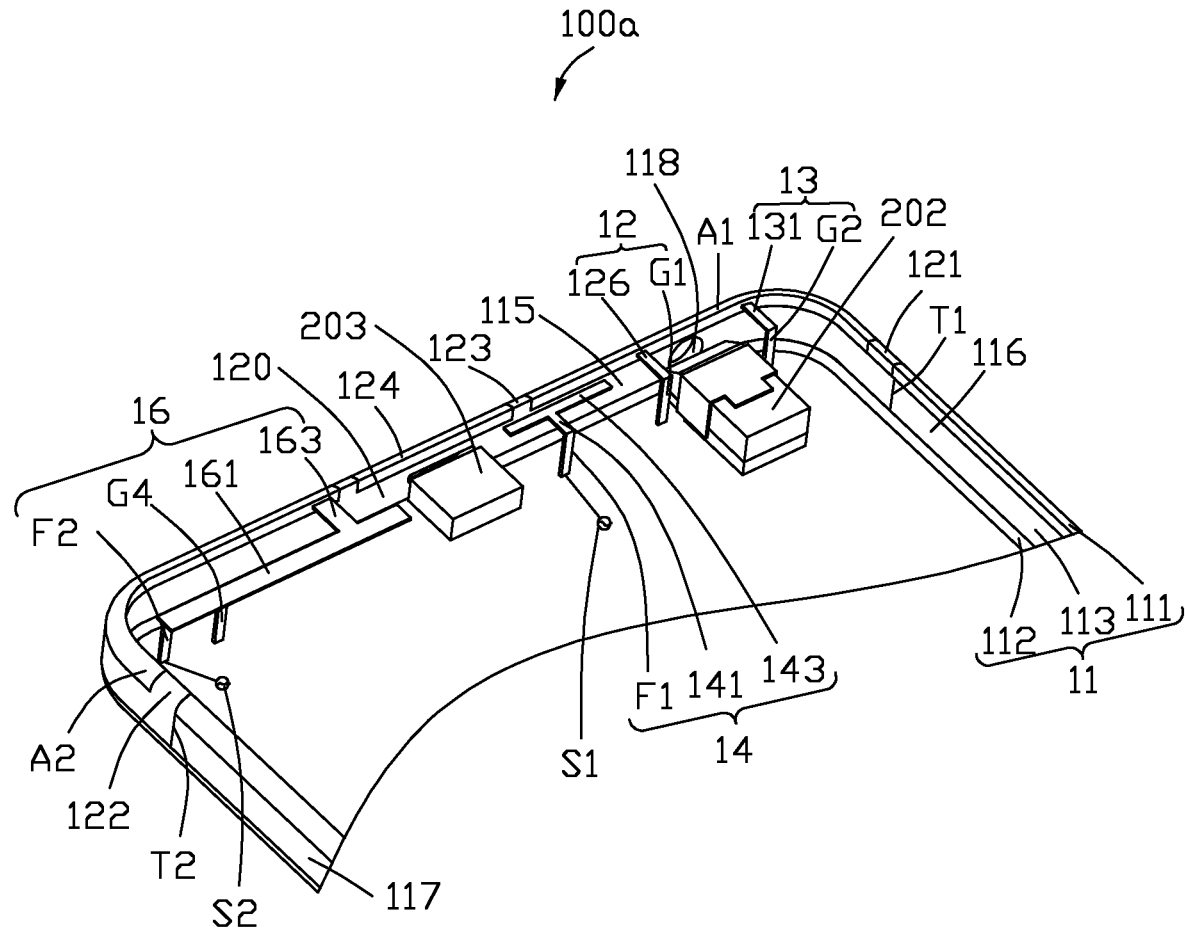
FIG. 19 is an isometric view of a second exemplary embodiment of the antenna structure.
Figure 20:
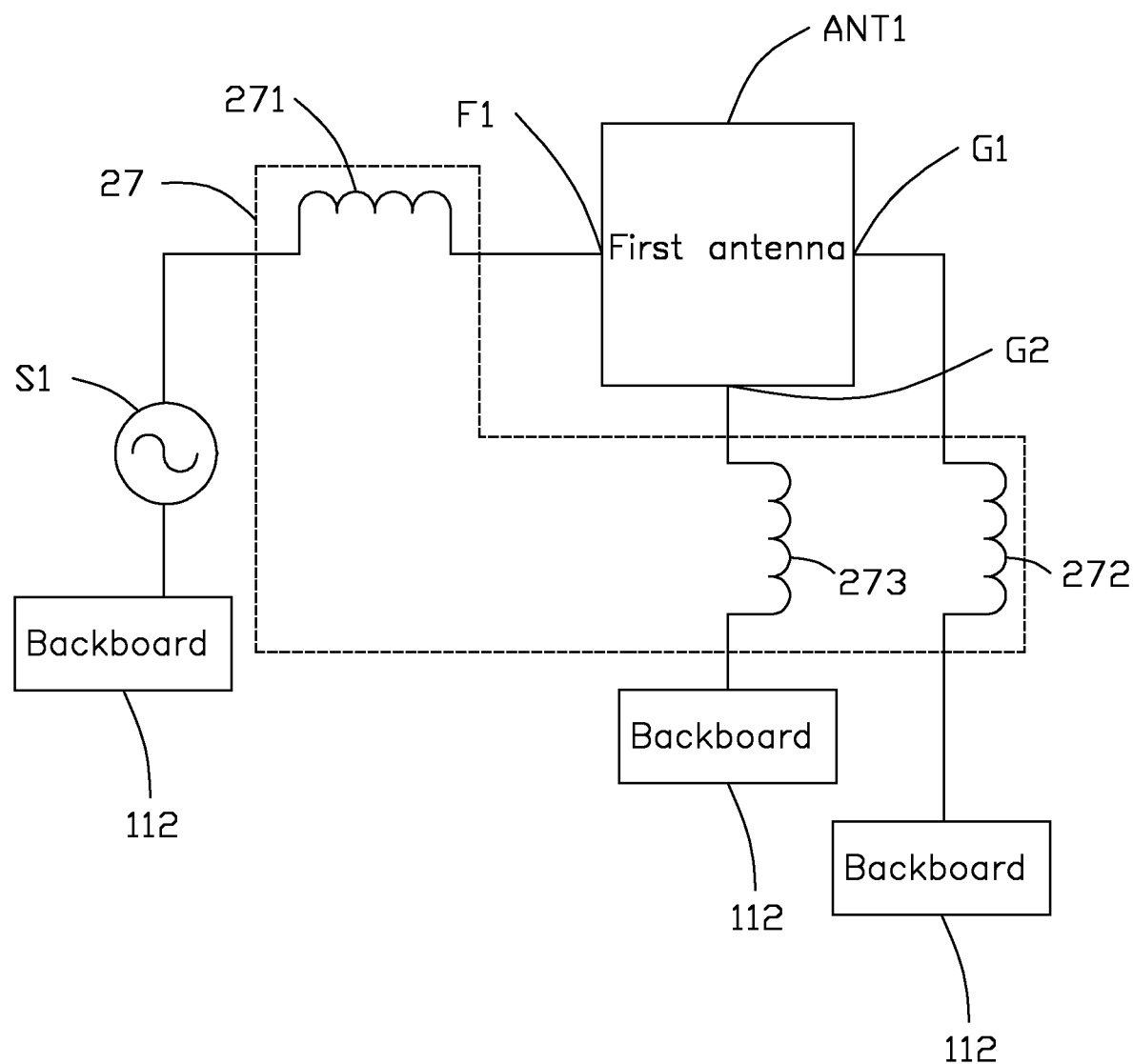
FIG. 20 is a circuit diagram of a matching circuit of the antenna structure of FIG. 19.
Figure 21:
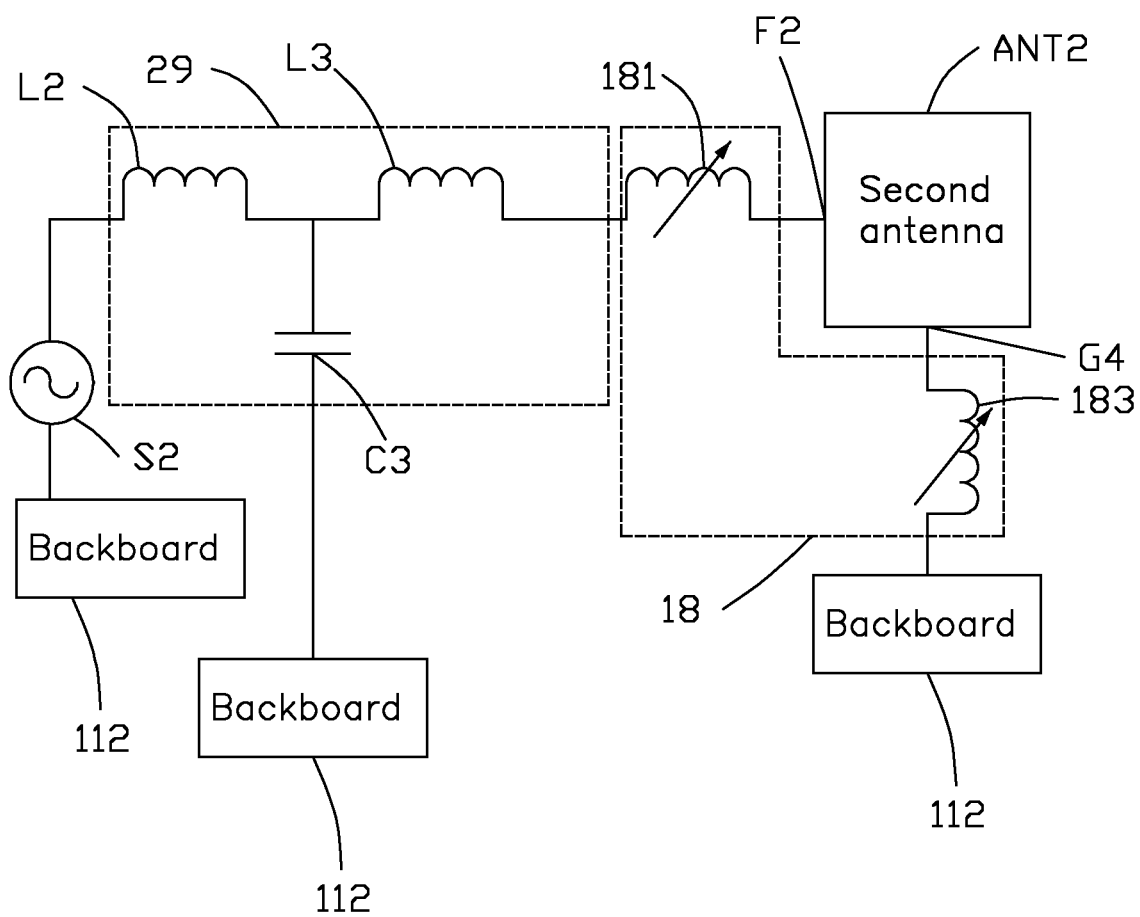
FIG. 21 is a circuit diagram of a switching circuit and a filtering circuit of the antenna structure of FIG. 19.

FIGS. 19-21 illustrate a second exemplary antenna structure 100a. The antenna structure 100a includes a housing 11, a first ground portion 12, a second ground portion 13, a coupling portion 14, a radiating portion 16, a first feed source S1, a second feed source S2, a switching circuit 18, a matching circuit 27, and a filtering circuit 29. The housing 11 includes a front frame 111, a backboard 112, and a side frame 113. The side frame 113 includes an end portion 115, a first side portion 116, and a second side portion 117. The side frame 113 defines a first through hole 118, a second through hole 119, and a slot 120. The front frame 111 defines a first groove 121, a second groove 122, a first gap 123, and a second gap 124. The housing 11 is divided into at least a first antenna section A1 and a second antenna section A2 spaced apart from the first antenna section A1 by the first groove 121, the second groove 122, the first gap 123, and the second gap 124.

In this exemplary embodiment, the antenna structure 100a differs from the antenna structure 100 in that a distance between the first gap 123 and the second gap 124 of the antenna structure 100a is larger than a distance between the first gap 123 and the second gap 124 of the antenna structure 100. In this exemplary embodiment, a distance between the first gap 123 and the second gap 124 of the antenna structure 100a is about 23.1 mm.

In FIG. 19 and FIG. 20, the antenna structure 100a further differs from the antenna structure 100 in that the antenna structure 100a does not include the parasitic portion 15. That is, the parasitic portion 15 is omitted. The first antenna ANT1 forms a three-port network and the matching circuit 27 does not include the fourth matching element 174. In this exemplary embodiment, the matching circuit 27 includes a first matching element 271, a second matching element 272, and a third matching element 273. The first matching element 271, the second matching element 272, and the third matching element 273 are all inductors. Inductance values of the first matching element 271, the second matching element 272, and the third matching element 273 are about 2.7 nH, 13 nH, and 0.8 nH, respectively.

In FIG. 21, the antenna structure 100a further differs from the antenna structure 100 in that structure of the filtering circuit 29 is different from a structure of the filtering circuit 19. The filtering circuit 29 includes a first inductor L2, a second inductor L3, and a capacitor C3. The first inductor L2 and second inductor L3 are connected in series between the first switching element 181 and the second feed source S2. One end of the capacitor C3 is electrically connected to a junction of the first inductor L2 and second inductor L3. Another end of the capacitor C3 is electrically connected to the backboard 112 to be grounded. The first inductor L2, the second inductor L3, and the capacitor C3 cooperatively form a T-shaped filtering structure. In this exemplary embodiment, an inductance value of the first inductor L2 is about 9.1 nH. An inductance value of the second inductor L3 is about 9.1 nH. A capacitance value of the capacitor C3 is about 3.3 pF.

The following table 2 illustrates an operating frequency band of the second antenna ANT2 when the switching circuit 18 of the antenna structure 100a has different configurations.

TABLE 2

| Operating Frequency Band | Switching Circuit 18 | |
| --- | --- | --- |
|  | First Switching Element 181 | Second Switching Element 183 |
| LTE-A Band 17 (704-746 MHz) | 52 nH | 28 nH |
| LTE-A Band 13 (746-787 MHz) | 48 nH | 23 nH |
| LTE-A Band 5 (824-894 MHz) | 29 nH | 17 nH |
| LTE-A Band 8 (880-960 MHz) | 22 nH | 13 nH |

Figure 22:
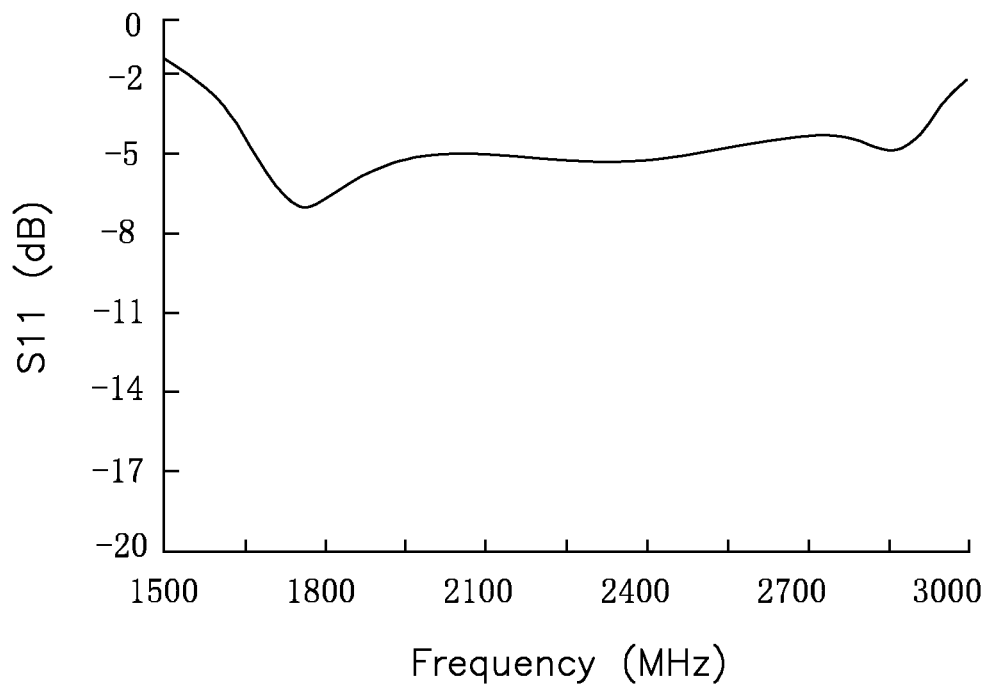
FIG. 22 is a scattering parameter graph of a first antenna of the antenna structure of FIG. 19.
Figure 23:
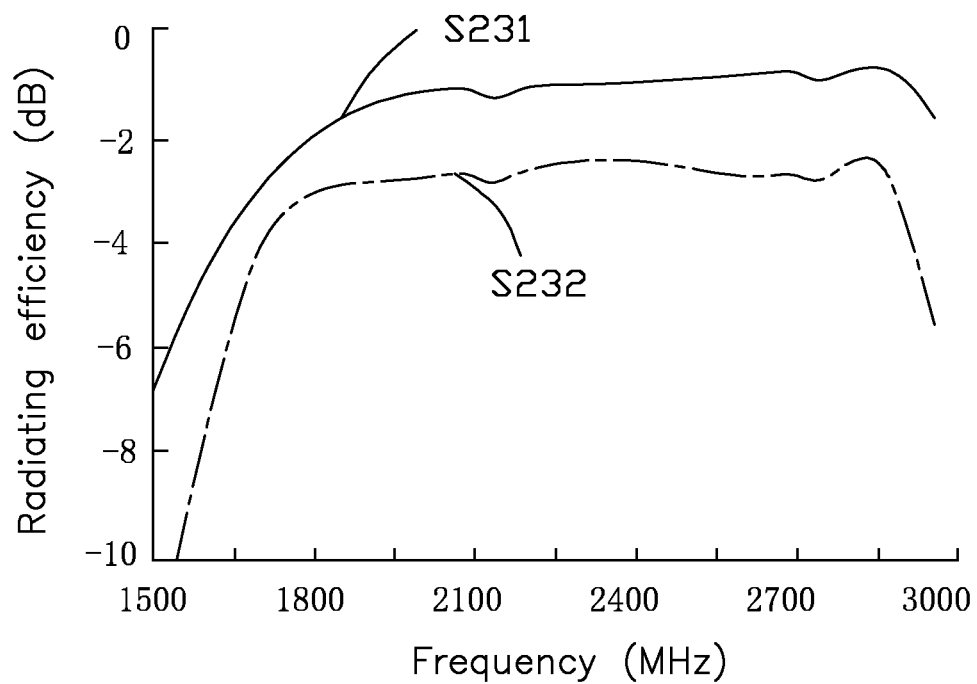
FIG. 23 is a radiating efficiency graph of a first antenna of the antenna structure of FIG. 19.

FIG. 22 illustrates a scattering parameter graph of the first antenna ANT1 of the antenna structure 100a. FIG. 23 illustrates a radiating efficiency graph of the first antenna ANT1 of the antenna structure 100a. Curve S231 illustrates a radiating efficiency of the first antenna ANT1 of the antenna structure 100a. Curve S232 illustrates a total radiating efficiency of the first antenna ANT1 of the antenna structure 100a. In FIGS. 22-23, the antenna structure 100a does not include the parasitic portion 15 and can also operate at middle and high frequency bands, for example, 1710-2690 MHz. When the antenna structure 100a operates at the frequency band of about 1710-2690 MHz, a radiating efficiency and a total radiating efficiency of the antenna structure 100a are each bigger than −3 dB, and satisfy a design of the antenna.

Figure 24:
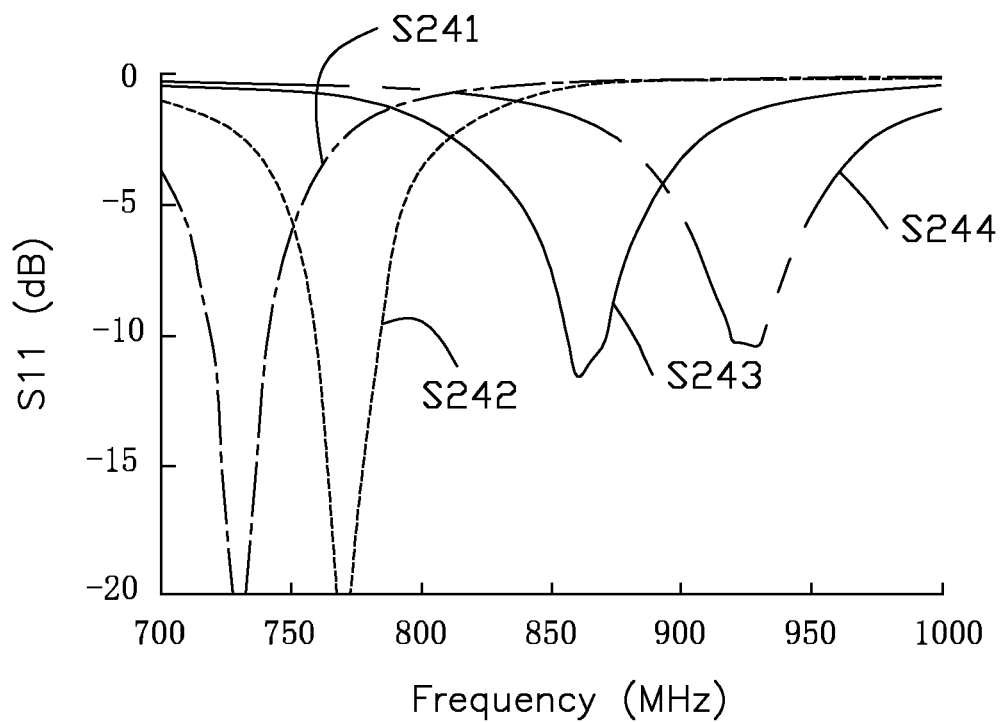
FIG. 24 is a scattering parameter graph of a second antenna of the antenna structure of FIG. 19.

FIG. 24 illustrates a scattering parameter graph of the second antenna ANT2 of the antenna structure 100a. Curve S241 illustrates a scattering parameter when the second antenna ANT2 operates at a frequency band of about 704-746 MHz (LTE-A Band 17). Curve S242 illustrates a scattering parameter when the second antenna ANT2 operates at a frequency band of about 746-787 MHz (LTE-A Band 13). Curve S243 illustrates a scattering parameter when the second antenna ANT2 operates at a frequency band of about 824-894 MHz (LTE-A Band 5). Curve S244 illustrates a scattering parameter when the second antenna ANT2 operates at a frequency band of about 880-960 MHz (LTE-A Band 8).

Figure 25:
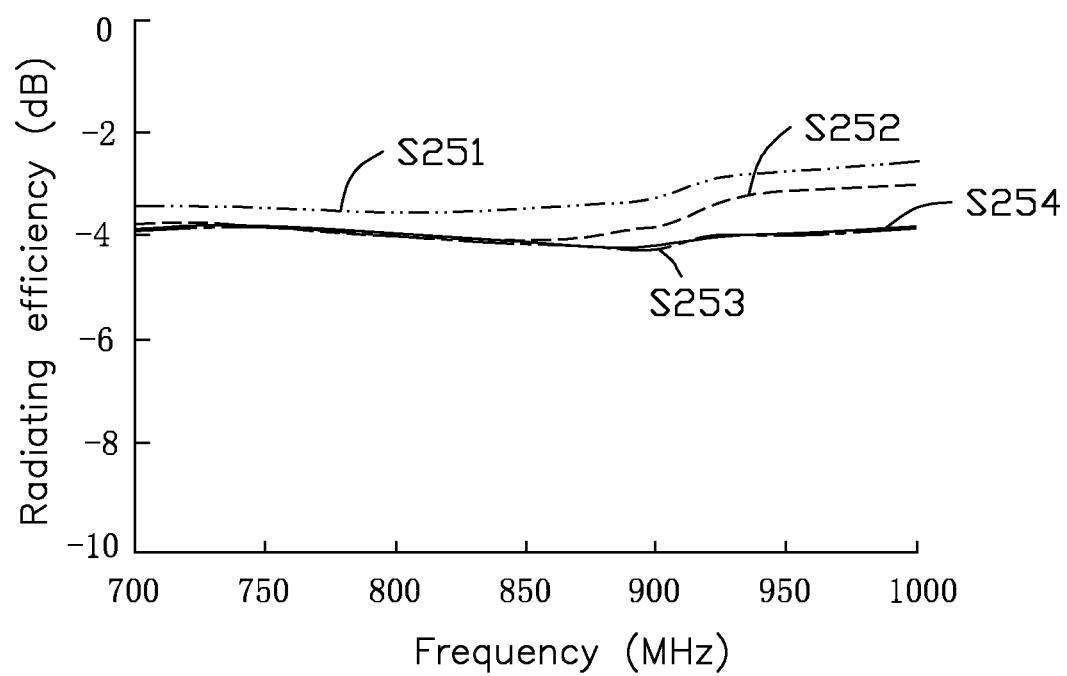
FIG. 25 is a radiating efficiency graph of a second antenna of the antenna structure of FIG. 19.

FIG. 25 illustrates a radiating efficiency graph of the second antenna ANT2 of the antenna structure 100a. Curve S251 illustrates a radiating efficiency when the second antenna ANT2 operates at a frequency band of about 704-746 MHz (LTE-A Band 17). Curve S252 illustrates a radiating efficiency when the second antenna ANT2 operates at a frequency band of about 746-787 MHz (LTE-A Band 13). Curve S253 illustrates a radiating efficiency when the second antenna ANT2 operates at a frequency band of about 824-894 MHz (LTE-A Band 5). Curve S254 illustrates a radiating efficiency when the second antenna ANT2 operates at a frequency band of about 880-960 MHz (LTE-A Band 8).

Figure 26:
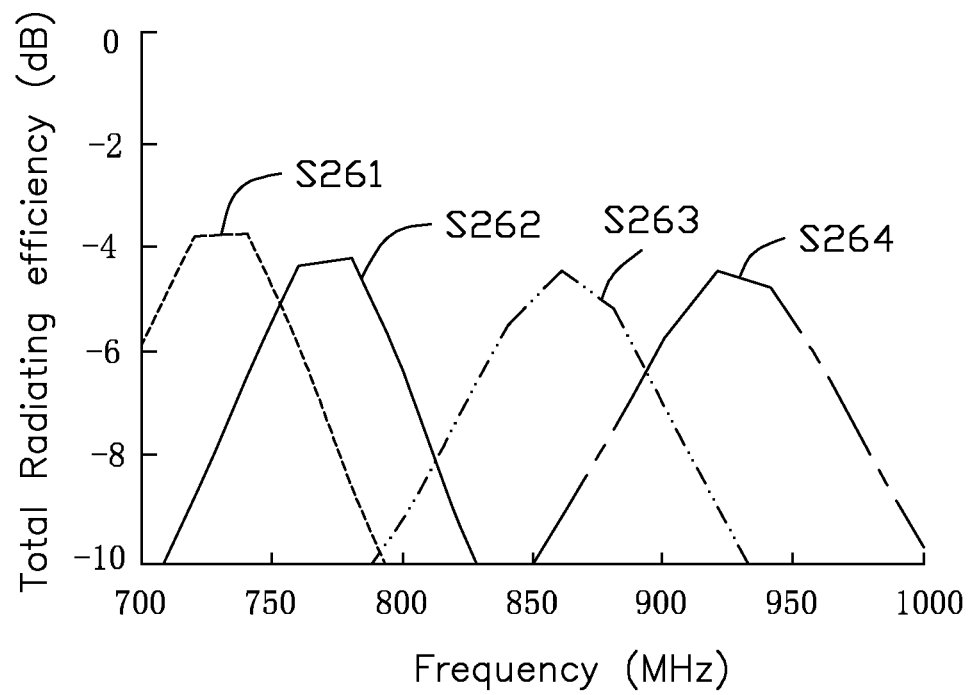
FIG. 26 is a total radiating efficiency graph of a second antenna of the antenna structure of FIG. 19.

FIG. 26 illustrates a total radiating efficiency graph of the second antenna ANT2 of the antenna structure 100a. Curve S261 illustrates a total radiating efficiency when the second antenna ANT2 operates at a frequency band of about 704-746 MHz (LTE-A Band 17). Curve S262 illustrates a total radiating efficiency when the second antenna ANT2 operates at a frequency band of about 746-787 MHz (LTE-A Band 13). Curve S263 illustrates a total radiating efficiency when the second antenna ANT2 operates at a frequency band of about 824-894 MHz (LTE-A Band 5). Curve S264 illustrates a total radiating efficiency when the second antenna ANT2 operates at a frequency band of about 880-960 MHz (LTE-A Band 8).

In FIGS. 24-26, the antenna structure 100a does not include the parasitic portion 15 and also can operate at a low frequency band, for example, 700-960 MHz. When the second antenna ANT2 operates at the low frequency band, a radiating efficiency and a total radiating efficiency of the second antenna ANT2 are both<here> bigger than −5 dB, and satisfy a design of the antenna.

Exemplary Embodiment 3

Figure 27:
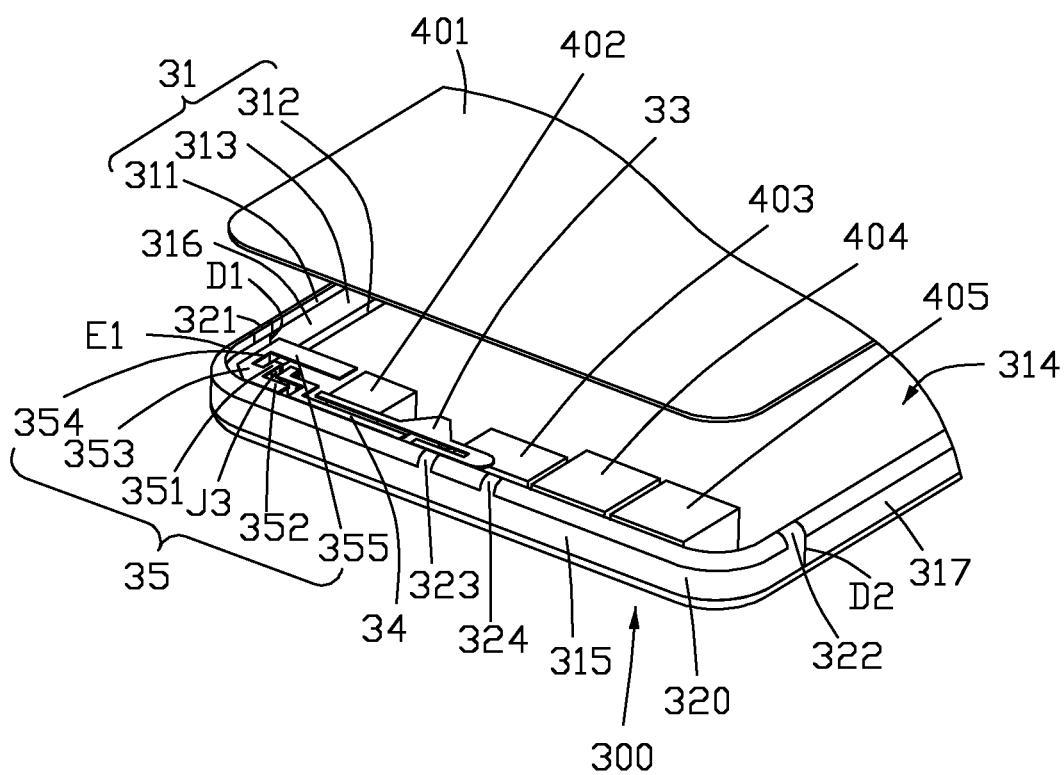
FIG. 27 is an isometric view of a third exemplary embodiment of the wireless communication device using a third exemplary antenna structure.

FIG. 27 illustrates an exemplary embodiment of a wireless communication device 400 using a third exemplary antenna structure 300. The wireless communication device 400 can be a mobile phone or a personal digital assistant, for example. The antenna structure 300 can receive and/or transmit wireless signals.

Figure 28:
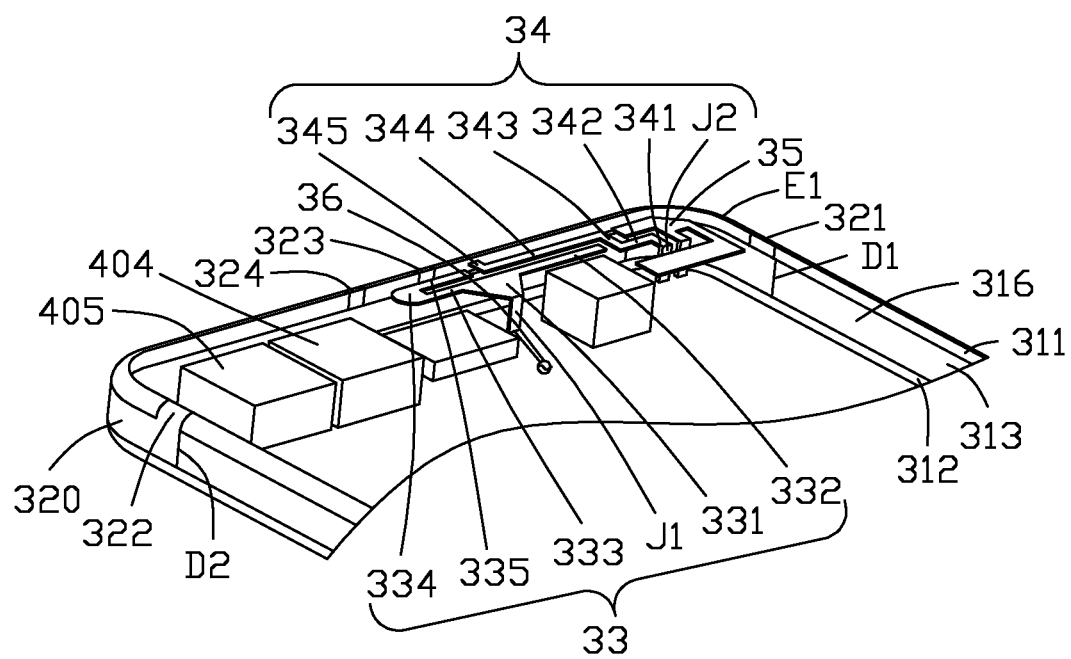
FIG. 28 is similar to FIG. 27, but shown from another angle.

In FIG. 28, the antenna structure 300 includes a housing 31, a first radiating portion 33, a second radiating portion 34, a third radiating portion 35, and a signal feed source 36. The housing 31 can be a metal housing of the wireless communication device 400. In this exemplary embodiment, the housing 31 is made of metallic material. The housing 31 includes a front frame 311, a backboard 312, and a side frame 313. The front frame 311, the backboard 312, and the side frame 313 can be integrally formed. The front frame 311, the backboard 312, and the side frame 313 cooperatively form the housing of the wireless communication device 400.

The front frame 311 defines an opening (not shown). The wireless communication device 400 includes a display 401. The display 401 is received in the opening. The display 401 has a display surface. The display surface is exposed at the opening and is parallel to the backboard 312.

The backboard 312 is positioned opposite to the front frame 311. The backboard 312 is directly connected to the side frame 313 and there is no gap between the backboard 312 and the side frame 313. The backboard 312 serves as the ground of the antenna structure 300 and the wireless communication device 400.

The side frame 313 is positioned between the backboard 312 and the front frame 311. The side frame 313 is positioned around a periphery of the backboard 312 and a periphery of the front frame 311. The side frame 313 forms a receiving space 314 together with the display 401, the front frame 311, and the backboard 312. The receiving space 314 can receive a printed circuit board, a processing unit, or other electronic components or modules.

The side frame 313 includes an end portion 315, a first side portion 316, and a second side portion 317. In this exemplary embodiment, the end portion 315 can be a top portion of the wireless communication device 400. The end portion 315 connects the front frame 311 and the backboard 312. The first side portion 316 is spaced apart from and parallel to the second side portion 317. The end portion 315 has first and second ends. The first side portion 316 is connected to the first end of the first frame 311 and the second side portion 317 is connected to the second end of the end portion 315. The first side portion 316 and the second side portion 317 both connect to the front frame 311.

The side frame 313 defines a slot 320. The front frame 311 defines a first groove 321, a second groove 322, a first gap 323, and a second gap 324. In this exemplary embodiment, the slot 320 is defined at the end portion 315 and extends to the first side portion 316 and the second side portion 317. In other exemplary embodiments, the slot 320 is defined only at the end portion 315 and does not extend to any one of the first side portion 316 and the second side portion 317. In other exemplary embodiments, the slot 320 can be defined at the end portion 315 and extend to one of the first side portion 316 and the second side portion 317.

The first groove 321, the second groove 322, the first gap 323, and the second gap 324 are all in communication with the slot 320 and extend across the front frame 311. In this exemplary embodiment, the first groove 321 is defined on the front frame 311 and communicates with a first end D1 of the slot 320 positioned on the first side portion 316. The second groove 322 is defined on the front frame 311 and communicates with a second end D2 of the slot 320 positioned on the second side portion 317.

The first gap 323 and the second gap 324 are both defined on the front frame 311 between the first end D1 and the second end D2. The first gap 323 and the second gap 324 are spaced apart from each other and in communication with the slot 320. The housing 31 is divided into at least an antenna section E1 by the slot 320, the first groove 321, the second groove 322, the first gap 323, and the second gap 324. Then, the portion of the front frame 311 between the first groove 321 and the first gap 323 forms the antenna section E1.

In this exemplary embodiment, the slot 320, the first groove 321, the second groove 322, the first gap 323, and the second gap 324 are all filled with insulating material, for example, plastic, rubber, glass, wood, ceramic, or the like.

In this exemplary embodiment, the slot 320 is defined at the end of the side frame 313 adjacent to the backboard 312 and extends to the front frame 311. Then the antenna section E1 is fully formed by a portion of the front frame 311. In other exemplary embodiments, a position of the slot 320 can be adjusted. For example, the slot 320 can be defined on the end of the side frame 313 adjacent to the backboard 312 and extend towards the front frame 311. Then the antenna section E1 is formed by a portion of the front frame 311 and a portion of the side frame 313.

In this exemplary embodiment, except for the slot 320, the first groove 321, the second groove 322, the first gap 323, and the second gap 324, an upper half portion of the front frame 311 and the side frame 313 does not define any other slot, break line, and/or gap. That is, there are only the first groove 321, the second groove 322, the first gap 323, and the second gap 324 defined on the upper half portion of the front frame 311.

In this exemplary embodiment, a width of the slot 320 is about 3.43 mm. A width of the first gap 323 and a width of the second gap 324 are both about 2 mm. A width of the first groove 321 and a width of the second groove 322 are both about 3.43 mm. A distance between the first gap 323 and the second gap 324 is about 11.1 mm.

Figure 29:
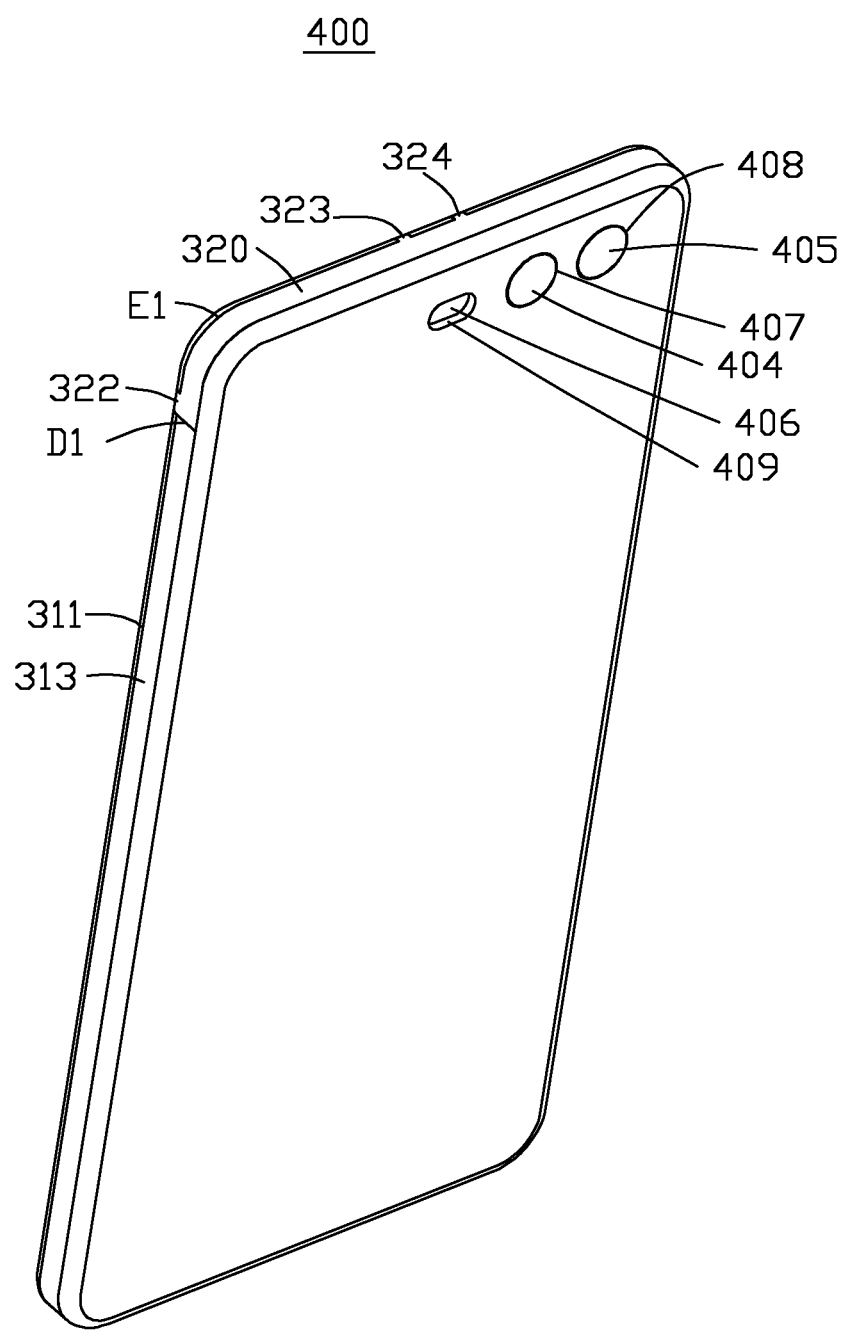
FIG. 29 is an assembled, isometric view of the wireless communication device of FIG. 27.

In FIG. 29, the wireless communication device 400 further includes at least one electronic element. In this exemplary embodiment, the wireless communication device 400 includes a first electronic element 402, a second electronic element 403, a third electronic element 404, a fourth electronic element 405, and a fifth electronic element 406. In this exemplary embodiment, the first electronic element 402 is a front camera module. The first electronic element 402 is positioned between the first gap 323 and the first side portion 316. The second electronic element 403 is a speaker and is positioned between the first gap 323 and the second gap 324. The third electronic element 404 and the fourth electronic element 405 are both rear camera modules. The third electronic element 404 and the fourth electronic element 405 are spaced apart from each other. The third electronic element 404 and the fourth electronic element 405 are positioned between the second electronic element 403 and the second side portion 317. The fifth electronic element 406 is a flash light.

The backboard 312 is an integrally formed metallic sheet. The backboard 312 defines holes 407, 408, and 409 for exposing double camera lenses (i.e., the third electronic element 404 and the fourth electronic element 405) and a flash light (i.e., the fifth electronic element 406). The backboard 312 does not define any slot, break line, and/or gap to divide the backboard 312.

In this exemplary embodiment, the first radiating portion 33, the second radiating portion 34, and the third radiating portion 35 are all spaced apart from each other as shown in FIG. 28. The first radiating portion 33 includes a first connecting section J1, a first radiating section 331, a second radiating section 332, a third radiating section 333, a fourth radiating section 334, and a fifth radiating section 335. The first connecting section J1 is substantially rectangular and is positioned on a plane perpendicular to the plane of the backboard 312. The first connecting section J1 is positioned between the first electronic element 402 and the second electronic element 403. One end of the first connecting section J1 is electrically connected to the signal feed source 36 to feed current to the first radiating portion 33.

The first radiating section 331 is positioned on a plane parallel to the plane of the backboard 312. The first radiating section 331 is substantially triangular. One vertex of the first radiating section 331 is perpendicularly connected to the end of the first connecting section J1 away from the signal feed source 36. The second radiating section 332, the third radiating section 333, the fourth radiating section 334, and the fifth radiating section 335 are coplanar with the first radiating section 331. The second radiating section 332 and the third radiating section 333 are both rectangular. Each of the second radiating section 332 and the third radiating section 333 are connected to a vertex of the first radiating section 331 and extend along a direction parallel to the end portion 315 and respectively towards the first side portion 316 and the second side portion 317. The first radiating section 331, the second radiating section 332, and the third radiating section 333 cooperatively form a T-shaped structure.

The fourth radiating section 334 is substantially rectangular. The fourth radiating section 334 is perpendicularly connected to the end of the third radiating section 333 away from the first radiating section 331 and extends along a direction parallel to the first side portion 316 towards the end portion 315. The fifth radiating section 335 is substantially rectangular. The fifth radiating section 335 is perpendicularly connected to the end of the fourth radiating section 334 away from the third radiating section 333 and extends along a direction parallel to the end portion 315 towards the first side portion 316.

The second radiating portion 34 is positioned between the first radiating portion 33 and the third radiating portion 35. The second radiating portion 34 includes a second connecting section J2, a first radiating arm 341, a second radiating arm 342, a third radiating arm 343, a fourth radiating arm 344, and a fifth radiating arm 345 connected in that order. The second connecting section J2 is substantially rectangular and is positioned on a plane perpendicular to the plane of the backboard 312. One end of the second connecting section J2 is electrically connected to the backboard 312 to be grounded. The first radiating arm 341 is substantially rectangular and is positioned on a plane parallel to the plane of the backboard 312. One end of the first radiating arm 341 is perpendicularly connected to the end of the second connecting section J2 away from the backboard 312. Another end of the first radiating arm 341 extends along a direction parallel to the first side portion 316 towards the end portion 315.

The second radiating arm 342, the third radiating arm 343, the fourth radiating arm 344, and the fifth radiating arm 345 are coplanar with the first radiating arm 341. The second radiating arm 342 is substantially rectangular. The second radiating arm 342 is perpendicularly connected to the end of the first radiating arm 341 away from the second connecting section J2 and extends along a direction parallel to the end portion 315 towards the second side portion 317. The third radiating arm 343 is substantially rectangular. The third radiating arm 343 is perpendicularly connected to the end of the second radiating arm 342 away from the first radiating arm 341 and extends along a direction parallel to the first radiating arm 341 towards the end portion 315.

The fourth radiating arm 344 is substantially rectangular. The fourth radiating arm 344 is perpendicularly connected to the end of the third radiating arm 343 away from the second radiating arm 342 and extends along a direction parallel to the second radiating arm 342 towards the second side portion 317. The fifth radiating arm 345 is substantially rectangular. The fifth radiating arm 345 is perpendicularly connected to the end of the fourth radiating arm 344 away from the third radiating arm 343 and extends along a direction parallel to the third radiating arm 343 towards the end portion 315. The extension continues until the fifth radiating arm 345 is electrically connected to the portion of the antenna section E1 adjacent to the first gap 323.

Figure 30:
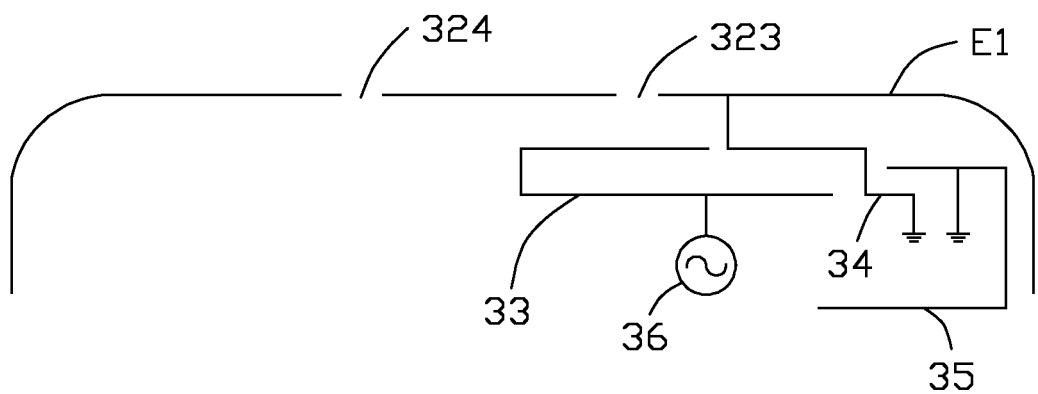
FIG. 30 is a schematic diagram of the antenna structure of FIG. 27.

In FIG. 27 and FIG. 30, the third radiating portion 35 is positioned between the second radiating portion 34 and the first side portion 316. The third radiating portion 35 includes a third connecting section J3, a first resonance section 351, a second resonance section 352, a third resonance section 353, a fourth resonance section 354, and a fifth resonance section 355. The third connecting section J3 is substantially rectangular and is positioned on a plane perpendicular to the plane of the backboard 312. The third connecting section J3 is positioned between the second connecting section J2 and the first side portion 316. One end of the third connecting section J3 is electrically connected to the backboard 312 to be grounded.

The first resonance section 351 is substantially rectangular and is positioned on a plane parallel to the plane of the backboard 312. One end of the first resonance section 351 is electrically connected to the end of the third connecting section J3 away from the backboard 312. Another end of the first resonance section 351 extends along a direction parallel to the first side portion 316 towards the end portion 315.

The second resonance section 352, the third resonance section 353, the fourth resonance section 354, and the fifth resonance section 355 are coplanar with the first resonance section 351. The second resonance section 352 is substantially rectangular. The second resonance section 352 is perpendicularly connected to the end of the first resonance section 351 away from the third connecting section J3 and extends along a direction parallel to the end portion 315 towards the second side portion 317. The third resonance section 353 is substantially triangular. The third resonance section 353 is connected to a junction of the first resonance section 351 and the second resonance section 352, and extends along a direction towards the first side portion 316.

The fourth resonance section 354 is substantially rectangular. The fourth resonance section 354 is perpendicularly connected to the end of the third resonance section 353 away from the second resonance section 352 and extends along a direction parallel to the first resonance section 351 away from the end portion 315. The fifth resonance section 355 is substantially rectangular. The fifth resonance section 355 is perpendicularly connected to the end of the fourth resonance section 354 away from the third resonance section 353 and extends along a direction parallel to the end portion 315 towards the second side portion 317. The extension of the fifth resonance section 355 continues until the fifth resonance section 355 passes over the second connecting section J2 and the third connecting section J3, and is spaced apart from the first electronic element 402.

Figure 31:
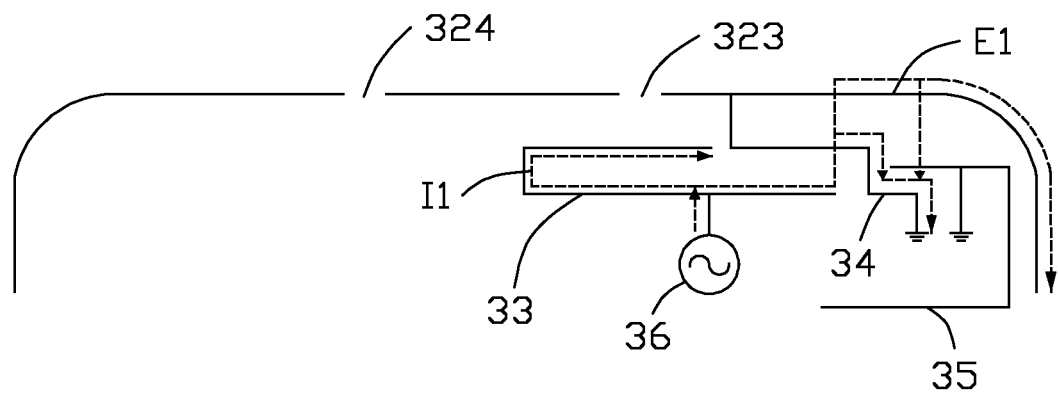
FIG. 31 is a current path distribution graph when the antenna structure of FIG. 27 operates at frequency bands of about 734-960 MHz and 2500-2690 MHz.
Figure 33:
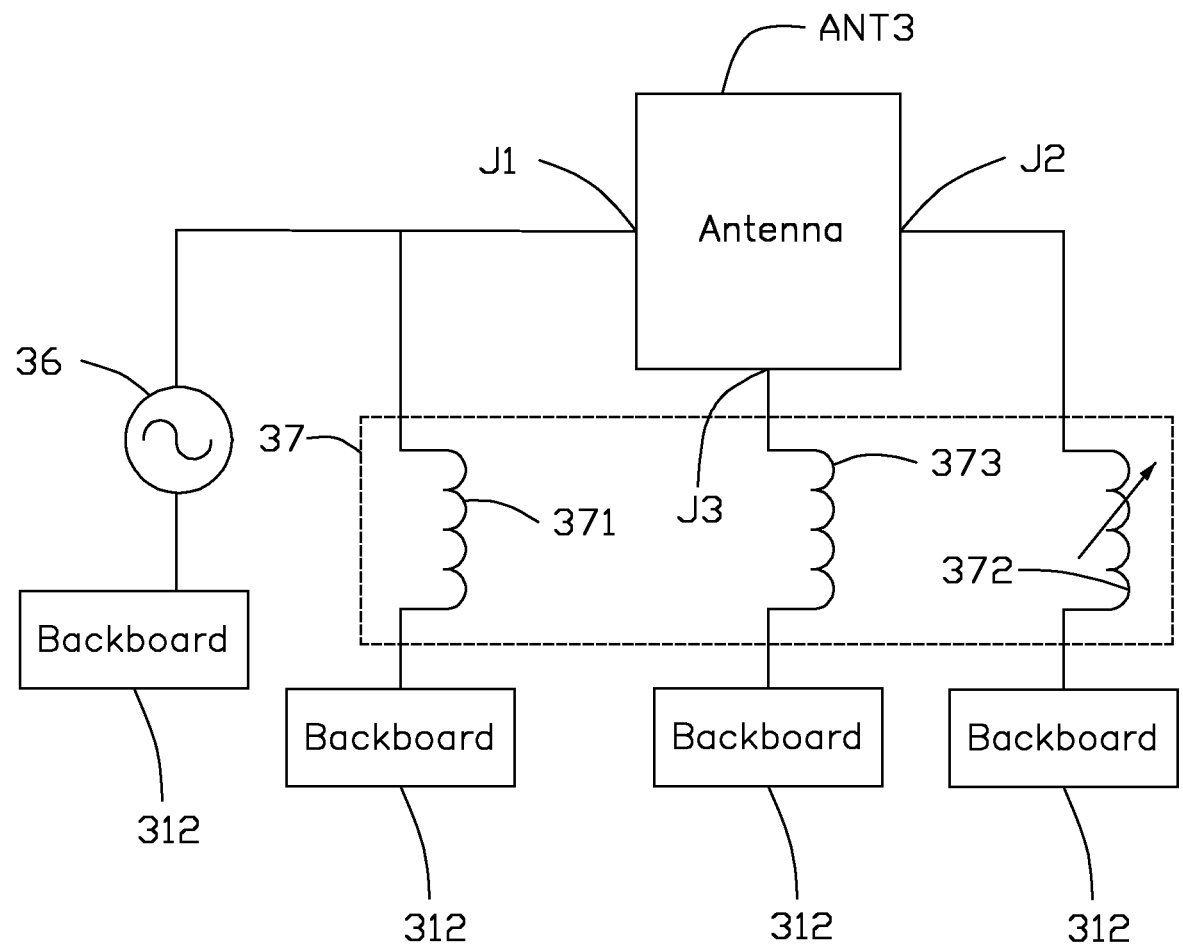
FIG. 33 is a circuit diagram of a matching circuit of the antenna structure of FIG. 27.

In FIG. 31 and FIG. 33, in this exemplary embodiment, the antenna section E1, the first radiating portion 33, the second radiating portion 34, and the third radiating portion 35 cooperatively form an antenna ANT3 to activate resonance modes for generating radiation signals in a predetermined frequency band. In this exemplary embodiment, the resonance modes are LTE-A low, middle, and high frequency operation modes. The predetermined frequency band includes frequency bands of about 734-960 MHz and 1805-2690 MHz.

In FIG. 31, when the signal feed source 36 supplies current, the current flows through the first radiating portion 33, is coupled to the second radiating portion 34 through the first radiating portion 33. One portion of the current from the second radiating portion 34 is directly grounded through the second connecting section J2 of the second radiating portion 34. Another portion of the current from the second radiating portion 34 directly flows to the antenna section E1 through the second radiating portion 34. The current from the antenna section E1 is further coupled to the second radiating portion 34 and is grounded through the second connecting section J2 of the second radiating portion 34. Then the second radiating portion 34 activates a low frequency band through a method of a quarter of a wavelength. The low frequency band has a resonance frequency $f_0$ of about 920 MHz, that is, 734-960 MHz (e.g., path I1). In addition, a frequency multiplication of the resonance frequency $f_0$ further activates a high frequency band having a resonance frequency $f_1$ of about 2620 MHz, that is, 2500-2690 MHz.

Figure 32:
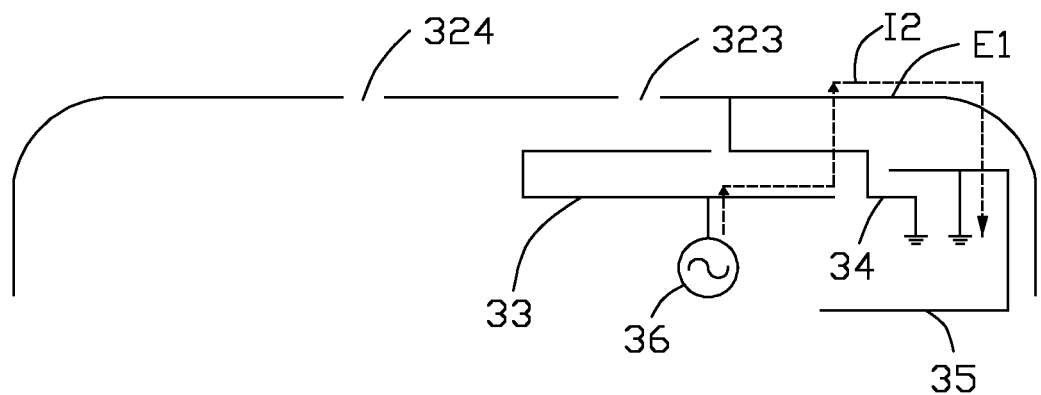
FIG. 32 is a current path distribution graph when the antenna structure of FIG. 27 operates at a frequency band of about 1805-2300 MHz.

In FIG. 32, when the signal feed source 36 supplies current, the current flows through the first radiating portion 33, the current is coupled to the second radiating portion 34 through the first radiating portion 33. The current from the second radiating portion 34 directly flows to the antenna section E1 through the second radiating portion 34, then the current is coupled to the third radiating portion 35, and <here> is grounded through the third connecting section J3 of the third radiating portion 35 and the backboard 312. Then the third radiating portion 35 activates a middle frequency band through a method of a quarter of a wavelength. The middle frequency band has a resonance frequency $f_2$ of about 1940 MHz, that is, 1805-2300 MHz (e.g., path I2).

In FIG. 31 to FIG. 32, in this exemplary embodiment, length of the antenna section E1 is added to the second radiating portion 34. The third radiating portion 35 improves a bandwidth characteristic of the antenna ANT3 through double-coupling.

In FIG. 33, in this exemplary embodiment, the antenna ANT3 forms a three-port network. The three ports include the first connecting section J1, the second connecting section J2, and the third connecting section J3. Each port includes one corresponding matching element. These matching elements cooperatively form a matching circuit 37 to effectively adjust and optimize a resonance frequency band of the antenna ANT3. In this exemplary embodiment, the matching circuit 37 includes a first matching element 371, a second matching element 372, and a third matching element 373. One end of the first matching element 371 is electrically connected between the first connecting section J1 and the signal feed source 36. Another end of the first matching element 371 is electrically connected to the backboard 312 to be grounded. One end of the second matching element 372 is electrically connected to the second connecting section J2. Another end of the second matching element 372 is electrically connected to the backboard 312 to be grounded. One end of the third matching element 373 is electrically connected to the third connecting section J3. Another end of the third matching element 373 is electrically connected to the backboard 312 to be grounded.

In this exemplary embodiment, the first matching element 371 and the third matching element 373 are inductors. The second matching element 372 is an adjustable inductor and can be switched among a plurality inductors of predetermined values. Then the matching circuit 37 further forms a switching circuit through the adjustable second matching element 372, and the low frequency operation mode and part of the high frequency operation mode of the antenna ANT3 can be adjusted. In other exemplary embodiments, the first matching element 371, the second matching element 372, and the third matching element 373 are not limited to be the inductors and/or the adjustable inductor and can be other matching components and/or switching components. For example, at least one of the first matching element 371, the second matching element 372, and the third matching element 373 can be switched among a plurality of predetermined resistors.

Figure 34:
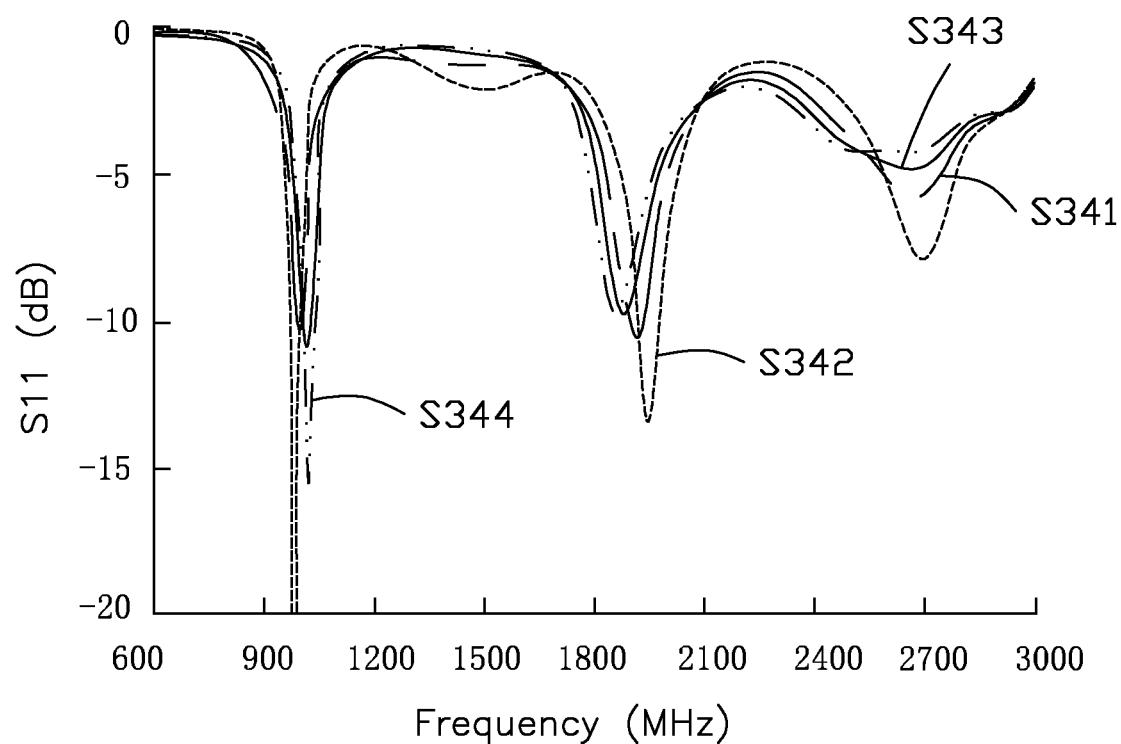
FIG. 34 is a scattering parameter graph when a first matching element of the antenna structure of FIG. 33 being different inductors.

FIG. 34 illustrates a scattering parameter graph of the antenna structure 300 when an inductor, as the first matching element 371 has different inductance values. Curve S341 illustrates a scattering parameter of the antenna structure 300 when the first matching element 371 is an inductor of about 10 nH. Curve S342 illustrates a scattering parameter of the antenna structure 300 when the first matching element 371 is an inductor of about 5 nH. Curve S343 illustrates a scattering parameter of the antenna structure 300 when the first matching element 371 is an inductor of about 25 nH. Curve S344 illustrates a scattering parameter of the antenna structure 300 when the first matching element 371 is at an open-circuit state.

Figure 35:
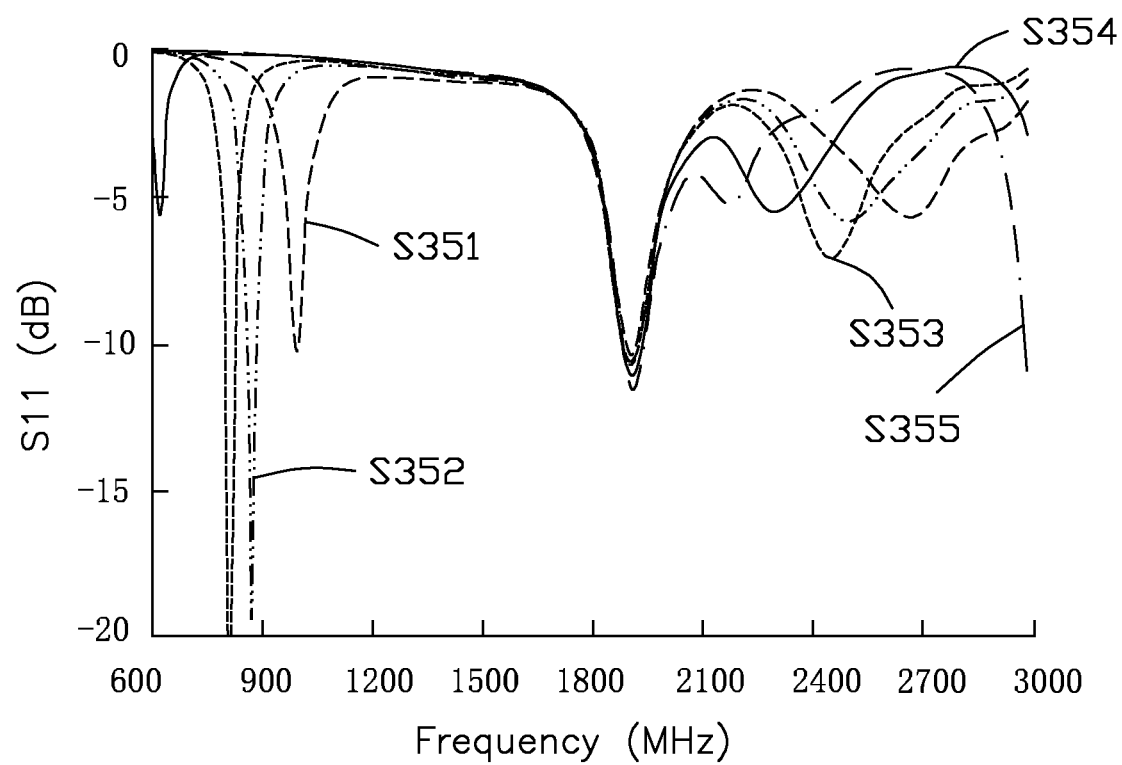
FIG. 35 is a scattering parameter graph when a second matching element of the antenna structure of FIG. 33 being different inductors.

FIG. 35 illustrates a scattering parameter graph of the antenna structure 300 when an inductor, as the second matching element 372, has different inductance values. Curve S351 illustrates a scattering parameter of the antenna structure 300 when the second matching element 372 is a 0 ohm resistor. Curve S352 illustrates a scattering parameter of the antenna structure 300 when the second matching element 372 is an inductor of about 3 nH. Curve S353 illustrates a scattering parameter of the antenna structure 300 when the second matching element 372 is an inductor of about 5 nH. Curve S354 illustrates a scattering parameter of the antenna structure 300 when the second matching element 372 is an inductor of about 15 nH. Curve S355 illustrates a scattering parameter of the antenna structure 300 when the second matching element 372 is an inductor of about 30 nH.

Figure 36:
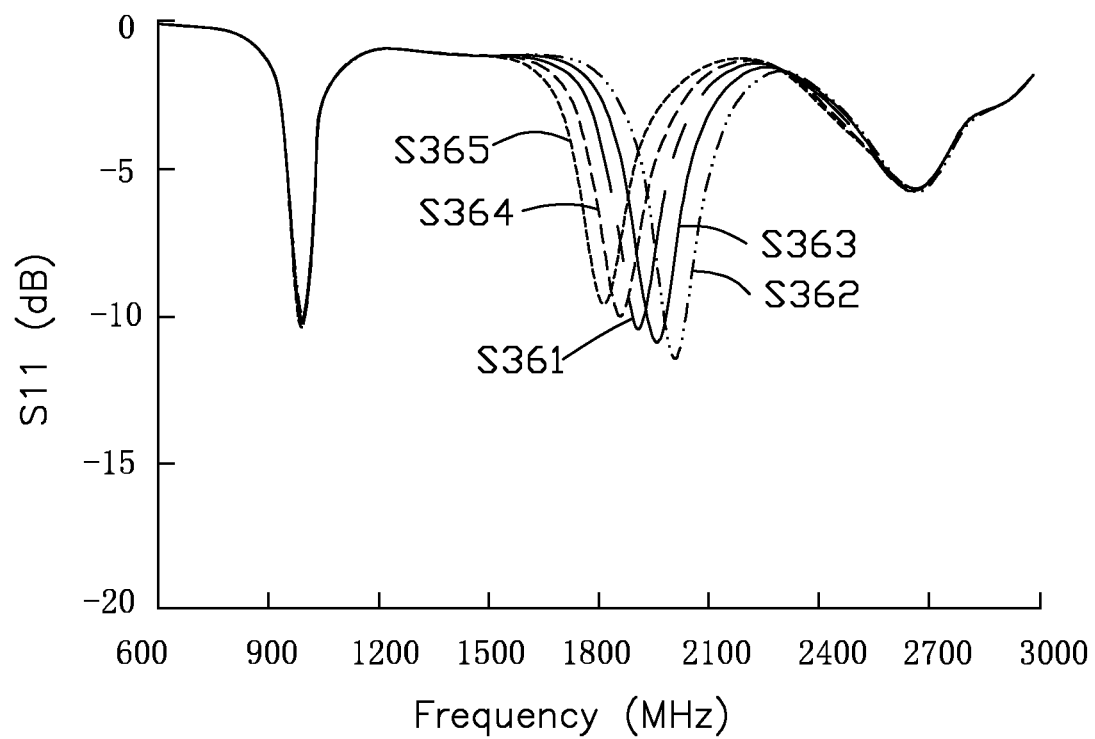
FIG. 36 is a scattering parameter graph when a third matching element of the antenna structure of FIG. 33 being different inductors.

FIG. 36 illustrates a scattering parameter graph of the antenna structure 300 when an inductor, as the third matching element 373, has different inductance values. Curve S361 illustrates a scattering parameter of the antenna structure 300 when the third matching element 373 is an inductor of about 2.1 nH. Curve S362 illustrates a scattering parameter of the antenna structure 300 when the third matching element 373 is an inductor of about 1.5 nH. Curve S363 illustrates a scattering parameter of the antenna structure 300 when the third matching element 373 is an inductor of about 1.8 nH. Curve S364 illustrates a scattering parameter of the antenna structure 300 when the third matching element 373 is an inductor of about 2.4 nH. Curve S365 illustrates a scattering parameter of the antenna structure 300 when the third matching element 373 is an inductor of about 2.7 nH.

In FIG. 34 to FIG. 36, the third matching element 373 mainly adjusts the first high frequency band of the resonance mode, for example, 2300-2400 MHz. The first matching element 371 mainly adjusts the second high frequency band of the resonance mode, for example, 2500-2690 MHz. The second matching element 372 mainly adjusts the low frequency band of the resonance mode and the second high frequency band of the resonance mode.

In table 3 following, an operating frequency band of the antenna structure 300 is illustrated. The first matching element 371 here is an inductor of about 10 nH, the third matching element 373 is an inductor of about 2.1 nH, and the second matching element 372 is an inductor having different inductance values.

TABLE 3

| Operating Frequency Band | First Matching Element 371 | Second Matching Element 372 | Third Matching Element 373 |
| --- | --- | --- | --- |
| LTE-A Band 17 (704-746 MHz) | 10 nH | 7.5 nH | 2.1 nH |
| LTE-A Band 13 (746-787 MHz) | 10 nH | 7.5 nH | 2.1 nH |
| LTE-A Band 5 (824-894 MHz) | 10 nH | 2.7 nH | 2.1 nH |
| LTE-A Band 8 (880-960 MHz) | 10 nH | 1.1 nH | 2.1 nH |

TABLE 3-continued

| Operating Frequency Band | First Matching Element 371 | Second Matching Element 372 | Third Matching Element 373 |
|---|---|---|---|
| 1805-2300 MHz | 10 nH | 30 nH | 2.1 nH |
| LTE-A Band 40 (2300-2400 MHz) | 10 nH | 10 nH | 2.1 nH |
| LTE-A Band 7 (2500-2690 MHz) | 10 nH | 0.7 nH | 2.1 nH |

Figure 37:
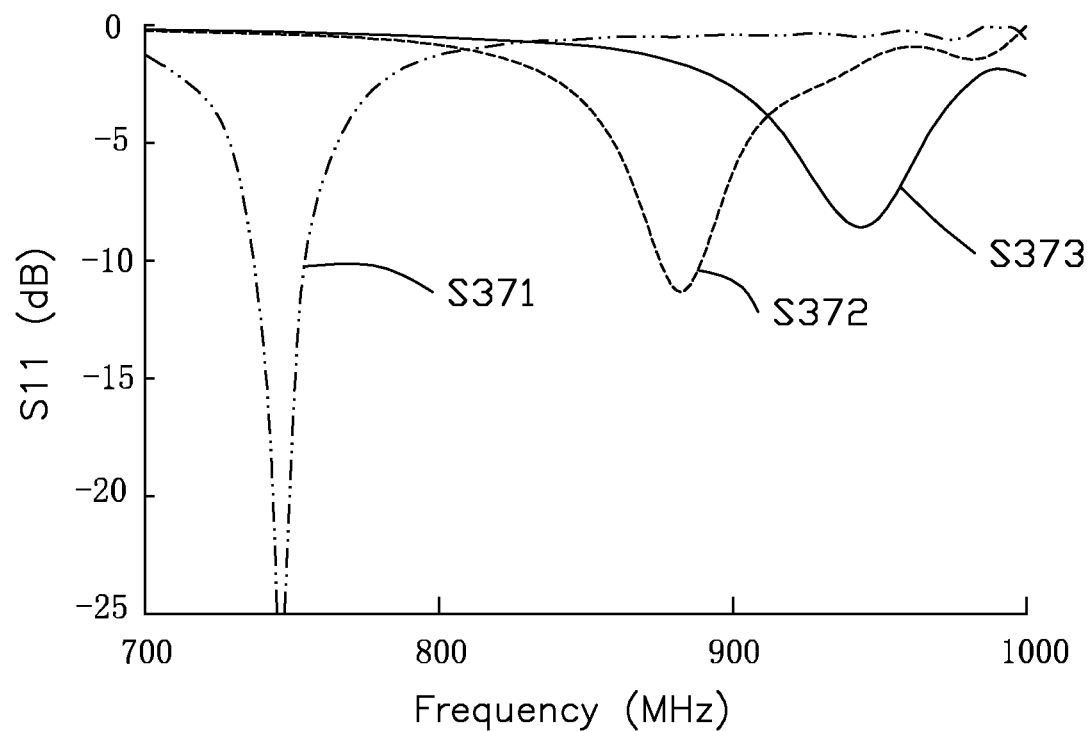
FIG. 37 is a scattering parameter graph when the antenna structure of FIG. 27 operates at a low frequency operation mode.

FIG. 37 illustrates a scattering parameter graph when the antenna structure 300 operates at a low frequency band. Curve S371 illustrates a scattering parameter when the antenna structure 300 operates at frequency bands of about 704-746 MHz and 746-787 MHz (LTE-A Band 17/13). Curve S372 illustrates a scattering parameter when the antenna structure 300 operates at a frequency band of about 824-894 MHz (LTE-A Band 5). Curve S373 illustrates a scattering parameter when the antenna structure 300 operates at a frequency band of about 880-960 MHz (LTE-A Band 8).

Figure 38:
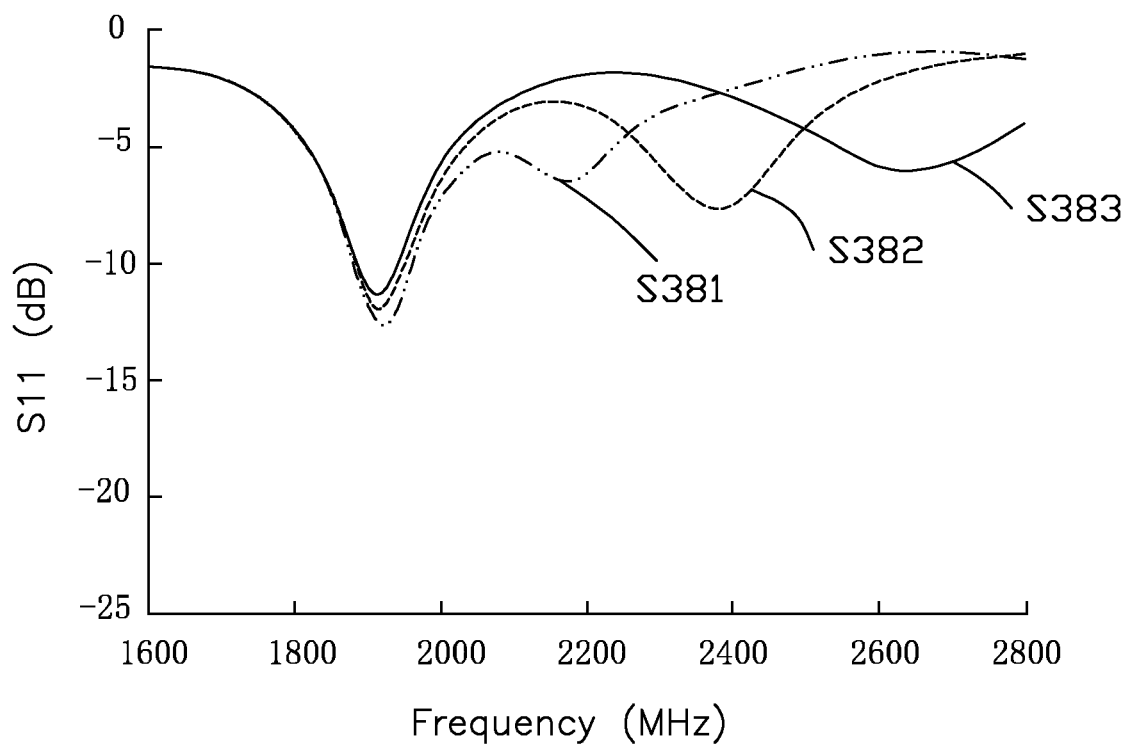
FIG. 38 is a scattering parameter graph when the antenna structure of FIG. 27 operates at middle and high frequency operation modes.

FIG. 38 illustrates a scattering parameter graph when the antenna structure 300 operates at middle and high frequency bands. Curve S381 illustrates a scattering parameter when the antenna structure 300 operates at frequency bands of about 1805-1910 MHz. Curve S382 illustrates a scattering parameter when the antenna structure 300 operates at a frequency band of about 2300-2400 MHz (LTE-A Band 40). Curve S383 illustrates a scattering parameter when the antenna structure 300 operates at a frequency band of about 2500-2690 MHz (LTE-A Band 7).

Figure 39:
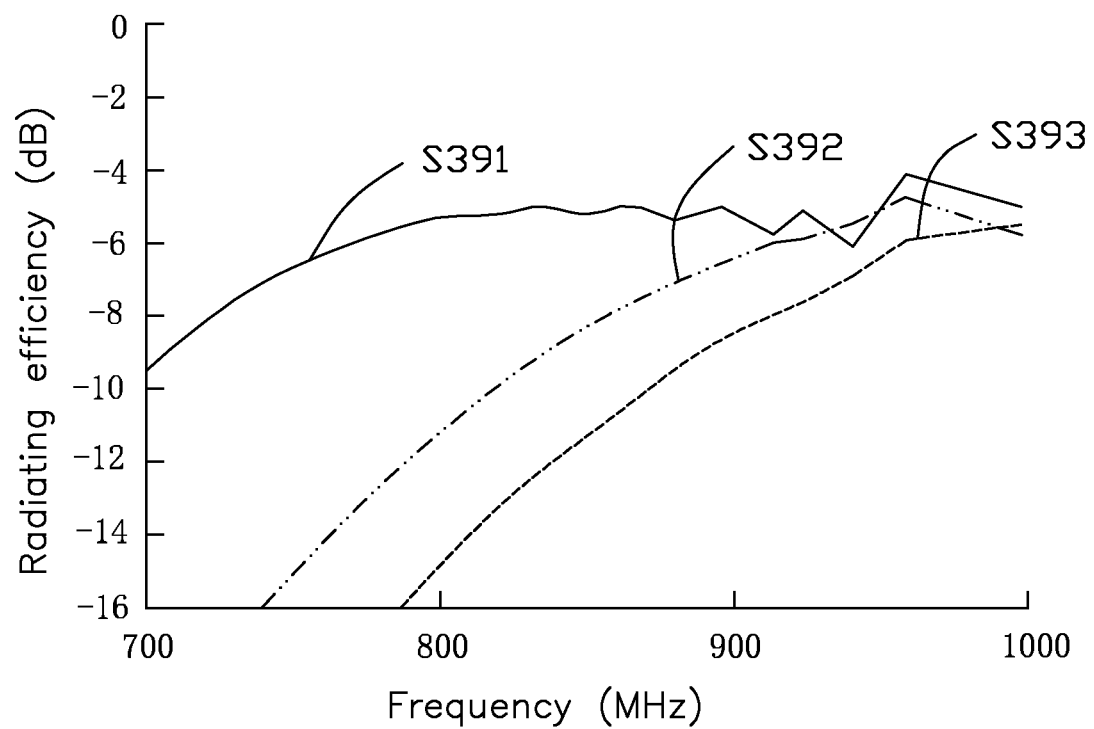
FIG. 39 is a radiating efficiency graph when the antenna structure of FIG. 27 operates at a low frequency operation mode.

FIG. 39 illustrates a radiating efficiency graph when the antenna structure 300 operates at a low frequency band. Curve S391 illustrates a radiating efficiency when the antenna structure 300 operates at frequency bands of about 704-746 MHz and 746-787 MHz (LTE-A Band 17/13). Curve S392 illustrates a radiating efficiency when the antenna structure 300 operates at a frequency band of about 824-894 MHz (LTE-A Band 5). Curve S393 illustrates a radiating efficiency when the antenna structure 300 operates at a frequency band of about 880-960 MHz (LTE-A Band 8).

Figure 40:
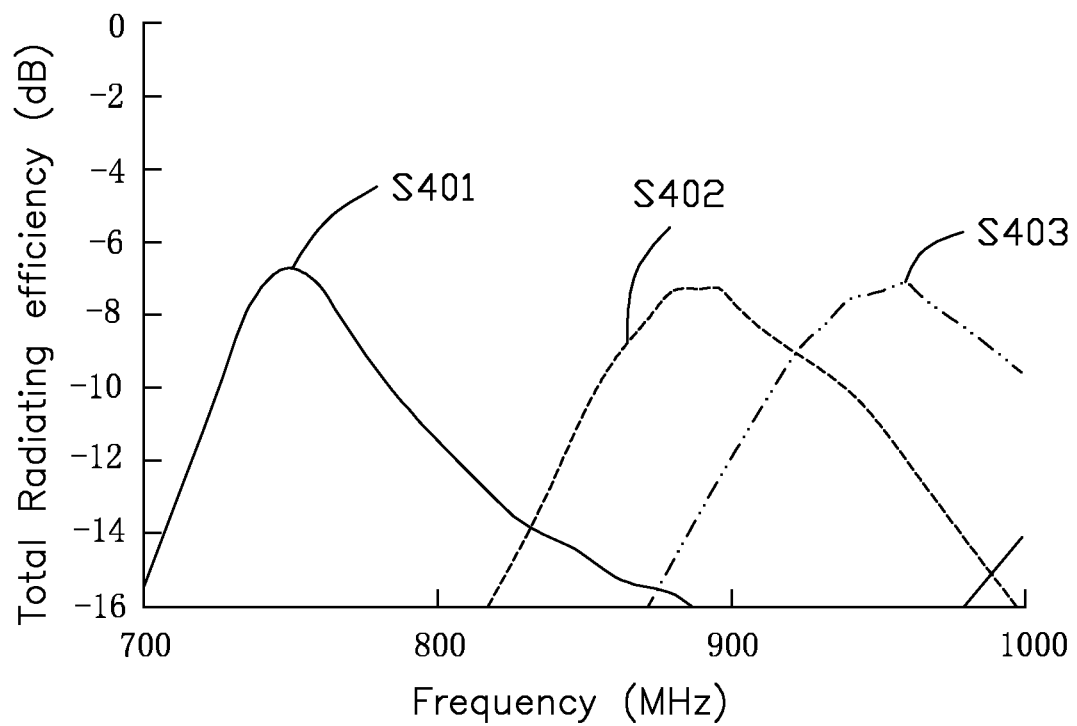
FIG. 40 is a total radiating efficiency graph when the antenna structure of FIG. 27 operates at a low frequency operation mode.

FIG. 40 illustrates a total radiating efficiency graph when the antenna structure 300 operates at a low frequency band. Curve S401 illustrates a total radiating efficiency when the antenna structure 300 operates at frequency bands of about 704-746 MHz and 746-787 MHz (LTE-A Band 17/13). Curve S402 illustrates a total radiating efficiency when the antenna structure 300 operates at a frequency band of about 824-894 MHz (LTE-A Band 5). Curve S403 illustrates a total radiating efficiency when the antenna structure 300 operates at a frequency band of about 880-960 MHz (LTE-A Band 8).

Figure 41:
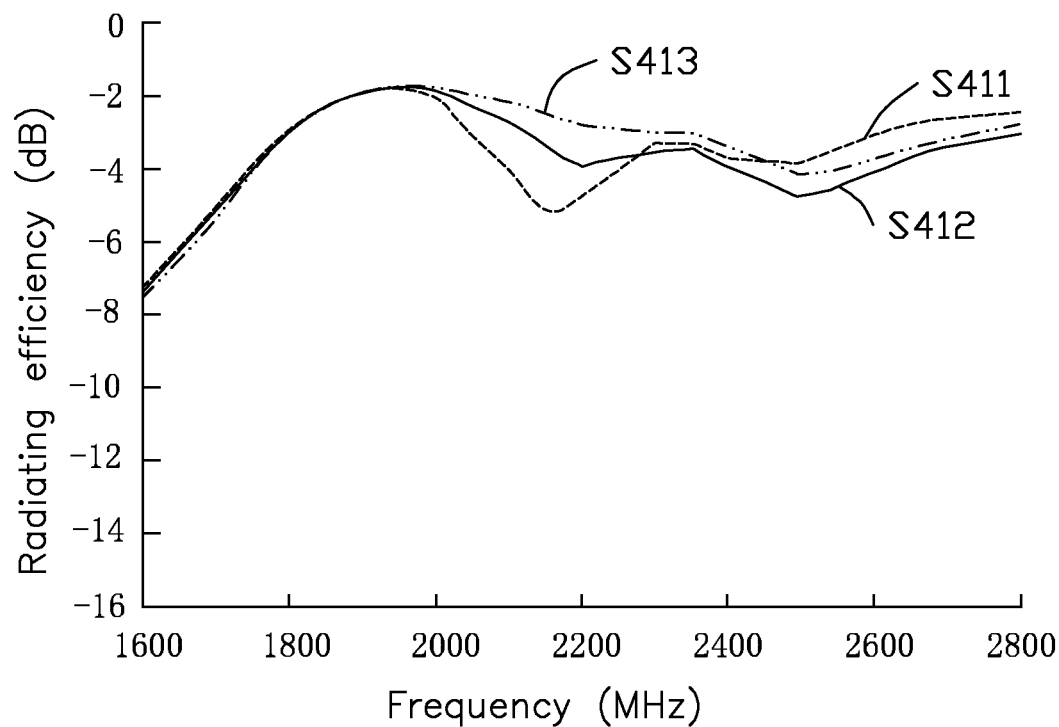
FIG. 41 is a radiating efficiency graph when the antenna structure of FIG. 27 operates at middle and high frequency operation modes.

FIG. 41 illustrates a radiating efficiency graph when the antenna structure 300 operates at middle and high frequency bands. Curve S411 illustrates a radiating efficiency when the antenna structure 300 operates at frequency bands of about 1805-2300 MHz. Curve S412 illustrates a radiating efficiency when the antenna structure 300 operates at a frequency band of about 2300-2400 MHz (LTE-A Band 40). Curve S413 illustrates a radiating efficiency when the antenna structure 300 operates at a frequency band of about 2500-2690 MHz (LTE-A Band 7).

Figure 42:
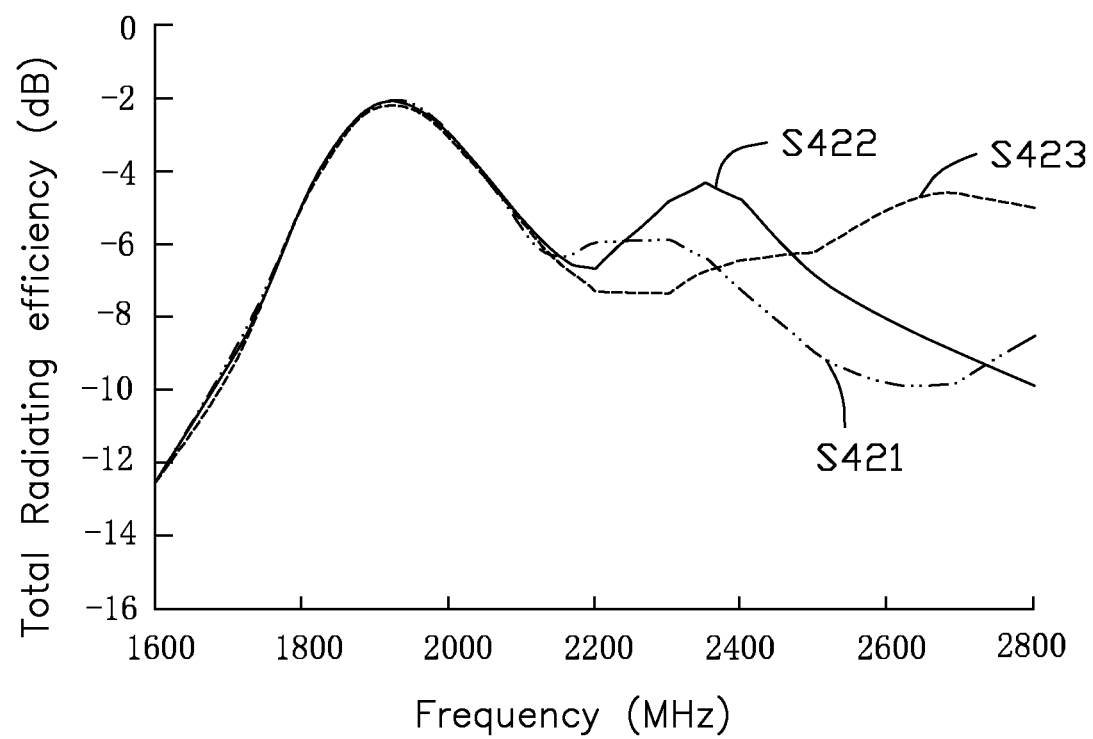
FIG. 42 is a total radiating efficiency graph when the antenna structure of FIG. 27 operates at middle and high frequency operation modes.

FIG. 42 illustrates a total radiating efficiency graph when the antenna structure 300 operates at middle and high frequency bands. Curve S421 illustrates a total radiating efficiency when the antenna structure 300 operates at frequency bands of about 1805-2300 MHz. Curve S422 illustrates a total radiating efficiency when the antenna structure 300 operates at a frequency band of about 2300-2400 MHz (LTE-A Band 40). Curve S423 illustrates a total radiating efficiency when the antenna structure 300 operates at a frequency band of about 2500-2690 MHz (LTE-A Band 7).

In FIGS. 37-42, the antenna structure 300 can operate at a low frequency band, for example, 734-960 MHz. When the antenna structure 300 operates at the low frequency band, a total radiating efficiency of the antenna structure 300 is bigger than −7 dB. The antenna structure 300 can further operate at middle and high frequency bands, for example, 1805-2690 MHz. When the antenna structure 300 operates at the middle and high frequency bands, a total radiating efficiency of the antenna structure 300 is bigger than −5 dB, and satisfies a design of the antenna.

Referring to FIGS. 43a-43h, in other exemplary embodiments, the first radiating portion 33, the second radiating portion 34, and the third radiating portion 35 are not limited to being above configuration and can be other configurations. The three radiating portions (i.e., the first radiating portion 33, the second radiating portion 34, and the third radiating portion 35) must always be spaced apart from each other, one of the three radiating portions must be electrically connected to the antenna section E1, and the other two of the three radiating portions must both be spaced apart from the antenna section E1. In addition, one of the three radiating portions must be electrically connected to the signal feed source 36 and the other two of the three radiating portions both be grounded. Then, the current from the signal feed source 36 directly flows to one of the three radiating portions electrically connected to the signal feed source 36 and is coupled to the other two radiating portions. The current further directly flows to or is coupled to the antenna section E1.

Figure 43A:
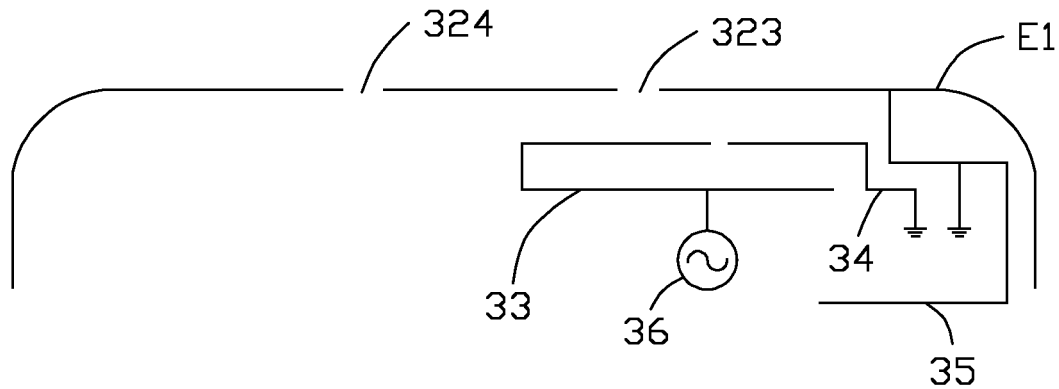
FIGS. 43a to 43h are schematic diagrams of the antenna structure of FIG. 27.

Referring to FIG. 43a, in one exemplary embodiment, the first radiating portion 33, the second radiating portion 34, and the third radiating portion 35 are spaced apart from each other. The first radiating portion 33 is electrically connected to the signal feed source 36 and is spaced apart from the antenna section E1. The second radiating portion 34 is spaced apart from the antenna section E1 and is electrically connected to the backboard 312 to be grounded. The third radiating portion 35 is spaced apart from the antenna section E1 and is electrically connected to the backboard 312 to be grounded.

Figure 43B:
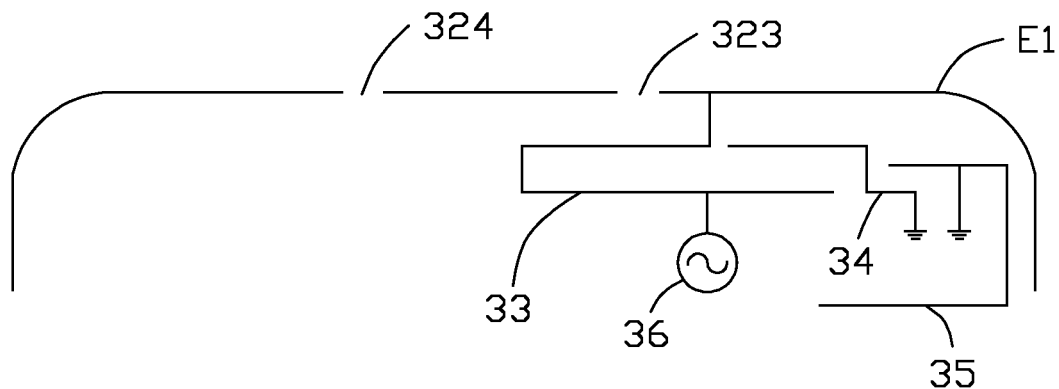

Referring to FIG. 43b, in one exemplary embodiment, the first radiating portion 33 is electrically connected to the antenna section E1 and the signal feed source 36. The second radiating portion 34 is spaced apart from the antenna section E1 and is electrically connected to the backboard 312 to be grounded. The third radiating portion 35 is spaced apart from the antenna section E1 and is electrically connected to the backboard 312 to be grounded.

Figure 43C:
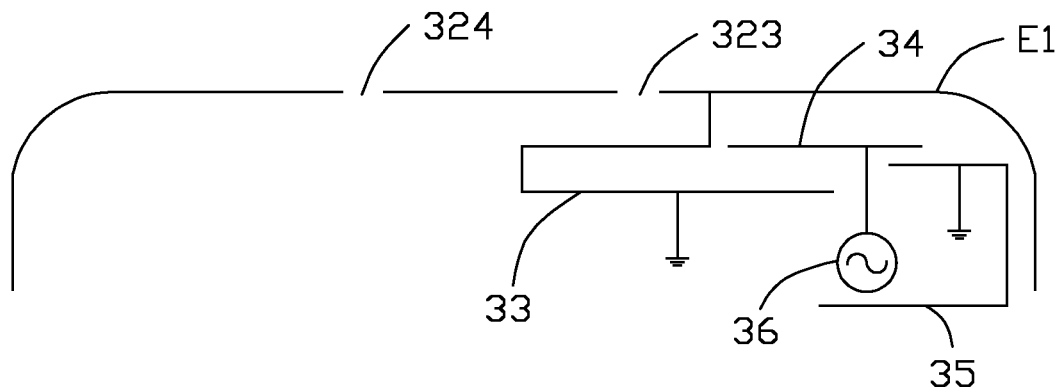

Referring to FIG. 43c, in one exemplary embodiment, one end of the first radiating portion 33 is electrically connected to the antenna section E1. Another end of the first radiating portion 33 is electrically connected to the backboard 312 to be grounded. The second radiating portion 34 is spaced apart from the antenna section E1 and is electrically connected to the signal feed source 36. The third radiating portion 35 is spaced apart from the antenna section E1 and is electrically connected to the backboard 312 to be grounded.

Figure 43D:
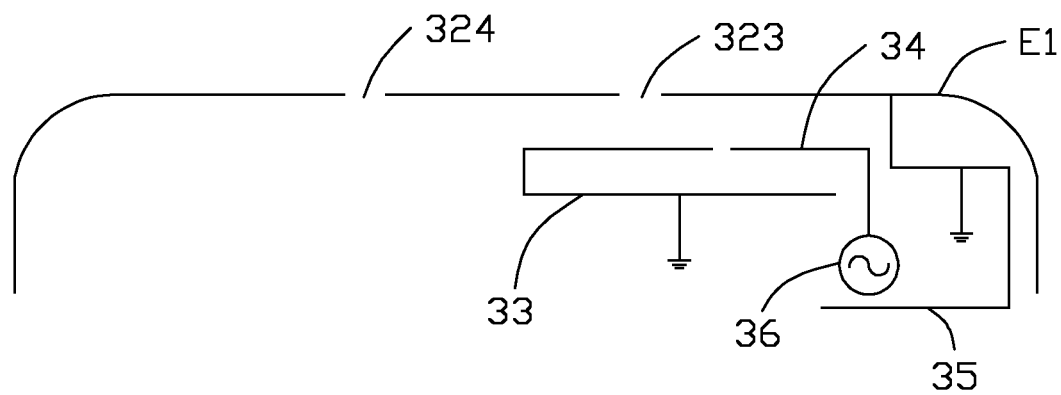

Referring to FIG. 43d, in one exemplary embodiment, the first radiating portion 33 is spaced apart from the antenna section E1 and is electrically connected to the backboard 312 to be grounded. The second radiating portion 34 is spaced apart from the antenna section E1 and is electrically connected to the signal feed source 36. The third radiating portion 35 is electrically connected to the antenna section E1 and is electrically connected to the backboard 312 to be grounded.

Figure 43E:
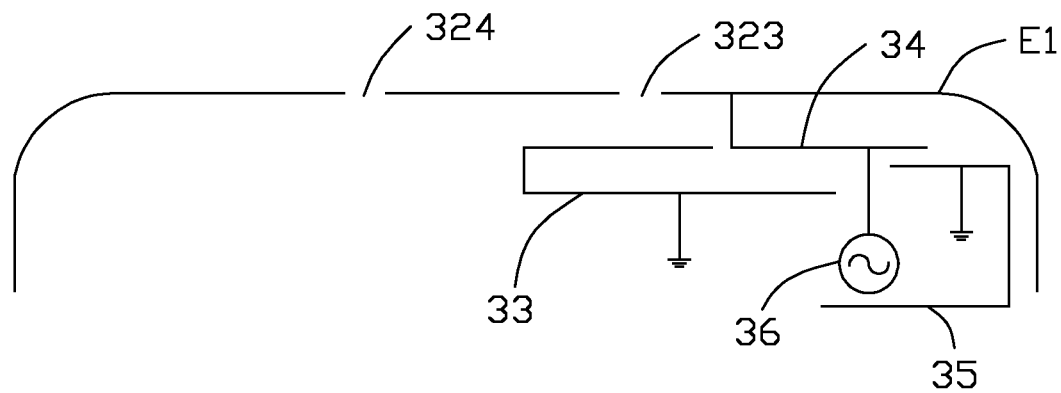

Referring to FIG. 43e, in one exemplary embodiment, the first radiating portion 33 is spaced apart from the antenna section E1 and is electrically connected to the backboard 312 to be grounded. The second radiating portion 34 is electrically connected to the antenna section E1 and is electrically connected to the signal feed source 36. The third radiating portion 35 is spaced apart from the antenna section E1 and is electrically connected to the backboard 312 to be grounded.

Figure 43F:
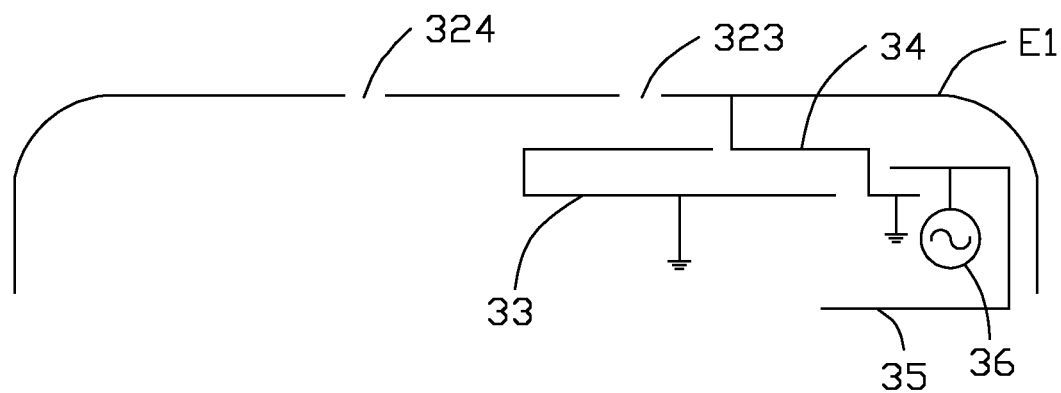

Referring to FIG. 43f, in one exemplary embodiment, the first radiating portion 33 is spaced apart from the antenna section E1 and is electrically connected to the backboard 312 to be grounded. The second radiating portion 34 is electrically connected to the antenna section E1 and is electrically connected to the backboard 312 to be grounded. The third radiating portion 35 is spaced apart from the antenna section E1 and is electrically connected to the signal feed source 36.

Figure 43G:
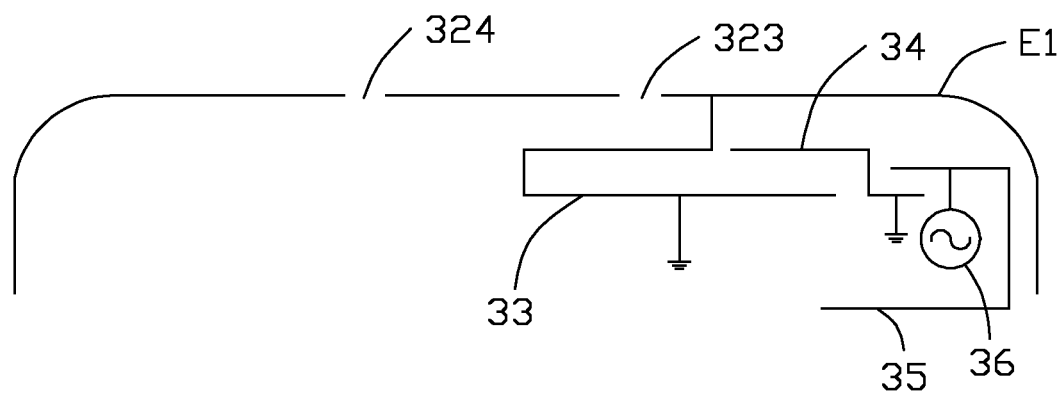

Referring to FIG. 43g, in one exemplary embodiment, the first radiating portion 33 is electrically connected to the antenna section E1 and is electrically connected to the backboard 312 to be grounded. The second radiating portion 34 is spaced apart from the antenna section E1 and is electrically connected to the backboard 312 to be grounded. The third radiating portion 35 is spaced apart from the antenna section E1 and is electrically connected to the signal feed source 36.

Figure 43H:
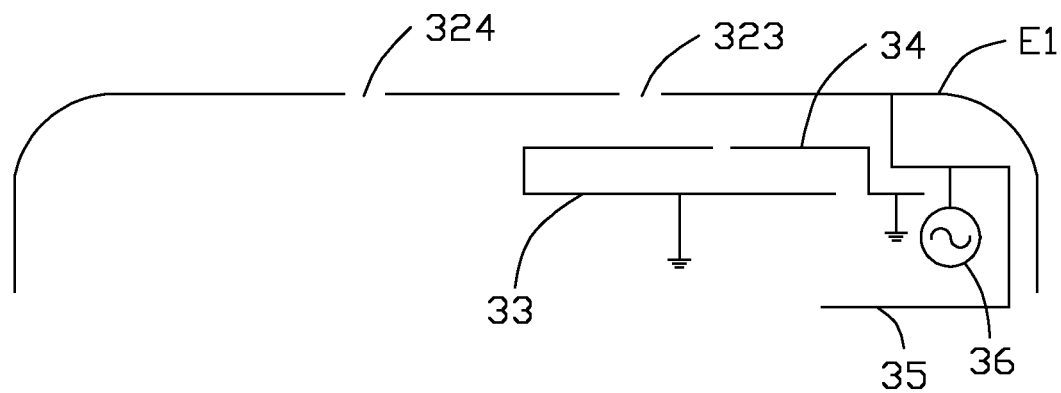

Referring to FIG. 43h, in one exemplary embodiment, the first radiating portion 33 is spaced apart from the antenna section E1 and is electrically connected to the backboard 312 to be grounded. The second radiating portion 34 is spaced apart from the antenna section E1 and is electrically connected to the backboard 312 to be grounded. The third radiating portion 35 is electrically connected to the antenna section E1 and is electrically connected to the signal feed source 36.

In this exemplary embodiment, the backboard 312 serves as the ground of the antenna structure 300 and the wireless communication device 400. In other exemplary embodiments, the wireless communication device 400 further includes a shielding mask or a middle frame (not shown). The shielding mask is positioned at the surface of the display 401 towards the backboard 312 and shields against electromagnetic interference. The middle frame is positioned at the surface of the display 401 towards the backboard 312 and supports the display 401. The shielding mask or the middle frame is made of metallic material. The shielding mask or the middle frame can be electrically connected to the backboard 312 to serve as the ground of the antenna structure 300 and the wireless communication device 400. At each ground point, the backboard 312 can be replaced by the shielding mask or the middle frame to ground the antenna structure 300 or the wireless communication device 400. In other exemplary embodiments, a main printed circuit board of the wireless communication device 400 may include a ground plane. At each ground point, the backboard 312 can be replaced by the ground plane to ground the antenna structure 300 or the wireless communication device 400. The ground plane can be electrically connected to the shielding mask, the middle frame, or the backboard 312.

As described above, the antenna structure 300 defines the slot 320, the first groove 321, the second groove 322, the first gap 323, and the second gap 324. The front frame 311 can be divided into at least the antenna section E1. The antenna structure 300 further includes the first radiating portion 33, the second radiating portion 34, the third radiating portion 35, and the signal feed source 36. The first radiating portion 33, the second radiating portion 34, the third radiating portion 35, and the antenna section E1 cooperatively form the antenna ANT3 to generate radiation signals in low, middle, and high frequency bands. The wireless communication device 400 can use carrier aggregation (CA) technology of LTE-A and the antenna ANT3 to receive or send wireless signals at multiple frequency bands simultaneously.

In addition, the antenna structure 300 includes the housing 31. The slot 320, the first groove 321, the second groove 322, the first gap 323, and the second gap 324 of the housing 31 are all defined on the front frame 311 and the side frame 313 instead of the backboard 312. Then, the backboard 312 forms an all-metal structure. That is, the backboard 312 does not define any other slot and/or gap and has good structural integrity and aesthetic quality.

Exemplary Embodiment 4

Figure 44:
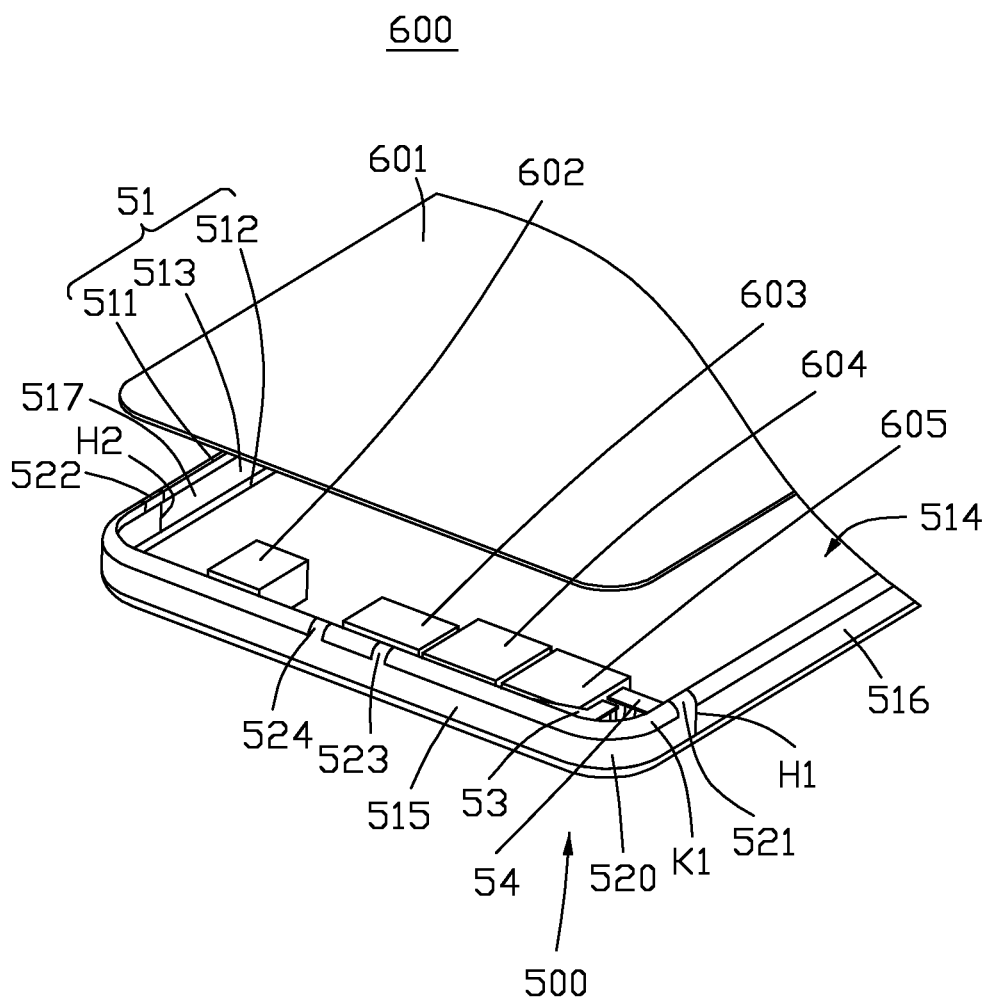
FIG. 44 is an isometric view of a fourth exemplary embodiment of the wireless communication device using a fourth exemplary antenna structure.

FIG. 44 illustrates an exemplary embodiment of a wireless communication device 600 using a fourth exemplary antenna structure 500. The wireless communication device 600 can be a mobile phone or a personal digital assistant, for example. The antenna structure 500 can receive and/or transmit wireless signals.

Figure 45:
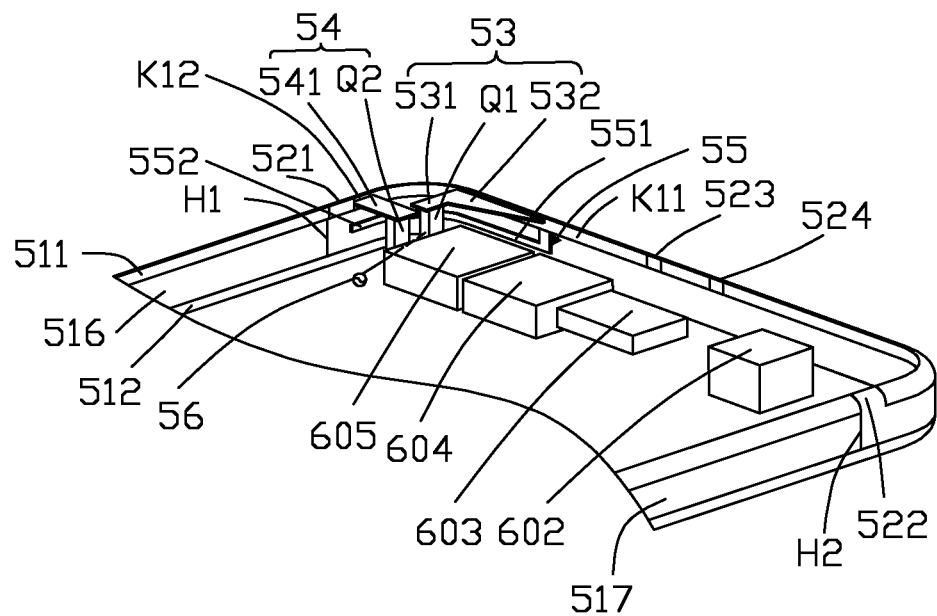
FIG. 45 is similar to FIG. 44, but shown from another angle.

In FIG. 45, the antenna structure 500 includes a housing 51, a first resonance portion 53, a second resonance portion 54, an extending portion 55, and a signal feed source 56. The housing 51 can be a metal housing of the wireless communication device 600. In this exemplary embodiment, the housing 51 is made of metallic material. The housing 51 includes a front frame 511, a backboard 512, and a side frame 513. The front frame 511, the backboard 512, and the side frame 513 can be integrally formed. The front frame 511, the backboard 512, and the side frame 513 cooperatively form the housing of the wireless communication device 600.

The front frame 511 defines an opening (not shown). The wireless communication device 600 includes a display 601. The display 601 is received in the opening. The display 601 has a display surface. The display surface is exposed at the opening and is parallel to the backboard 512.

The backboard 512 is positioned opposite to the front frame 511. The backboard 512 is directly connected to the side frame 513 and there is no gap between the backboard 512 and the side frame 513. The backboard 512 serves as the ground of the antenna structure 500 and the wireless communication device 600.

The side frame 513 is positioned between the backboard 512 and the front frame 511. The side frame 513 is positioned around a periphery of the backboard 512 and a periphery of the front frame 511. The side frame 513 forms a receiving space 514 together with the display 601, the front frame 511, and the backboard 512. The receiving space 514 can receive a printed circuit board, a processing unit, or other electronic components or modules.

The side frame 513 includes an end portion 515, a first side portion 516, and a second side portion 517. In this exemplary embodiment, the end portion 515 can be a top portion of the wireless communication device 600. The end portion 515 connects the front frame 511 and the backboard 512. The first side portion 516 is spaced apart from and parallel to the second side portion 517. The end portion 515 has first and second ends. The first side portion 516 is connected to the first end of the first frame 511 and the second side portion 517 is connected to the second end of the end portion 515. The first side portion 516 and the second side portion 517 both connect to the front frame 511.

The side frame 513 defines a slot 520. The front frame 511 defines a first groove 521, a second groove 522, a first gap 523, and a second gap 524. In this exemplary embodiment, the slot 520 is defined at the end portion 515 and extends to the first side portion 516 and the second side portion 517. In other exemplary embodiments, the slot 520 is defined only at the end portion 515 and does not extend to any one of the first side portion 516 and the second side portion 517. In other exemplary embodiments, the slot 520 can be defined at the end portion 515 and extend to one of the first side portion 516 and the second side portion 517.

The first groove 521, the second groove 522, the first gap 523, and the second gap 524 are all in communication with the slot 520 and extend across the front frame 511. In this exemplary embodiment, the first groove 521 is defined on the front frame 511 and communicates with a first end H1 of the slot 520 positioned on the first side portion 516. The second groove 522 is defined on the front frame 511 and communicates with a second end H2 of the slot 520 positioned on the second side portion 517.

The first gap 523 and the second gap 524 are both defined on the front frame 511 between the first end H1 and the second end H2. The first gap 523 and the second gap 524 are spaced apart from each other and in communication with the slot 520. The slot 520, the first groove 521, the second groove 522, the first gap 523, and the second gap 524 separate an antenna section K1 from the housing 51. Then, the portion of the front frame 511 between the first groove 521 and the first gap 523 forms the antenna section K1.

In this exemplary embodiment, the slot 520, the first groove 521, the second groove 522, the first gap 523, and the second gap 524 are all filled with insulating material, for example, plastic, rubber, glass, wood, ceramic, or the like.

In this exemplary embodiment, the slot 520 is defined at the end of the side frame 513 adjacent to the backboard 512 and extends to the front frame 511. Then the antenna section K1 is fully formed by a portion of the front frame 511. In other exemplary embodiments, a position of the slot 520 can be adjusted. For example, the slot 520 can be defined on the end of the side frame 513 adjacent to the backboard 512 and extend towards the front frame 511. Then the antenna section K1 is formed by a portion of the front frame 511 and a portion of the side frame 513.

In this exemplary embodiment, except for the slot 520, the first groove 521, the second groove 522, the first gap 523, and the second gap 524, an upper half portion of the front frame 511 and the side frame 513 does not define any other slot, break line, and/or gap. That is, there are only the first groove 521, the second groove 522, the first gap 523, and the second gap 524 defined on the upper half portion of the front frame 511.

In this exemplary embodiment, a width of the slot 520 is about 3.43 mm. A width of the first gap 523 and a width of the second gap 524 are both about 2 mm. A width of the first groove 521 and a width of the second groove 522 are both about 3.43 mm.

Figure 46:
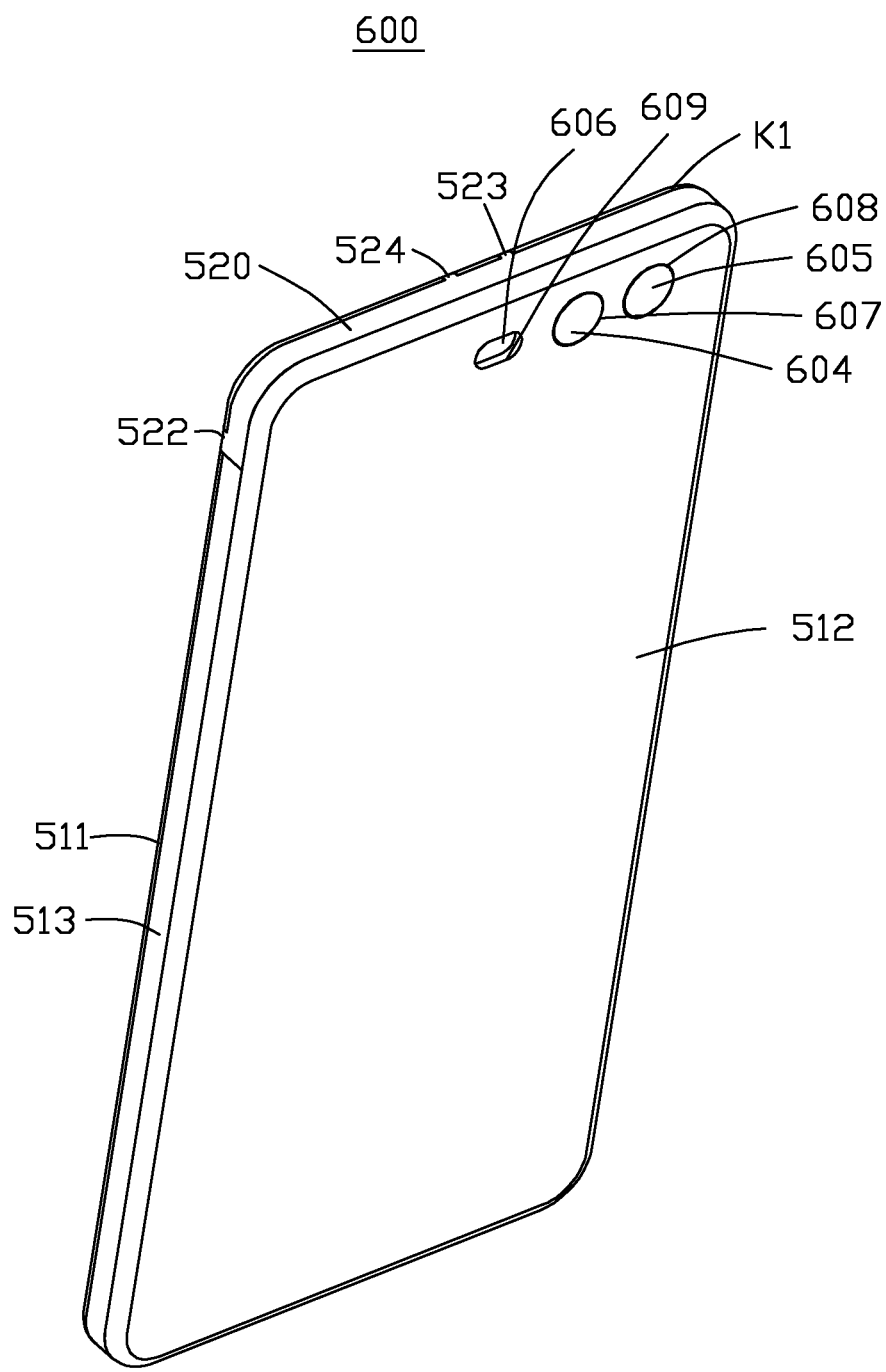
FIG. 46 is an assembled, isometric view of the wireless communication device of FIG. 44.

In FIG. 46, the wireless communication device 600 further includes at least one electronic element. In this exemplary embodiment, the wireless communication device 600 includes a first electronic element 602, a second electronic element 603, a third electronic element 604, a fourth electronic element 605, and a fifth electronic element 606. In this exemplary embodiment, the first electronic element 602 is a front camera module. The first electronic element 602 is positioned between the second gap 524 and the second side portion 517. The second electronic element 603 is a speaker and is positioned between the first gap 523 and the second gap 524. The third electronic element 604 and the fourth electronic element 605 are both rear camera modules. The third electronic element 604 and the fourth electronic element 605 are spaced apart from each other. The third electronic element 604 and the fourth electronic element 605 are positioned between the second electronic element 603 and the first side portion 516. The fifth electronic element 606 is a flash light.

The backboard 512 is an integrally formed metallic sheet. The backboard 512 defines holes 607, 608, and 609 for exposing double camera lenses (i.e., the third electronic element 604 and the fourth electronic element 605) and a flash light (i.e., the fifth electronic element 606). The backboard 512 does not define any slot, break line, and/or gap to divide the backboard 512.

Figure 47:
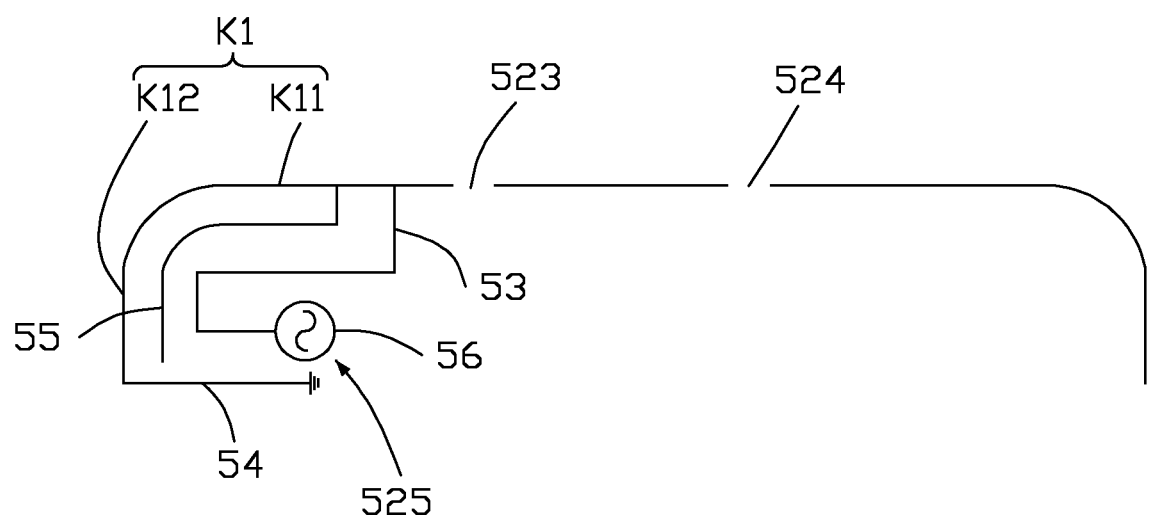
FIG. 47 is a schematic diagram of the antenna structure of FIG. 44.

In FIG. 45 and FIG. 47, in this exemplary embodiment, the slot 520 is defined on the end portion 515 and extends to the first side portion 516 and the second side portion 517. The antenna section K1 includes a first section K11 and a second section K12 perpendicular to the first section K11. A junction of the first section K11 and the second section K12 forms a corner. The first resonance portion 53, the second resonance portion 54, the extending portion 55, and the signal feed source 56 are all positioned at a receiving space 525 starting from the first section K11 and the second section K12 and stopping at the first groove 521 and the second gap 523.

In this exemplary embodiment, the first resonance portion 53, the second resonance portion 54, and the extending portion 55 are all spaced apart from each other. The first resonance portion 53 includes a first connecting arm Q1, a first resonance section 531, and a second resonance section 532. The first connecting arm Q1 is substantially rectangular and is positioned on a plane perpendicular to the plane of the backboard 512. The first connecting arm Q1 is electrically connected to the signal feed source 56 for feeding current to the first resonance portion 53.

The first resonance section 531 is substantially rectangular and is positioned on a plane parallel to the plane of the backboard 512. The first resonance section 531 is perpendicularly connected to the end of the first connecting arm Q1 away from the signal feed source 56 and extends along a direction parallel to the first side portion 516 towards the end portion 515. The extension continues until the first resonance section 531 is electrically connected to the first section K11. The second resonance section 532 is substantially triangular and is coplanar with the first resonance section 531. One end of the second resonance section 532 is perpendicularly connected to the end of the first resonance section 531 away from the first side portion 516 and extends towards the second side portion 517.

The second resonance portion 54 includes a second connecting arm Q2 and a resonance arm 541. The second connecting arm Q2 is positioned on a plane perpendicular to the plane of the backboard 512. The second connecting arm Q2 is substantially rectangular and is electrically connected to the backboard 512 to be grounded. The resonance arm 541 is substantially rectangular and is positioned on a plane parallel to the plane of the backboard 512. One end of the resonance arm 541 electrically connected to the end of the second connecting arm Q2 away from the backboard 512. Another end of the resonance arm 541 extends along a direction parallel to the end portion 515 towards the first side portion 516. The extension continues until the resonance arm 541 is electrically connected to the side of the second section K12 adjacent to the first groove 521.

In this exemplary embodiment, the extending portion 55 is substantially arc-shaped and is attached to the insulating material of the slot 520. The extending portion 55 includes a first extending section 551 and a second extending section 552 perpendicular to the first extending section 551. A junction of the first extending section 551 and the second extending section 552 forms a corner. The first extending section 551 is attached to the insulating material of the slot 520 corresponding to the end portion 515 and is electrically connected to the first section K11. The second extending section 552 is attached to the insulating material of the slot 520 corresponding to the first side portion 516. The corner of the first extending section 551 and the second extending section 552 is attached to the corner of the first side portion 516 and the end portion 515. In this exemplary embodiment, the first extending section 551 is positioned between the first resonance portion 53 and the backboard 512. The second extending section 552 is positioned between the second resonance portion 54 and the backboard 512.

In other exemplary embodiments, the extending portion 55 can also be not attached to the insulating material of the slot 520. The extending portion 55 is spaced apart from and parallel to the slot 520. The corner of the extending portion 55 is also spaced apart from and parallel to the corner of the antenna section K1. Then the antenna section K1 is positioned on a first plane. The extending portion 55 is positioned on a second plane. The backboard 512 is positioned on a third plane. The first plane, the second plane, and the third plane are different from each other and are parallel to each other. The second plane is positioned between the first plane and the third plane.

Figure 48:
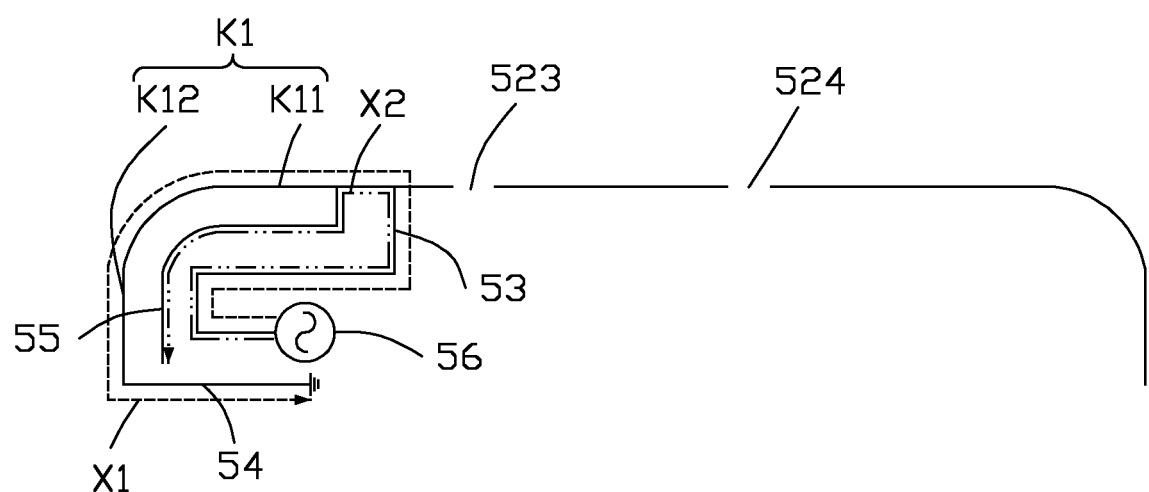
FIG. 48 is a current path distribution graph of the antenna structure of FIG. 44.
Figure 49:
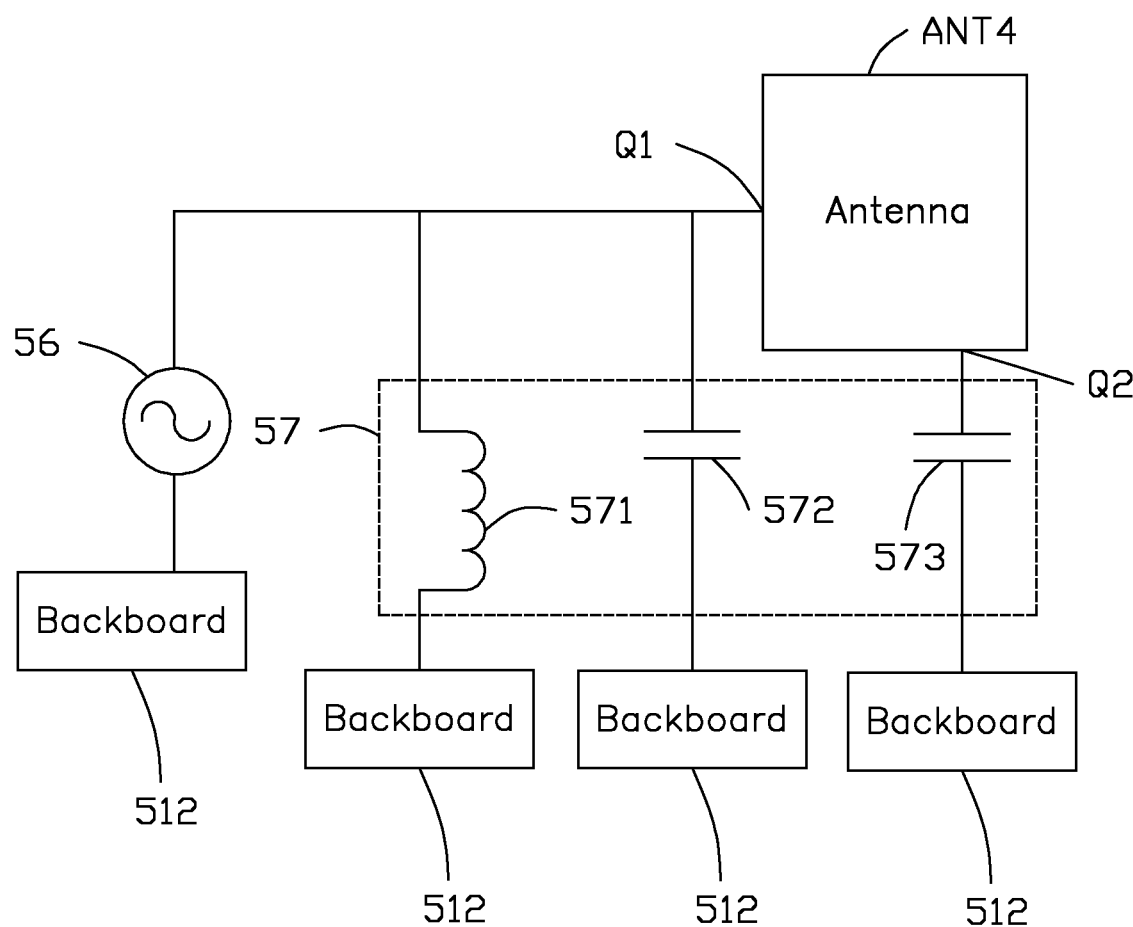
FIG. 49 is a circuit diagram of a matching circuit of the antenna structure of FIG. 44.

In FIGS. 48-49, in this exemplary embodiment, the antenna section K1, the first resonance portion 53, the second resonance portion 54, and the extending portion 55 cooperatively form an antenna ANT4 to activate a resonance mode for generating radiation signals in a predetermined frequency band. In this exemplary embodiment, the resonance mode includes a GPS operation mode and WIFI 2.4G/5G operation mode.

In FIG. 48, when the signal feed source 56 supplies current, the current flows through the first resonance portion 53 and directly to the antenna section K1 through the first resonance portion 53, flows to the second resonance portion 54, and is grounded through the second resonance portion 54. Then, the signal feed source 56, the first resonance portion 53, the antenna section K1, and the second resonance portion 54 cooperatively form a loop antenna to activate a first frequency band through a method of a half of a wavelength. The first frequency band has a resonance frequency $f_0$ of about 1575 MHz, that is, a GPS frequency band (e.g., path X1).

When the signal feed source 56 supplies current, the current flows through the first resonance portion 53, directly flows to the antenna section K1 through the first resonance portion 53, and flows to the extending portion 55. Then, the signal feed source 56, the first resonance portion 53, the antenna section K1, and the extending portion 55 cooperatively form a monopole antenna to activate a second frequency band through a method of a quarter of a wavelength. The second frequency band has a resonance frequency $f_1$ of about 2400 MHz, that is, a WIFI 2.4 GHz frequency band (e.g., path X2). In addition, a frequency multiplication of the resonance frequency $f_1$ further activates a third frequency band having a resonance frequency $f_2$ of about 5400 MHz, that is, WIFI 5 GHz frequency band.

In FIG. 49, in this exemplary embodiment, the antenna ANT4 forms a two-port network. The two ports include the first connecting arm Q1 and the second connecting arm Q2. Each port includes one corresponding matching element. These matching elements cooperatively form a matching circuit 57 to effectively adjust and optimize a resonance frequency band of the antenna ANT4. In this exemplary embodiment, the matching circuit 57 includes a first matching element 571, a second matching element 572, and a third matching element 573. One end of the first matching element 571 is electrically connected between the first connecting arm Q1 and the signal feed source 56. Another end of the first matching element 571 is electrically connected to the backboard 512 to be grounded. One end of the second matching element 572 is electrically connected between the first matching element 571 and the first connecting arm Q1. Another end of the second matching element 572 is electrically connected to the backboard 512 to be grounded. One end of the third matching element 573 is electrically connected to the second connecting arm Q2. Another end of the third matching element 573 is electrically connected to the backboard 512 to be grounded.

In this exemplary embodiment, the first matching element 571 is an inductor. The second matching element 572 and the third matching element 573 are capacitors. In other exemplary embodiments, the first matching element 571, the second matching element 572, and the third matching element 573 are not limited to be the inductors and/or the capacitors and can be other matching components.

Figure 50:
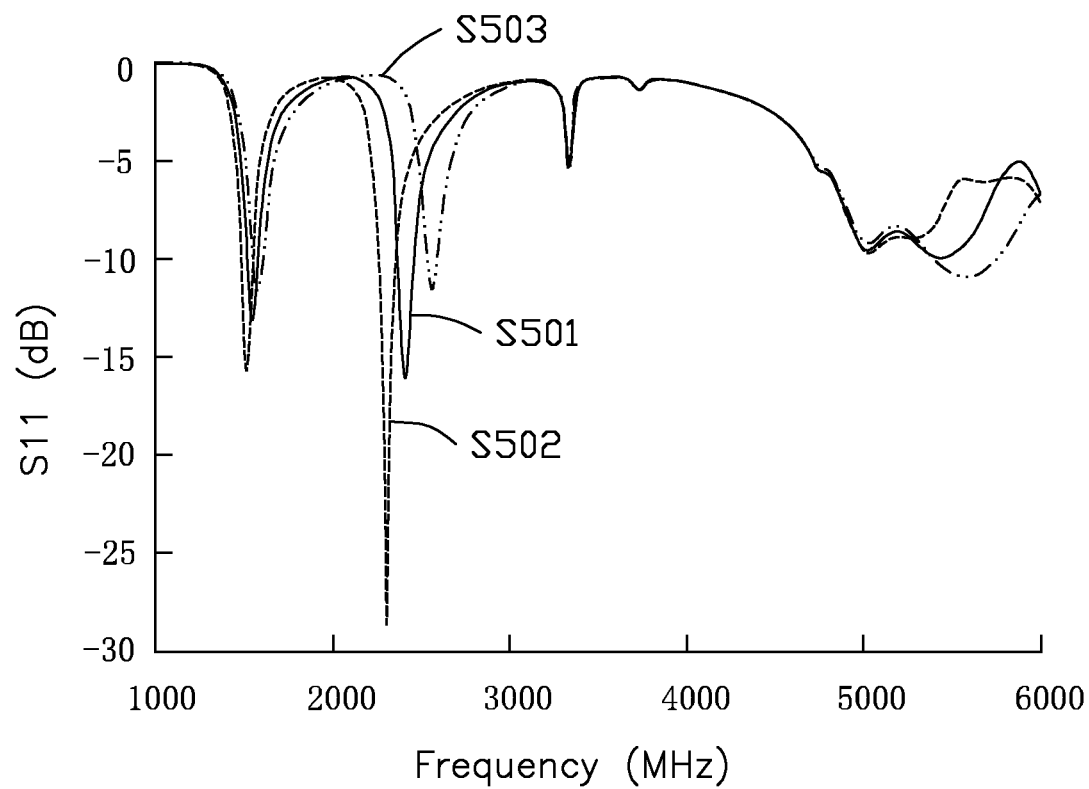
FIG. 50 is a scattering parameter graph when an extending portion of the antenna structure of FIG. 44 being different lengths.

FIG. 50 illustrates a scattering parameter graph of the antenna structure 500, when the extending portion 55 being different lengths. Curve S501 illustrates a scattering parameter of the antenna structure 500, when the extending portion 55 has a predetermined length. Curve S502 illustrates a scattering parameter of the antenna structure 500, when the extending portion 55 adds 2 mm on the basis of the predetermined length. Curve S503 illustrates a scattering parameter of the antenna structure 500, when the extending portion 55 reduces 2 mm on the basis of the predetermined length. In view of curves S501 to S503, when a length of the extending portion 55 is changed, a frequency of the WIFI 2.4/5 GHz operation mode can be changed and a frequency of the GPS operation mode is unaffected.

Figure 51:
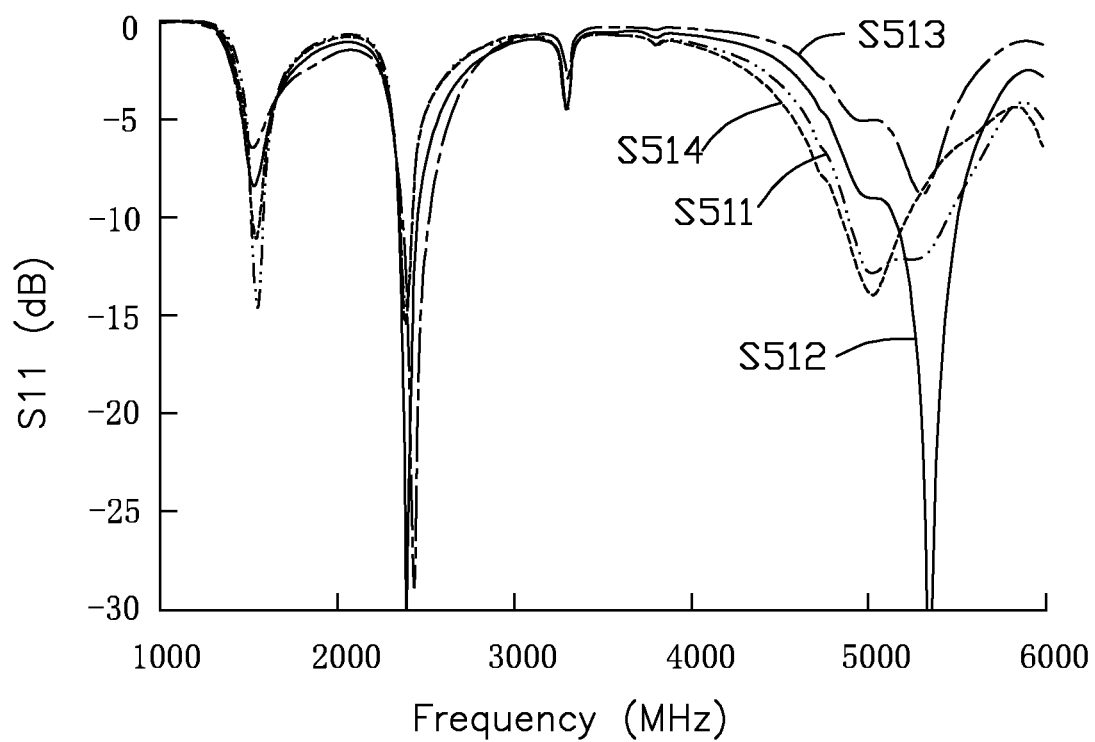
FIG. 51 is a scattering parameter graph when a second matching element of the antenna structure of FIG. 44 being different capacitors.

FIG. 51 illustrates a scattering parameter graph of the antenna structure 500, when a capacitor, as the second matching element 572, has different capacitance values. Curve S511 illustrates a scattering parameter of the antenna structure 500, when the second matching element 572 is a capacitor of about 0.25 pF. Curve S512 illustrates a scattering parameter of the antenna structure 500, when the second matching element 572 is a capacitor of about 0.5 pF. Curve S513 illustrates a scattering parameter of the antenna structure 500, when the second matching element 572 is a capacitor of about 1 pF. Curve S514 illustrates a scattering parameter of the antenna structure 500, when the second matching element 572 is at an open-circuit state. In view of curves S511 to S514, the second matching element 572 mainly adjust a bandwidth and an impedance matching of the WIFI 2.4/5 GHz operation mode.

Figure 52:
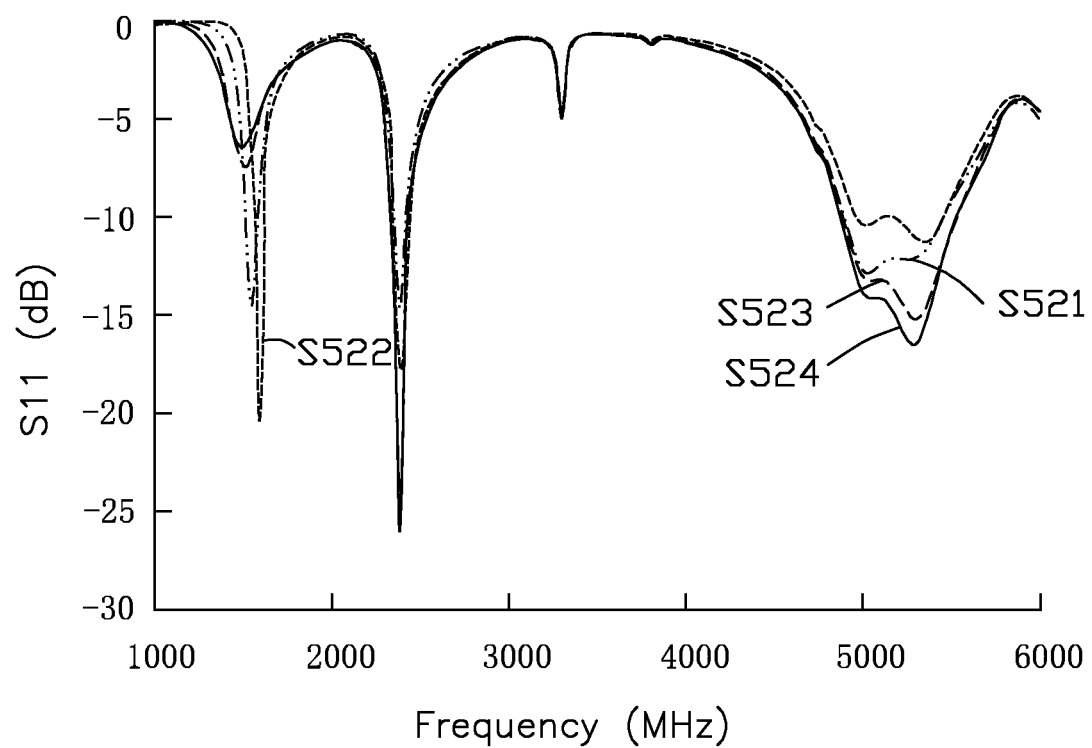
FIG. 52 is a scattering parameter graph when a third matching element of the antenna structure of FIG. 44 being different capacitors.

FIG. 52 illustrates a scattering parameter graph of the antenna structure 500, when a capacitor, as the third matching element 573, has different capacitance values. Curve S521 illustrates a scattering parameter of the antenna structure 500, when the third matching element 573 is a capacitor of about 3 pF. Curve S522 illustrates a scattering parameter of the antenna structure 500, when the third matching element 573 is a capacitor of about 2 pF. Curve S523 illustrates a scattering parameter of the antenna structure 500, when the third matching element 573 is a capacitor of about 4 pF. Curve S524 illustrates a scattering parameter of the antenna structure 500, when the third matching element 573 is a capacitor of about 5 pF. In view of curves S521 to S524, the third matching element 573 mainly adjust a bandwidth and an impedance matching of the GPS operation mode.

Figure 53:
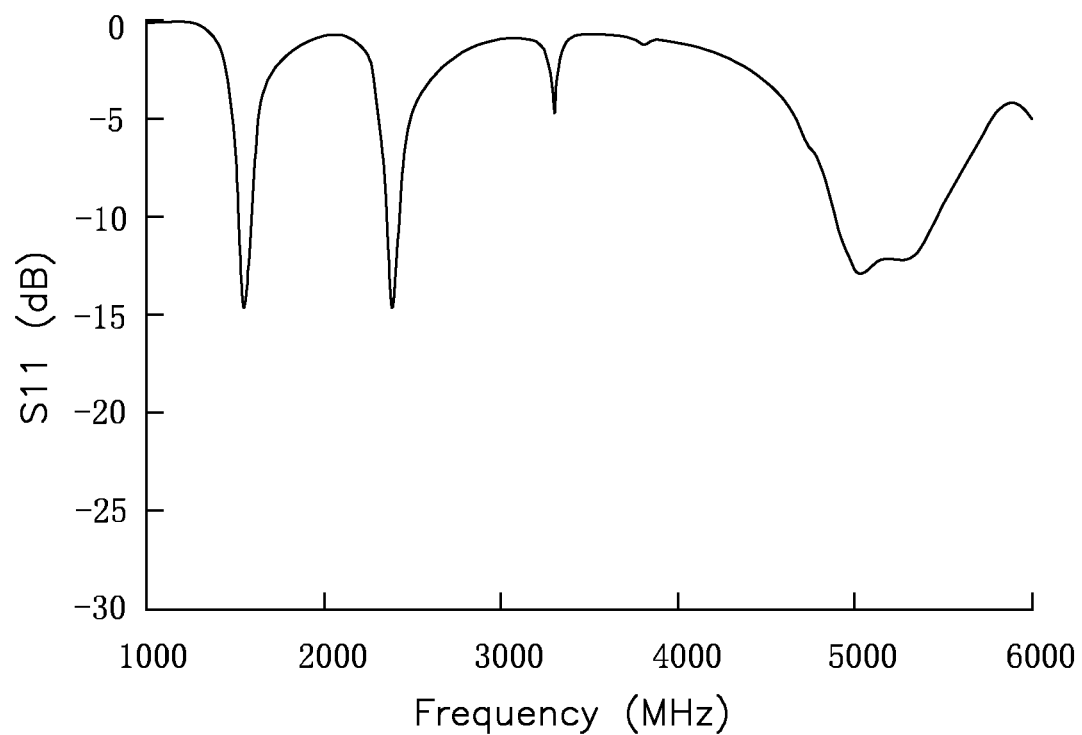
FIG. 53 is a scattering parameter graph of the antenna structure of FIG. 44.
Figure 54:
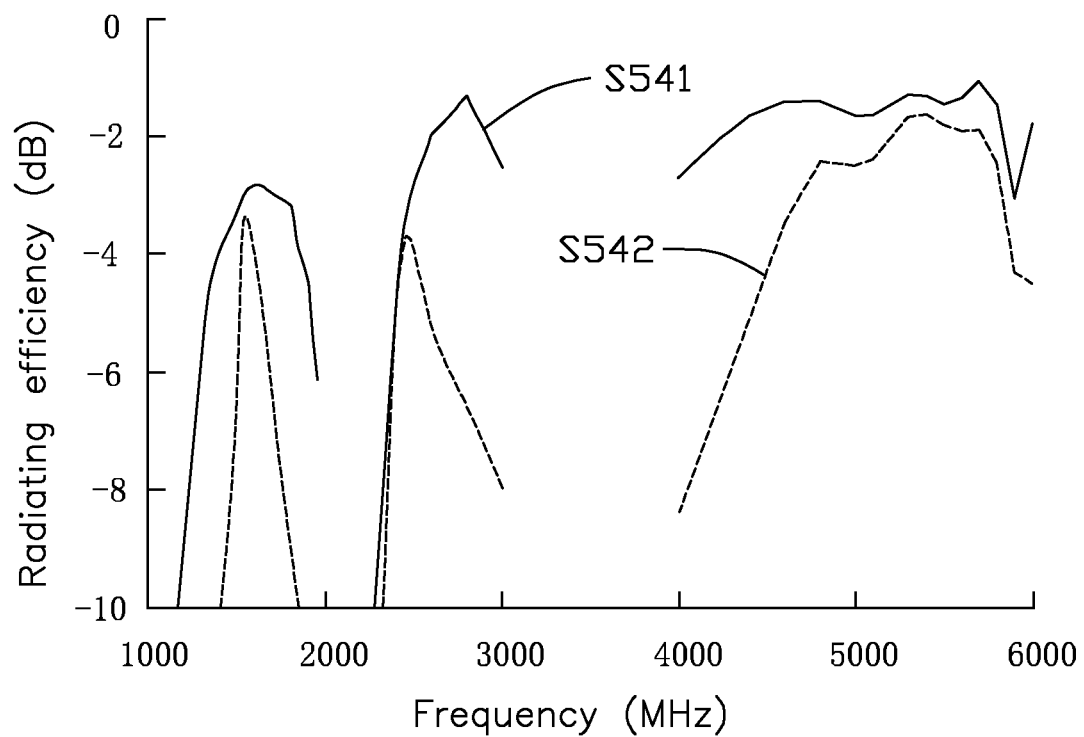
FIG. 54 is a radiating efficiency graph of the antenna structure of FIG. 44.

FIG. 53 illustrates a scattering parameter graph of the antenna structure 500, when the first matching element 571 is an inductor of about 10 nH, the second matching element 572 is a capacitor of about 0.25 pF, and the third matching element 573 is a capacitor of about 3 pF. FIG. 54 illustrates a radiating efficiency graph of the antenna structure 500, when the first matching element 571 is an inductor of about 10 nH, the second matching element 572 is a capacitor of about 0.25 pF, and the third matching element 573 is a capacitor of about 3 pF. Curve S541 illustrates a radiating efficiency of the antenna structure 500. Curve S542 illustrates a total radiating efficiency of the antenna structure 500.

In FIG. 53 to FIG. 54, the antenna structure 500 can operate at frequency bands of about 1565-1615 MHz, 2400-2480 MHz, and 5180-5800 MHz. That is, the antenna structure 500 can operate at the GPS frequency band and the WIFI 2.4G/5G frequency band, and when the antenna structure 500 operates at these frequency bands, an operating frequency satisfies a design of the antenna and also has a good radiating efficiency.

In FIG. 55a to FIG. 55f, in other exemplary embodiments, the first resonance portion 53, the second resonance portion 54, and the extending portion 55 are not limited to being in above configuration and can be other configurations. The first resonance portion 53, the second resonance portion 54, and the extending portion 55 must be spaced apart from each other, one of the first resonance portion 53 and the second resonance portion 54 be electrically connected to the signal feed source 56, and the other of first resonance portion 53 and the second resonance portion 54 be grounded.

Figure 55A:
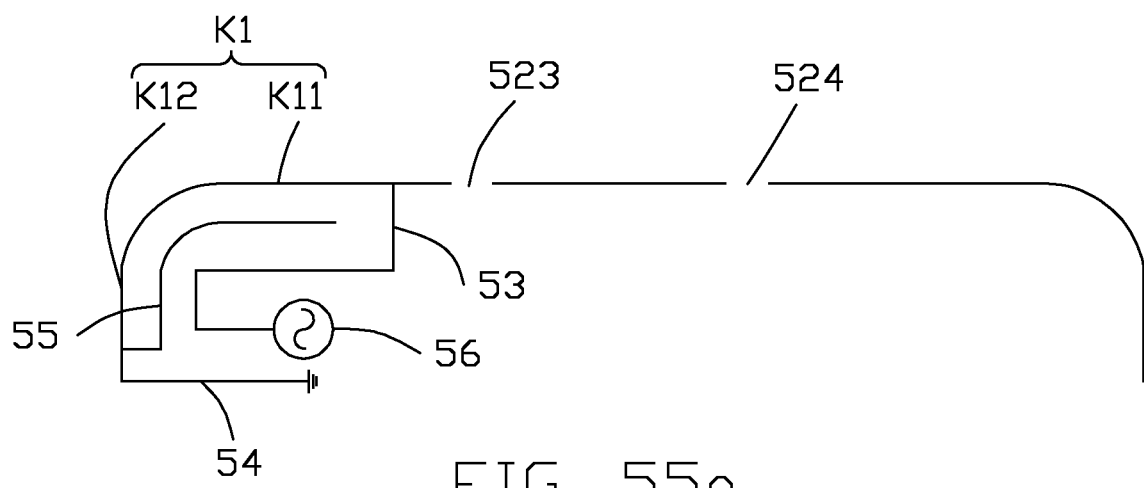
FIGS. 55a to 55f are schematic diagrams of the antenna structure of FIG. 44.

In FIG. 55a, in one exemplary embodiment, a connecting point of the extending portion 55 and the antenna section K1 is not limited to being the location of the antenna section K1 adjacent to the first gap 523, and can be the location of the antenna section K1 adjacent to the first groove 521, or other location.

Figure 55B:
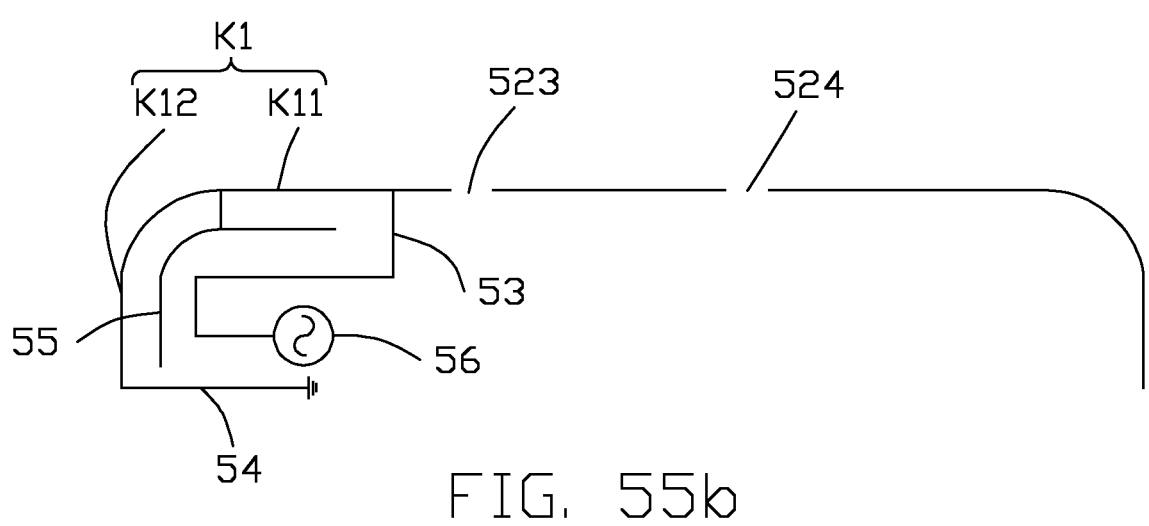

In FIG. 55b, in one exemplary embodiment, the extending portion 55 is substantially T-shaped and is electrically connected to the antenna section K1 at any location.

Figure 55C:
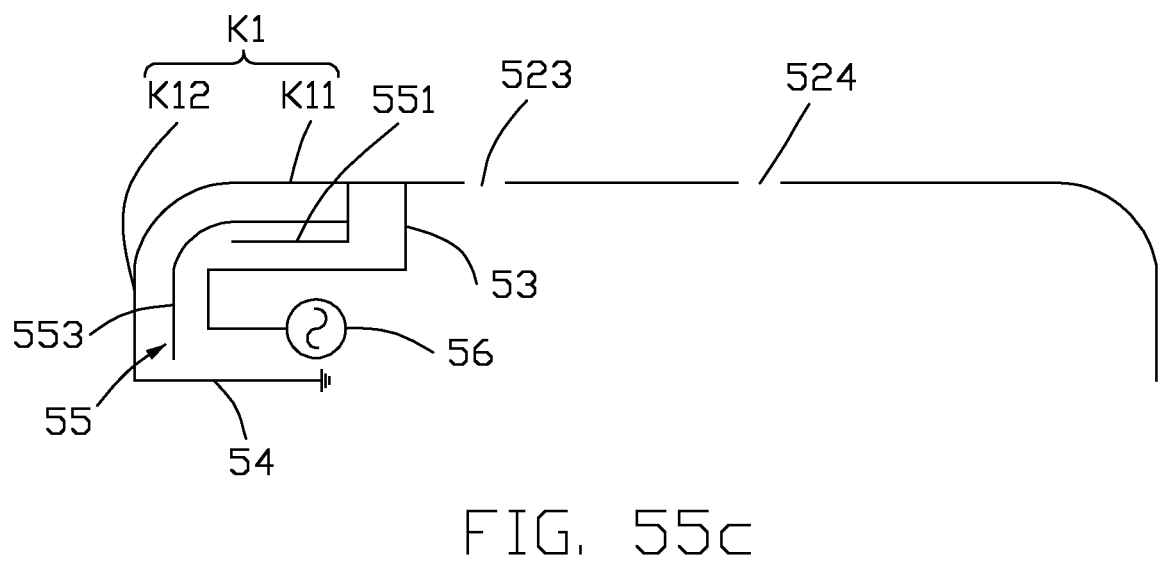

In FIG. 55c, in one exemplary embodiment, the extending portion 55 includes a plurality of extending arms, for example extending arms 551, 553 connected to each other. The extending portion 55 is electrically connected to the antenna section K1.

Figure 55D:
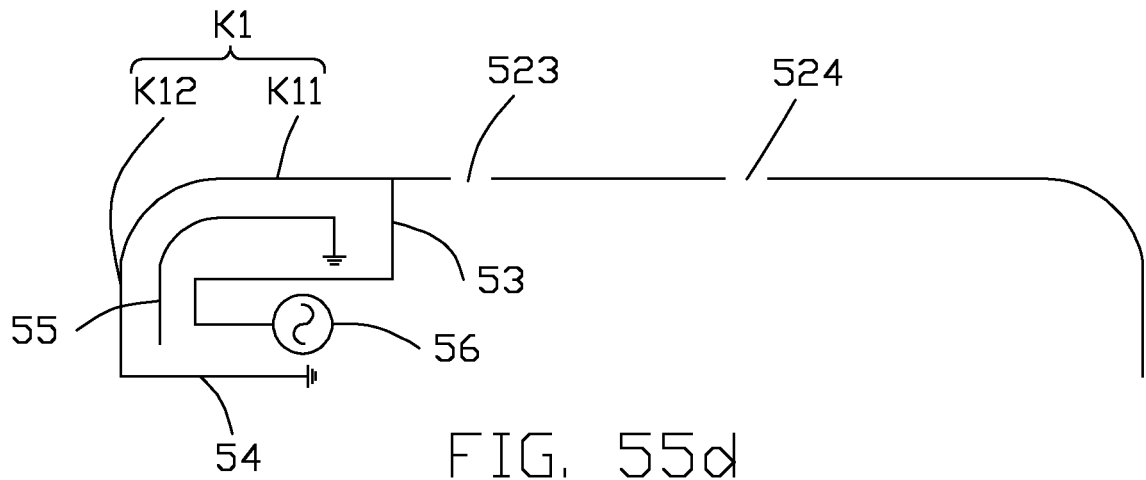

In FIG. 55d, in one exemplary embodiment, the extending portion 55 is spaced apart from the antenna section K1 and is electrically connected to the backboard 512 to be grounded.

Figure 55E:
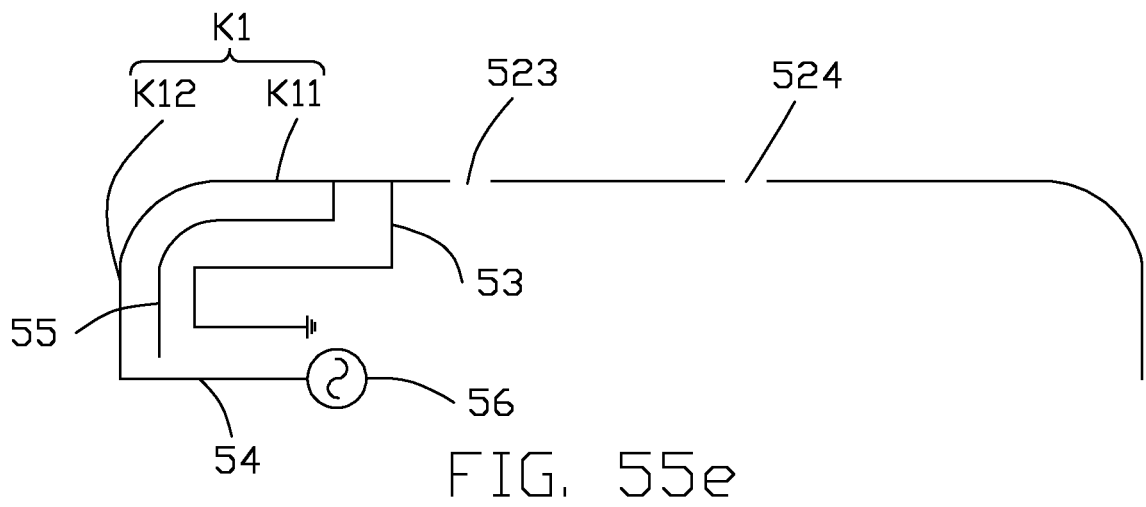

In FIG. 55e, in one exemplary embodiment, a connecting relationship of the first resonance portion 53 and the signal feed source 56 and a connecting relationship of the second resonance portion 54 and ground can be exchanged. For example, the first resonance portion 53 can be electrically connected to the backboard 512 to be grounded. The second resonance portion 54 can be electrically connected to the signal feed source 56.

Figure 55F:
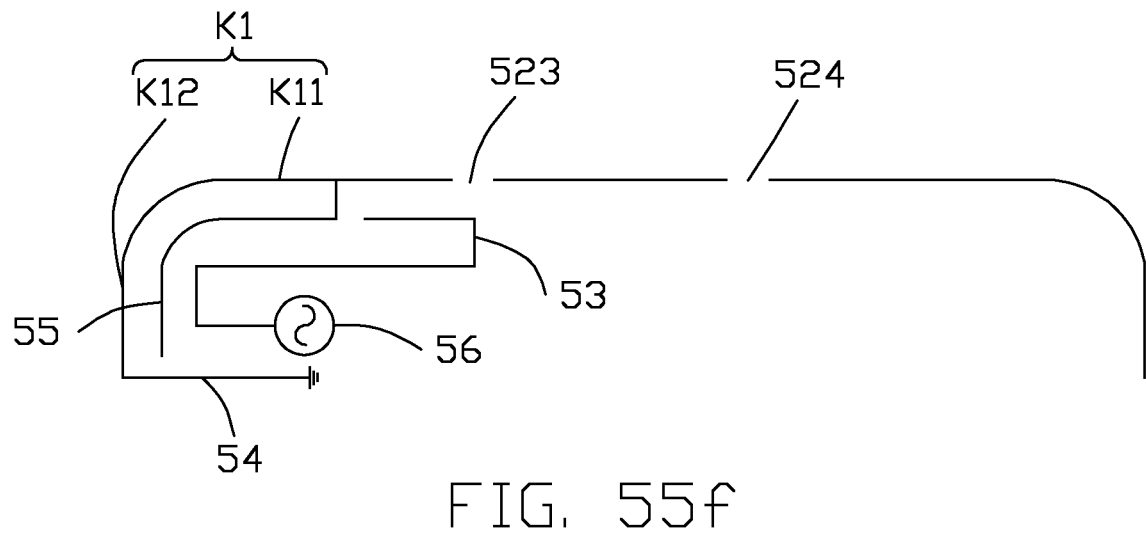

In FIG. 55f, in one exemplary embodiment, the first resonance portion 53 is spaced apart from the antenna section K1 instead of electrically connecting to the antenna section K1. Then, when the signal feed source 56 supplies current, the current flows to the first resonance portion 53 and is coupled to the antenna section K1 through the first resonance portion 53.

In this exemplary embodiment, the backboard 512 serves as the ground of the antenna structure 500 and the wireless communication device 600. In other exemplary embodiments, the wireless communication device 600 further includes a shielding mask or a middle frame (not shown). The shielding mask is positioned at the surface of the display 601 towards the backboard 512 and shields against electromagnetic interference. The middle frame is positioned at the surface of the display 601 towards the backboard 512 and supports the display 601. The shielding mask or the middle frame is made of metallic material. The shielding mask or the middle frame can be electrically connected to the backboard 512 to serve as the ground of the antenna structure 500 and the wireless communication device 600. At each ground point, the backboard 512 can be replaced by the shielding mask or the middle frame to ground the antenna structure 500 or the wireless communication device 600. In other exemplary embodiments, a main printed circuit board of the wireless communication device 600 may include a ground plane. At each ground point, the backboard 512 can be replaced by the ground plane to ground the antenna structure 500 or the wireless communication device 600. The ground plane can be electrically connected to the shielding mask, the middle frame, or the backboard 512.

As described above, the antenna structure 500 defines the slot 520, the first groove 521, the second groove 522, the first gap 523, and the second gap 524. The front frame 511 can be divided into at least the antenna section K1. The antenna structure 500 further includes the first resonance portion 53, the second resonance portion 54, the extending portion 55, and the signal feed source 56. The first resonance portion 53, the second resonance portion 54, the extending portion 55, and the antenna section K1 cooperatively form the antenna ANT4 to generate radiation signals in GPS frequency band and WIFI 2.4/5 GHz frequency band.

In addition, the antenna structure 500 includes the housing 51. The slot 520, the first groove 521, the second groove 522, the first gap 523, and the second gap 524 of the housing 51 are all defined on the front frame 511 and the side frame 513 instead of the backboard 512. Then the backboard 512 forms an all-metal structure. That is, the backboard 512 does not define any other slot and/or gap and has a good structural integrity and an aesthetic quality.

The antenna structure 100 of first exemplary embodiment, the antenna structure 100a of second exemplary embodiment, the antenna structure 300 of third exemplary embodiment, and the antenna structure 500 of fourth exemplary embodiment can be applied to one wireless communication device. For example, the antenna structure 300 can serve as an upper antenna. The antenna structures 100, or 100a can serve as a lower antenna. When the wireless communication device sends wireless signals, the wireless communication device can use the lower antenna to send wireless signals. When the wireless communication device receives wireless signals, the wireless communication device can use the upper antenna and the lower antenna to receive wireless signals. The wireless communication device can further include the antenna structure 500 to operate at multiple frequency bands, for example, the GPS and WIFI frequency bands.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
a metal housing, the metal housing comprising a front frame, a backboard, and a side frame, the side frame being between the front frame and the backboard; wherein the side frame defines a slot, the front frame defines a groove and a gap, the groove and the gap both in communication with the slot and extend to cut across the front frame; wherein the metal housing is divided into at least an antenna section by the slot, the groove, and the gap; and wherein the antenna section comprises a first section and a second section perpendicular to the first section;
a first resonance portion;
a second resonance portion;
an extending portion; and
a signal feed source;
wherein the first resonance portion, the second resonance portion, and the extending portion are spaced apart from each other and are at a receiving space defined from the first section and the second section to the groove and the gap;
wherein the first resonance portion is directly and electrically connected to the antenna section or is spaced apart and electrically coupled to the antenna section; wherein the second resonance portion is electrically connected to the antenna section; wherein the extending portion is directly and electrically connected to the antenna section or is spaced apart and electrically coupled to the antenna section; and
wherein one of the first resonance portion and the second resonance portion is electrically connected to the signal feed source, and the other one of the first resonance portion and the second resonance portion is grounded.

2. The antenna structure of claim 1, wherein the slot, the groove, and the gap are all filled with insulating material.

3. The antenna structure of claim 2, wherein the extending portion comprises a first extending section and a second extending section perpendicular to the first extending section, a junction of the first extending section and the second extending section forms a corner; wherein the extending portion is attached to the insulating material of the slot, and the corner of the extending portion is attached to a corner of the slot.

4. The antenna structure of claim 1, wherein the extending portion comprises a first extending section and a second extending section perpendicular to the first extending section, the first extending section is spaced apart from and parallel to the first section; and wherein the second extending section is spaced apart from and parallel to the second section.

5. The antenna structure of claim 4, wherein a junction of the first extending section and the second extending section forms a corner, a junction of the first section and the second section forms a corner, and the corner of the extending portion is spaced apart from and parallel to the corner of the antenna section.

6. The antenna structure of claim 1, wherein the antenna section is on a first plane, the extending portion is on a second plane, the backboard is on a third plane; wherein the first plane, the second plane, and the third plane are different from each other and are parallel to each other, and the second plane is between the first plane and the third plane.

7. The antenna structure of claim 1, wherein one portion of the extending portion is positioned between the first resonance portion and the backboard; another portion of the extending portion is positioned between the second resonance portion and the backboard.

8. The antenna structure of claim 1, wherein the extending portion comprises a plurality of extending arms and the extending portion is electrically connected to the antenna section.

9. The antenna structure of claim 1, wherein the extending portion comprises two extending arms, one of the two extending arms is electrically connected to the antenna section and forms a T-shaped structure with the other of the two extending arms.

10. The antenna structure of claim 1, wherein when the signal feed source supplies current, the current flows through the first resonance portion, directly flows to the antenna section through the first resonance portion, flows to the second resonance portion, and is grounded through the second resonance portion; wherein the signal feed source, the first resonance portion, and the second resonance portion cooperatively form a loop antenna to activate a first frequency band through a method of a half of a wavelength; wherein when the signal feed source supplies current, the current flows through the first resonance portion, directly flows to the antenna section through the first resonance portion, and flows to the extending portion; the signal feed source, the first resonance portion, the antenna section, and the extending portion cooperatively form a monopole antenna to activate a second frequency band through a method of a quarter of a wavelength; wherein a frequency multiplication of the resonance frequency further activates a third frequency band; wherein a frequency of the third frequency band is higher than a frequency of the second frequency band; and wherein a frequency of the second frequency band is higher than a frequency of the first frequency band.

11. The antenna structure of claim 1, wherein the backboard is an integrally formed metallic sheet, the backboard is directly connected to the side frame and there is no gap formed between the backboard and the side frame, the backboard does not define any slot, break line, or gap to divide the backboard.

12. A wireless communication device comprising:
an antenna structure, the antenna structure comprising:
a metal housing, the metal housing comprising a front frame, a backboard, and a side frame, the side frame being between the front frame and the backboard; wherein the side frame defines a slot, the front frame defines a groove and a gap, the groove and the gap both in communication with the slot and extend to cut across the front frame; wherein the metal housing is divided into at least an antenna section by the slot, the groove, and the gap; and wherein the antenna section comprises a first section and a second section perpendicular to the first section;
a first resonance portion;
a second resonance portion;
an extending portion; and
a signal feed source;
wherein the first resonance portion, the second resonance portion, and the extending portion are spaced apart from each other and are at a receiving space defined from the first section and the second section to the groove and the gap;
wherein the first resonance portion is directly and electrically connected to the antenna section or is spaced apart and electrically coupled to the antenna section; wherein the second resonance portion is electrically connected to the antenna section; wherein the extending portion is directly and electrically connected to the antenna section or is spaced apart and electrically coupled to the antenna section; and
wherein one of the first resonance portion and the second resonance portion is electrically connected to the signal feed source, and the other one of the first resonance portion and the second resonance portion is grounded.

13. The wireless communication device of claim 12, further comprising a display, wherein the front frame, the backboard, and the side frame cooperatively form a metal metal housing of the wireless communication device; wherein the front frame defines an opening, the display is received in the opening, a display surface of the display is exposed at the opening and is positioned parallel to the backboard.

14. The wireless communication device of claim 12, further comprising double camera lenses and a flash light, wherein the backboard defines holes for exposing double camera lenses and the flash light.

15. The wireless communication device of claim 12, wherein the slot, the groove, and the gap are all filled with insulating material.

16. The wireless communication device of claim 15, wherein the extending portion comprises a first extending section and a second extending section perpendicular to the first extending section, a junction of the first extending section and the second extending section forms a corner; wherein the extending portion is attached to the insulating material of the slot, and the corner of the extending portion is attached to a corner of the slot.

17. The wireless communication device of claim 12, wherein the extending portion comprises a first extending section and a second extending section perpendicular to the first extending section, the first extending section is spaced apart from and parallel to the first section; and wherein the second extending section is spaced apart from and parallel to the second section.

18. The wireless communication device of claim 17, wherein a junction of the first extending section and the second extending section forms a corner, a junction of the first section and the second section forms a corner, and the corner of the extending portion is spaced apart from and parallel to the corner of the antenna section.

19. The wireless communication device of claim 12, wherein the antenna section is on a first plane, the extending portion is on a second plane, the backboard is on a third plane; the first plane, the second plane, and the third plane are different from each other and are parallel to each other, and the second plane is between the first plane and the third plane.

20. The wireless communication device of claim 12, wherein one portion of the extending portion is positioned between the first resonance portion and the backboard; another portion of the extending portion is positioned between the second resonance portion and the backboard.

21. The wireless communication device of claim 12, wherein the extending portion comprises a plurality of extending arms and the extending portion is electrically connected to the antenna section.

22. The wireless communication device of claim 12, wherein the extending portion comprises two extending arms, one of the two extending arms is electrically connected to the antenna section and forms a T-shaped structure with the other of the two extending arms.

23. The wireless communication device of claim 12, wherein when the signal feed source supplies current, the current flows through the first resonance portion, directly flows to the antenna section through the first resonance portion, flows to the second resonance portion, and is grounded through the second resonance portion; the signal feed source, the first resonance portion, and the second resonance portion cooperatively form a loop antenna to activate a first frequency band through a method of a half of a wavelength; wherein when the signal feed source supplies current, the current flows through the first resonance portion, directly flows to the antenna section through the first resonance portion, and flows to the extending portion; wherein the signal feed source, the first resonance portion, the antenna section, and the extending portion cooperatively form a monopole antenna to activate a second frequency band through a method of a quarter of a wavelength; wherein a frequency multiplication of the resonance frequency further activates a third frequency band; a frequency of the third frequency band is higher than a frequency of the second frequency band; and wherein a frequency of the second frequency band is higher than a frequency of the first frequency band.

24. The wireless communication device of claim 12, wherein the backboard is an integrally formed metallic sheet, the backboard is directly connected to the side frame and there is no gap formed between the backboard and the side frame, the backboard does not define any slot, break line, or gap to divide the backboard.

* * * * *